United States Patent
Seger, Jr. et al.

(10) Patent No.: US 12,164,382 B2
(45) Date of Patent: *Dec. 10, 2024

(54) PROGRAMMABLE IO MODULE

(71) Applicant: SigmaSense, LLC., Wilmington, DE (US)

(72) Inventors: Richard Stuart Seger, Jr., Belton, TX (US); Gerald Dale Morrison, Redmond, WA (US); Daniel Keith Van Ostrand, Leander, TX (US); Patrick Troy Gray, Cedar Park, TX (US); Timothy W. Markison, Mesa, AZ (US)

(73) Assignee: SigmaSense, LLC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/059,785

(22) Filed: Nov. 29, 2022

(65) Prior Publication Data

US 2023/0105616 A1 Apr. 6, 2023

Related U.S. Application Data

(63) Continuation of application No. 17/660,937, filed on Apr. 27, 2022, now Pat. No. 11,809,278, which is a (Continued)

(51) Int. Cl.
*G06F 11/14* (2006.01)
*G06F 13/10* (2006.01)
*H04L 1/00* (2006.01)

(52) U.S. Cl.
CPC ........ *G06F 11/1443* (2013.01); *G06F 13/105* (2013.01); *H04L 1/00* (2013.01)

(58) Field of Classification Search
CPC ...... G06F 11/1443; G06F 13/105; H04L 1/00; H04L 1/0057
See application file for complete search history.

(56) References Cited

U.S. PATENT DOCUMENTS

| 5,437,178 A | 8/1995 | Esin et al. |
| 6,218,972 B1 | 4/2001 | Groshong |

(Continued)

FOREIGN PATENT DOCUMENTS

| CN | 103995626 A | 8/2014 |
| CN | 104182105 A | 12/2014 |

(Continued)

OTHER PUBLICATIONS

Baker; How delta-sigma ADCs work, Part 1; Analog Applications Journal; Oct. 1, 2011; 6 pgs.

(Continued)

*Primary Examiner* — Thien Nguyen
(74) *Attorney, Agent, or Firm* — GARLICK & MARKISON; Timothy W. Markison

(57) ABSTRACT

A method for execution by an input/output (IO) control module of an integrated circuit (IC) includes determining whether a programmable IO interface module is for dynamic or static use. The programmable IO interface module includes a configurable front-end module and a configurable back-end module. When the programmable IO interface module is for the dynamic use, determining to configure the programmable IO interface module as the dynamic use of a configuration of a plurality of configurations. The plurality of configurations includes a bidirectional interface, an input, an output, a concurrent drive and sense interface, and a concurrent transmit-receive interface. The method further includes configuring the front-end module in accordance with the configuration, configuring the back-end module in accordance with the configuration, and determining whether to change the configuration to another configuration of the plurality of configurations.

12 Claims, 35 Drawing Sheets

Related U.S. Application Data continuation of application No. 16/879,905, filed on May 21, 2020, now Pat. No. 11,340,995.

(56) References Cited

U.S. PATENT DOCUMENTS

| | | |
|---|---|---|
| 6,665,013 B1 | 12/2003 | Fossum et al. |
| 7,476,233 B1 | 1/2009 | Wiener et al. |
| 7,528,755 B2 | 5/2009 | Hammerschmidt |
| 8,031,094 B2 | 10/2011 | Hotelling |
| 8,089,289 B1 | 1/2012 | Kremin et al. |
| 8,279,180 B2 | 10/2012 | Hotelling et al. |
| 8,537,110 B2 | 9/2013 | Kruglick |
| 8,547,114 B2 | 10/2013 | Kremin |
| 8,587,535 B2 | 11/2013 | Oda et al. |
| 8,625,726 B2 | 1/2014 | Kuan |
| 8,657,681 B2 | 2/2014 | Kim |
| 8,966,400 B2 | 2/2015 | Yeap |
| 8,982,097 B1 | 3/2015 | Kuzo et al. |
| 9,081,437 B2 | 7/2015 | Oda |
| 9,201,547 B2 | 12/2015 | Elias |
| 10,007,335 B2 | 6/2018 | Lee |
| 2003/0052657 A1 | 3/2003 | Koernle et al. |
| 2005/0083222 A1* | 4/2005 | Nickel ............... G06F 3/05 341/155 |
| 2005/0235758 A1 | 10/2005 | Kowal et al. |
| 2010/0321067 A1 | 12/2010 | Hurwitz |
| 2011/0063154 A1 | 3/2011 | Hotelling et al. |
| 2011/0227651 A1* | 9/2011 | Hurwitz ............... H03G 1/0088 330/254 |
| 2011/0298745 A1 | 12/2011 | Souchkov |
| 2012/0278031 A1 | 11/2012 | Oda |
| 2013/0278447 A1 | 10/2013 | Kremin |
| 2014/0327644 A1 | 11/2014 | Mohindra |
| 2015/0091847 A1 | 4/2015 | Chang |
| 2015/0346889 A1 | 12/2015 | Chen |
| 2016/0188049 A1 | 6/2016 | Yang et al. |
| 2017/0366196 A1 | 12/2017 | Lovel |
| 2018/0157354 A1 | 6/2018 | Blondin et al. |
| 2018/0275824 A1 | 9/2018 | Li |

FOREIGN PATENT DOCUMENTS

| | | |
|---|---|---|
| CN | 104536627 A | 4/2015 |
| CN | 107771273 A | 3/2018 |
| EP | 2284637 A1 | 2/2011 |

OTHER PUBLICATIONS

Brian Pisani, Digital Filter Types in Delta-Sigma ADCs, Application Report SBAA230, May 2017, pp. 1-8, Texas Instruments Incorporated, Dallas, Texas.

European Patent Office; Extended European Search Report; Application No. 19853507.2; Jun. 13, 2023; 7 pgs.

* cited by examiner

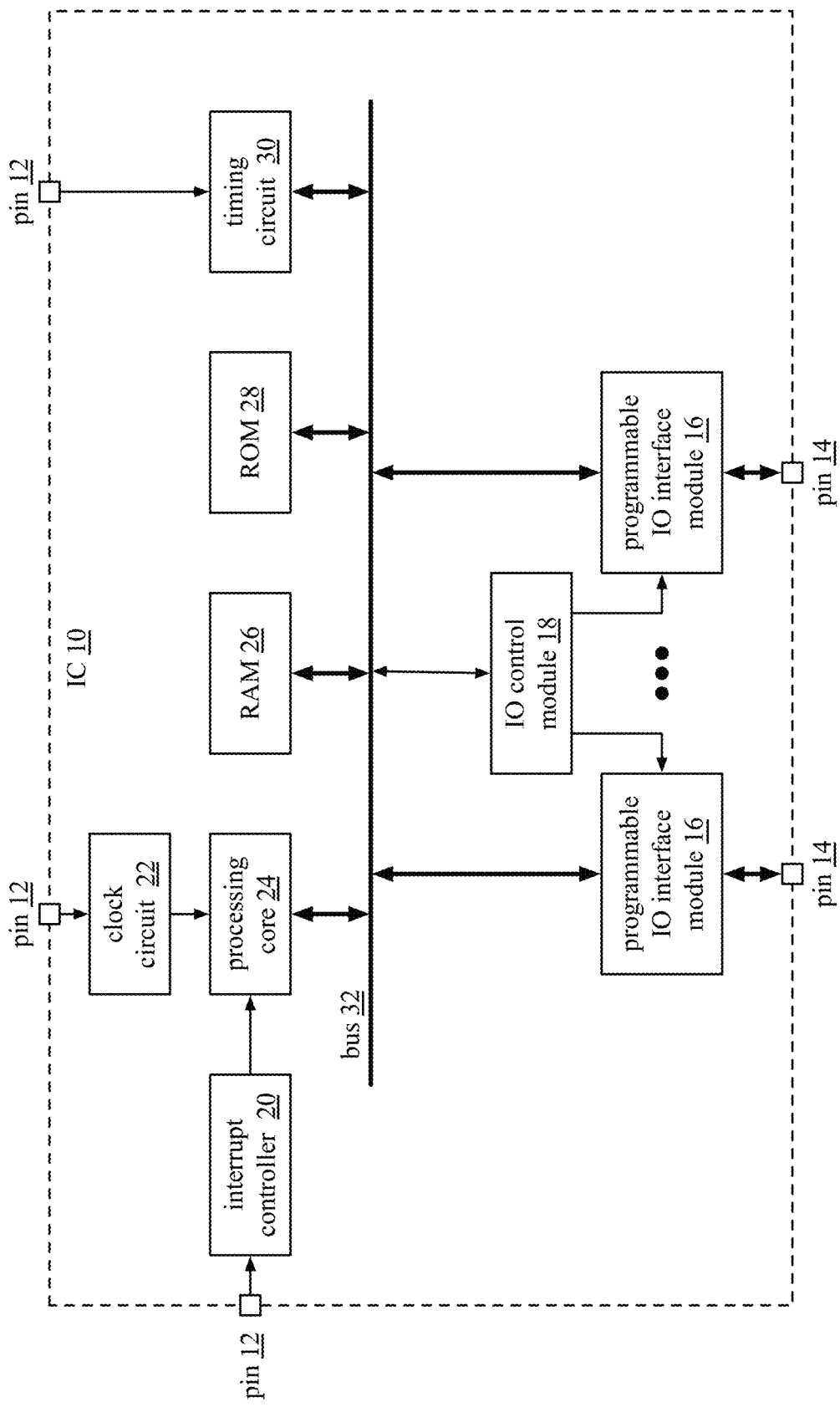

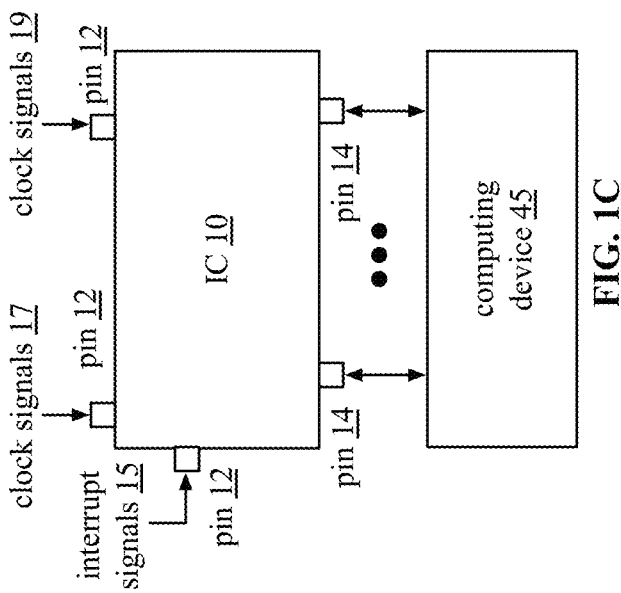
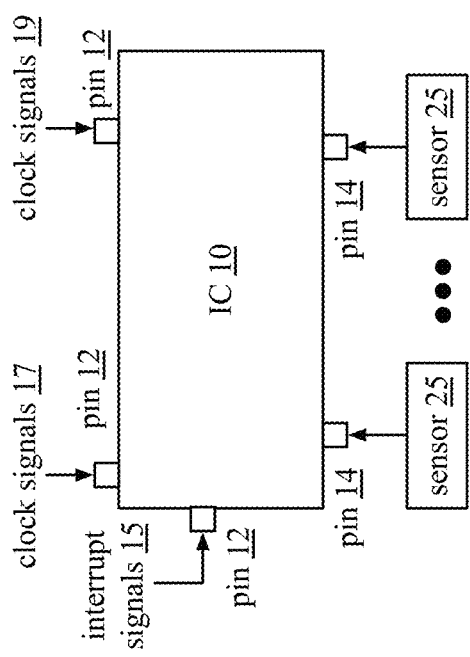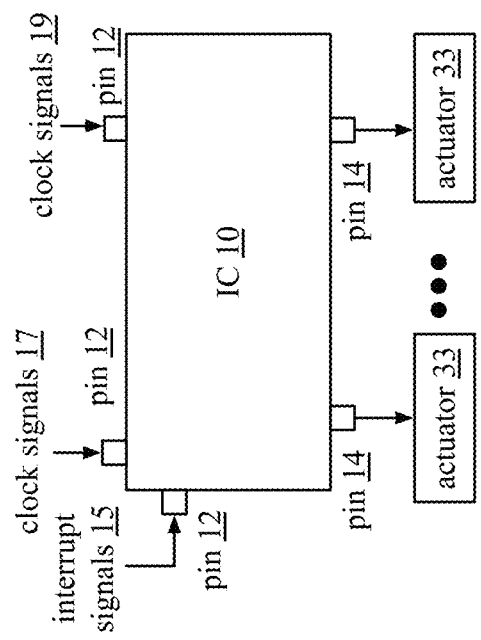

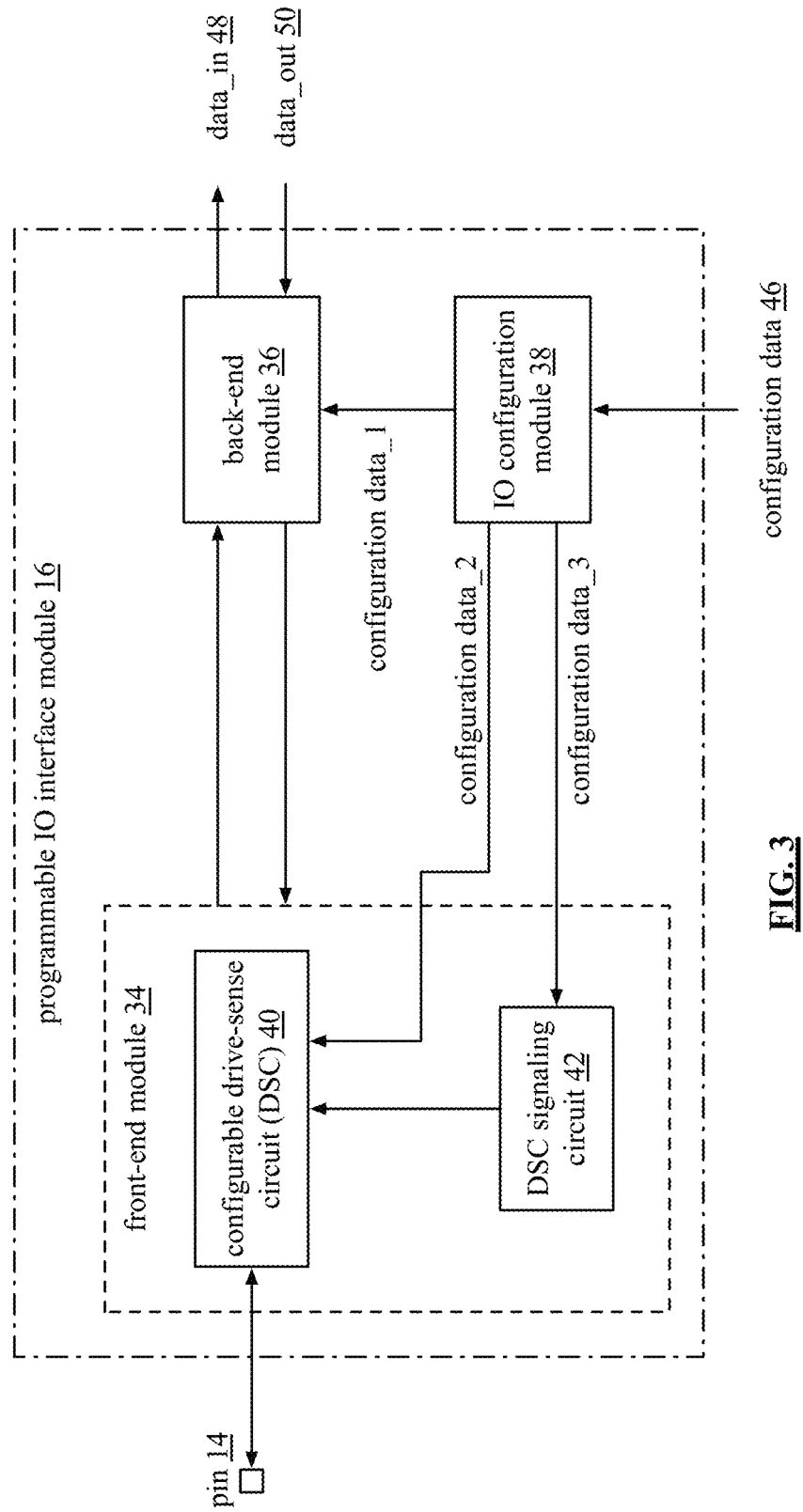

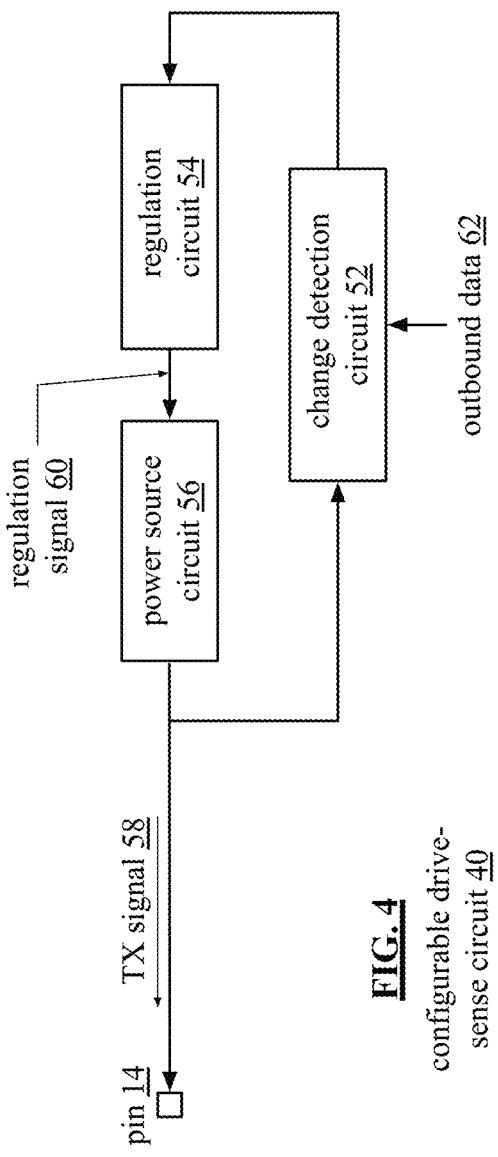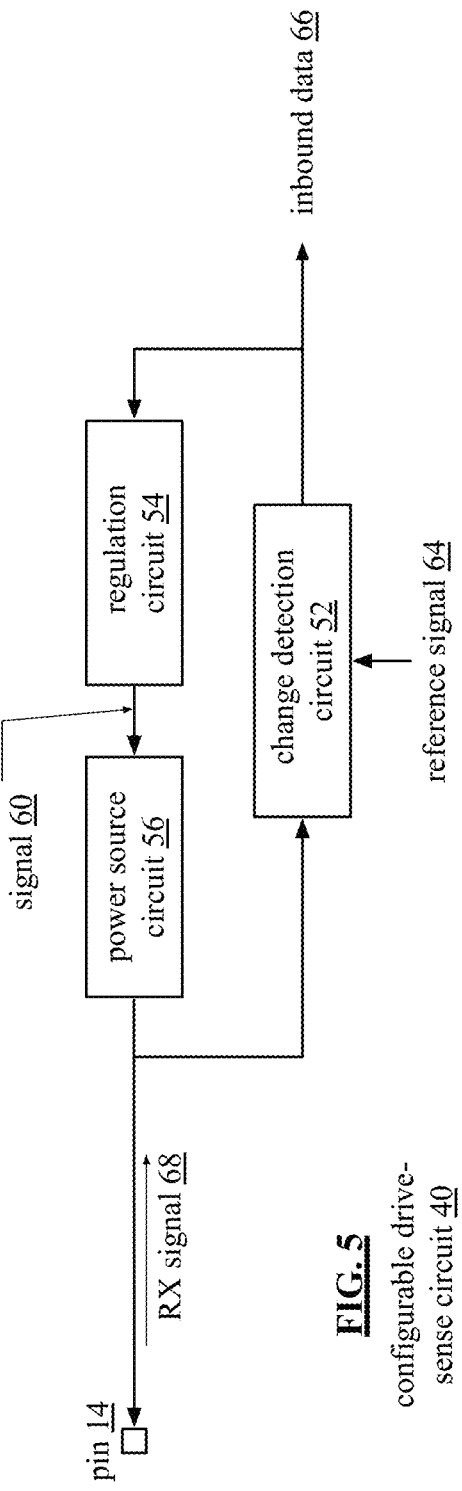

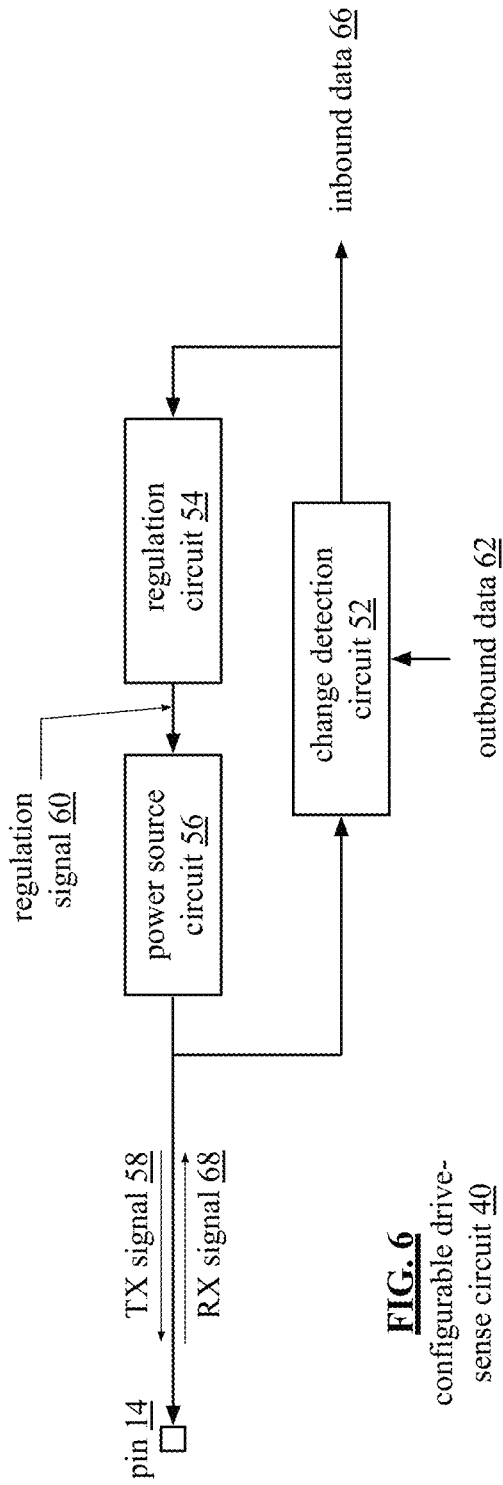

output driver 72 inverting op-amp 76 non-inverting op-amp 74 bidirectional switch 82

IO front end circuit 1 78
(concurrent drive & sense circuit)

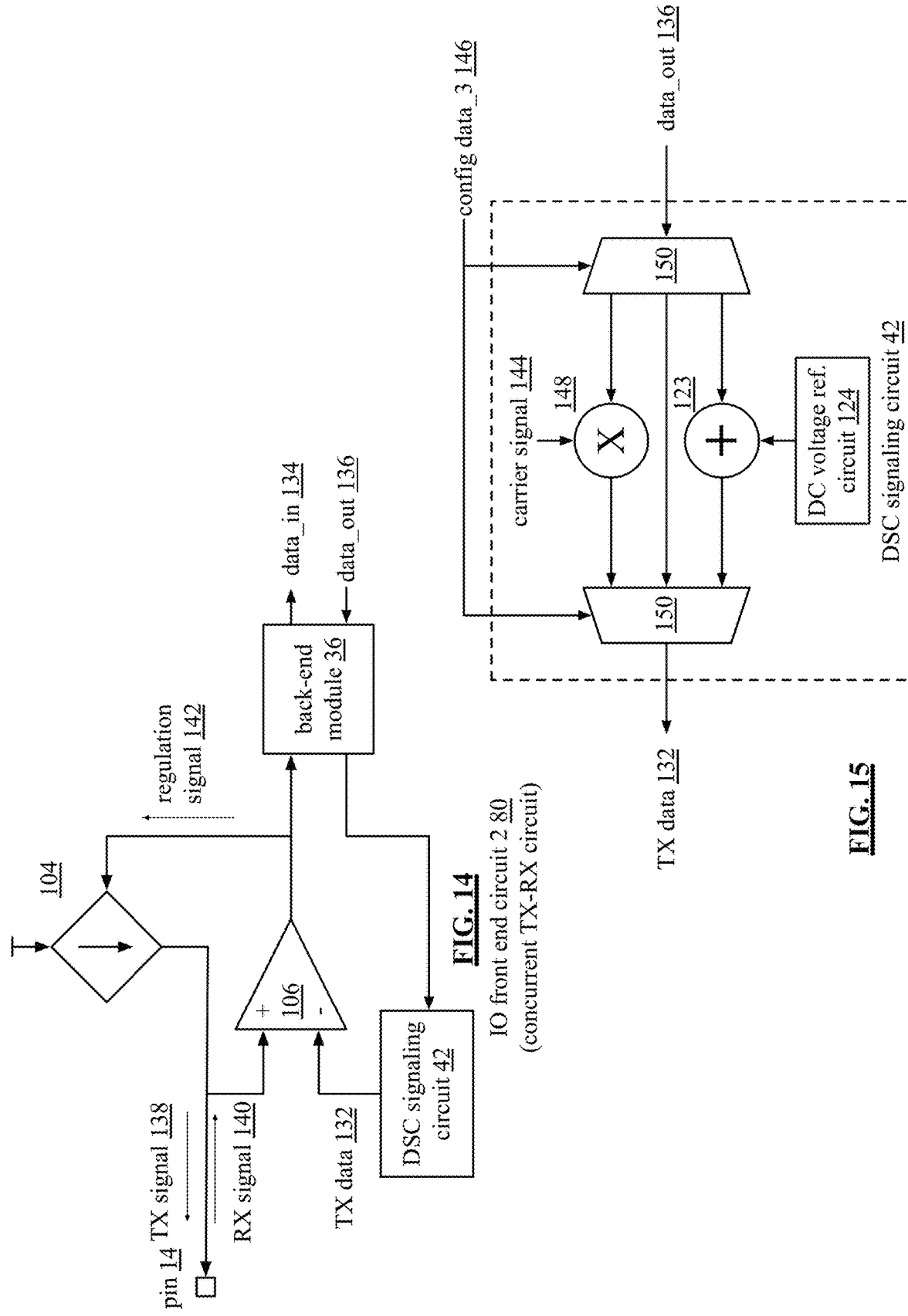

voltage out 85 differential op-amp 95 differential 103 programmable IO interface module 16 inverting op-amp 76 inverting op-amp 76

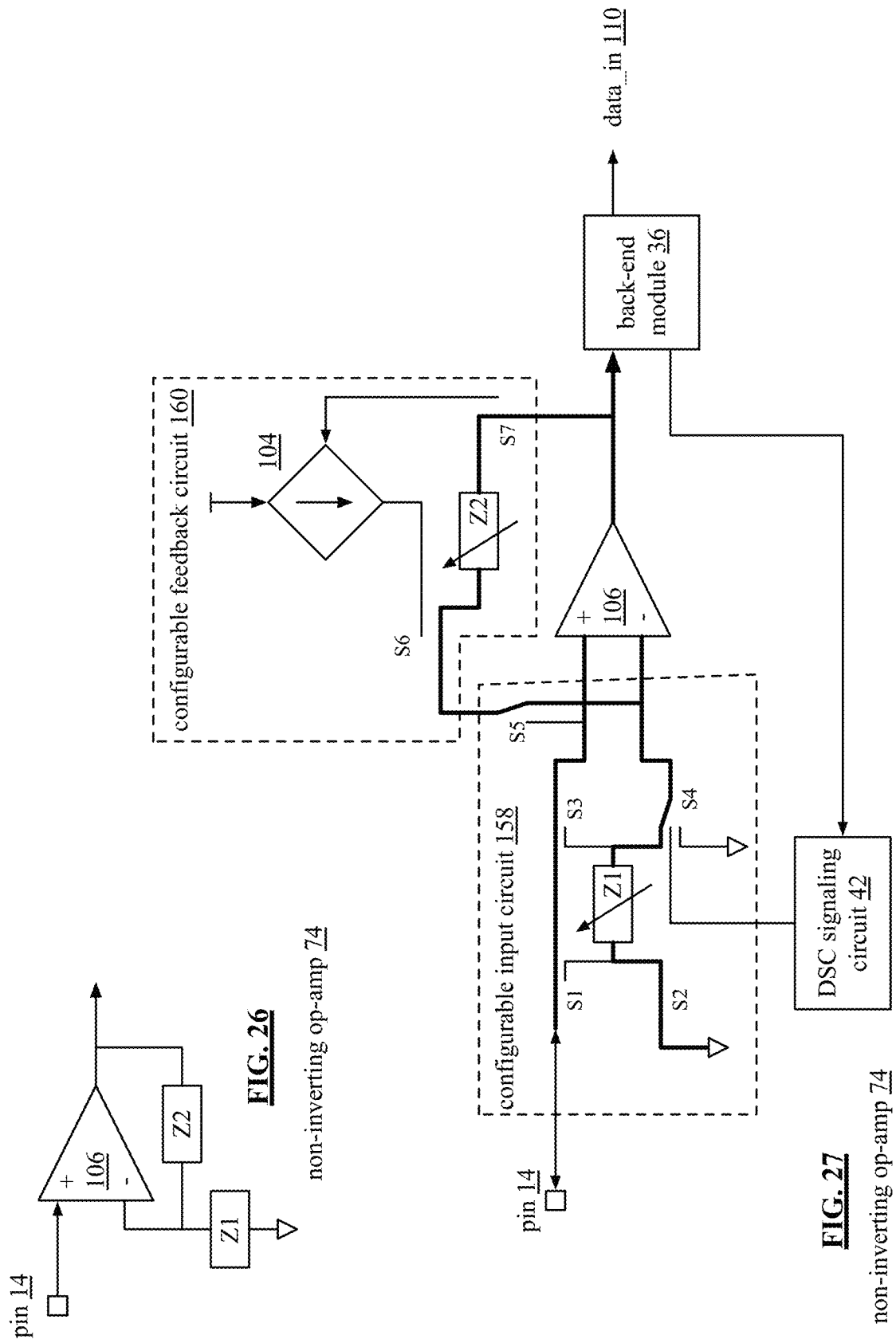

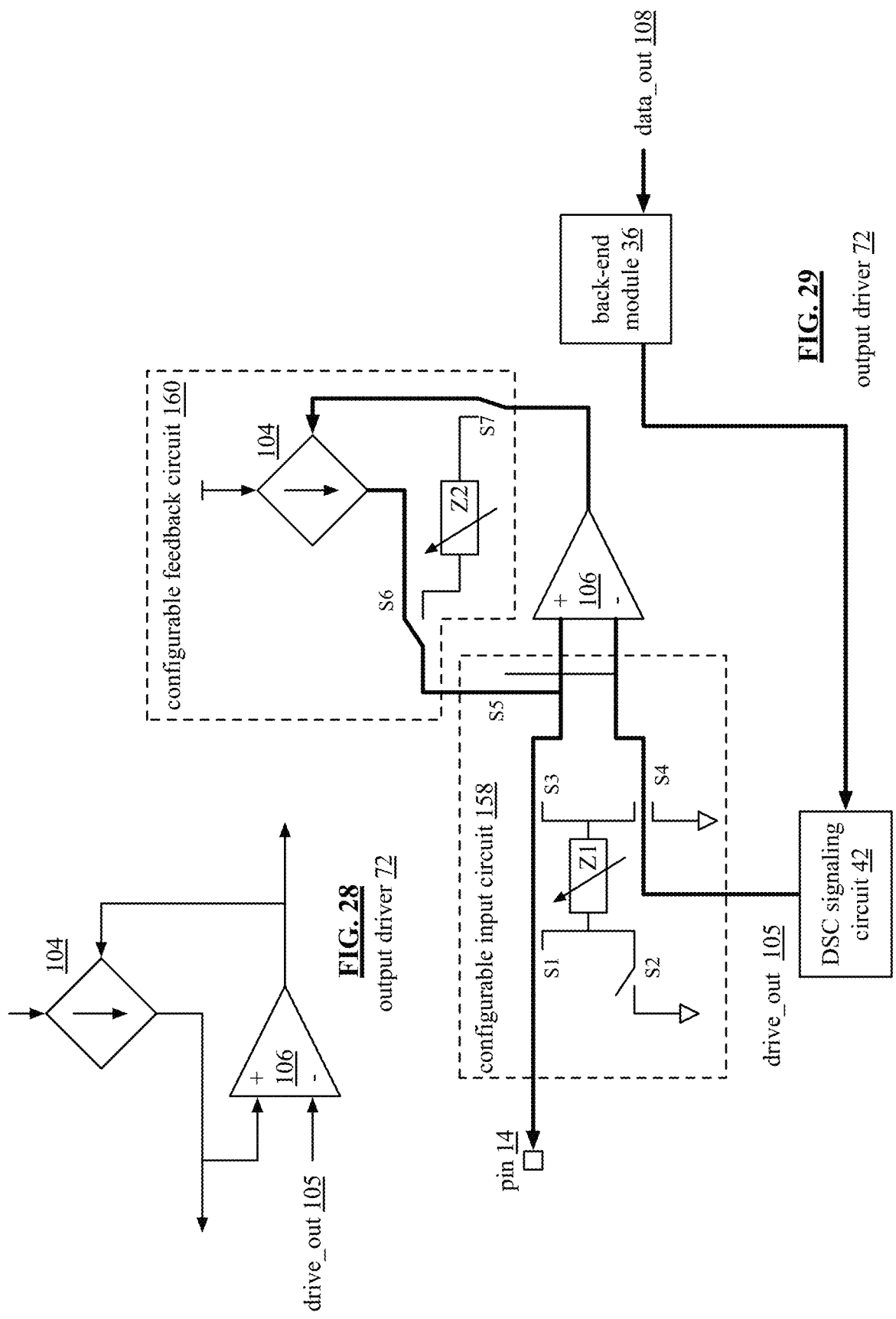

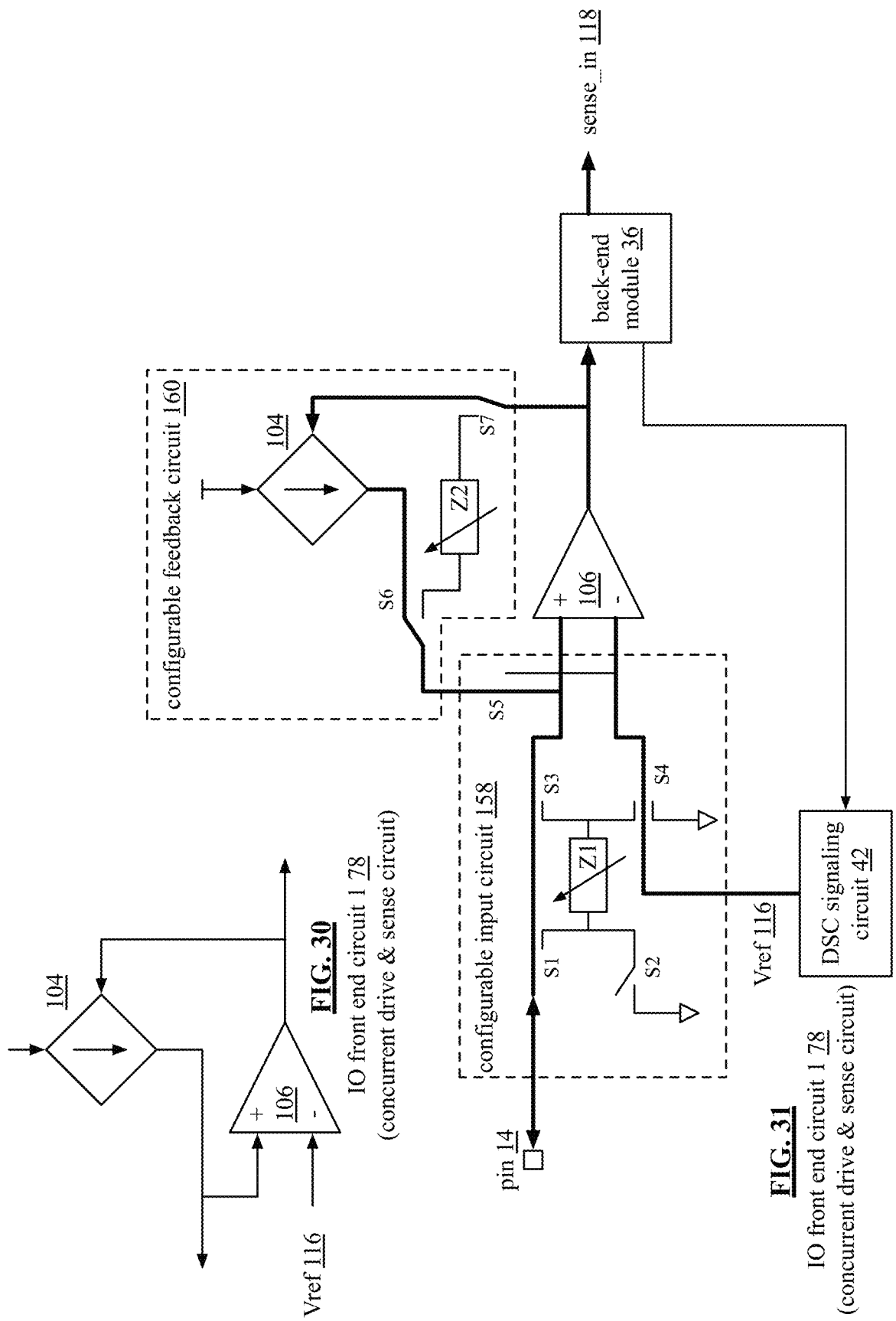

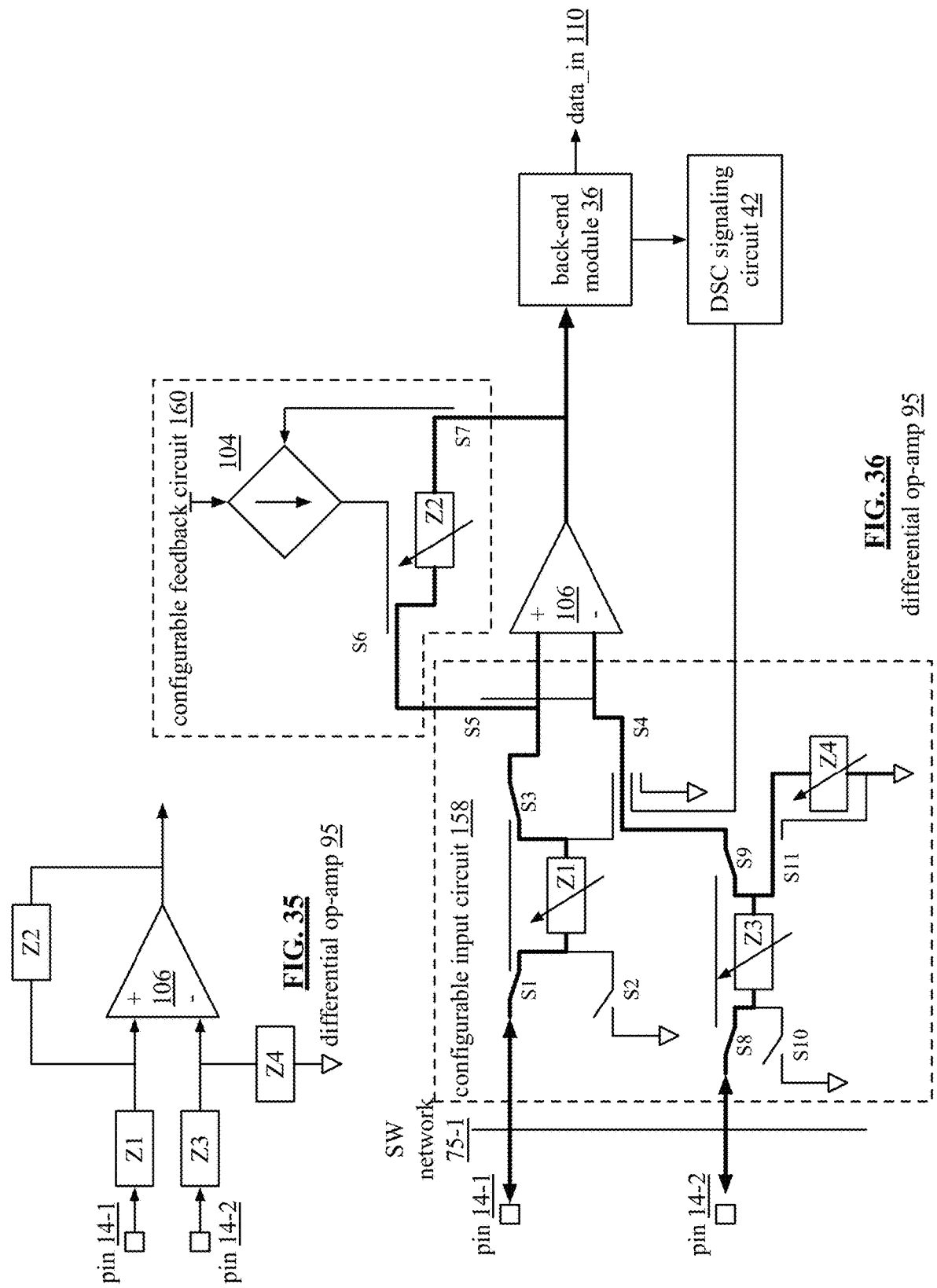

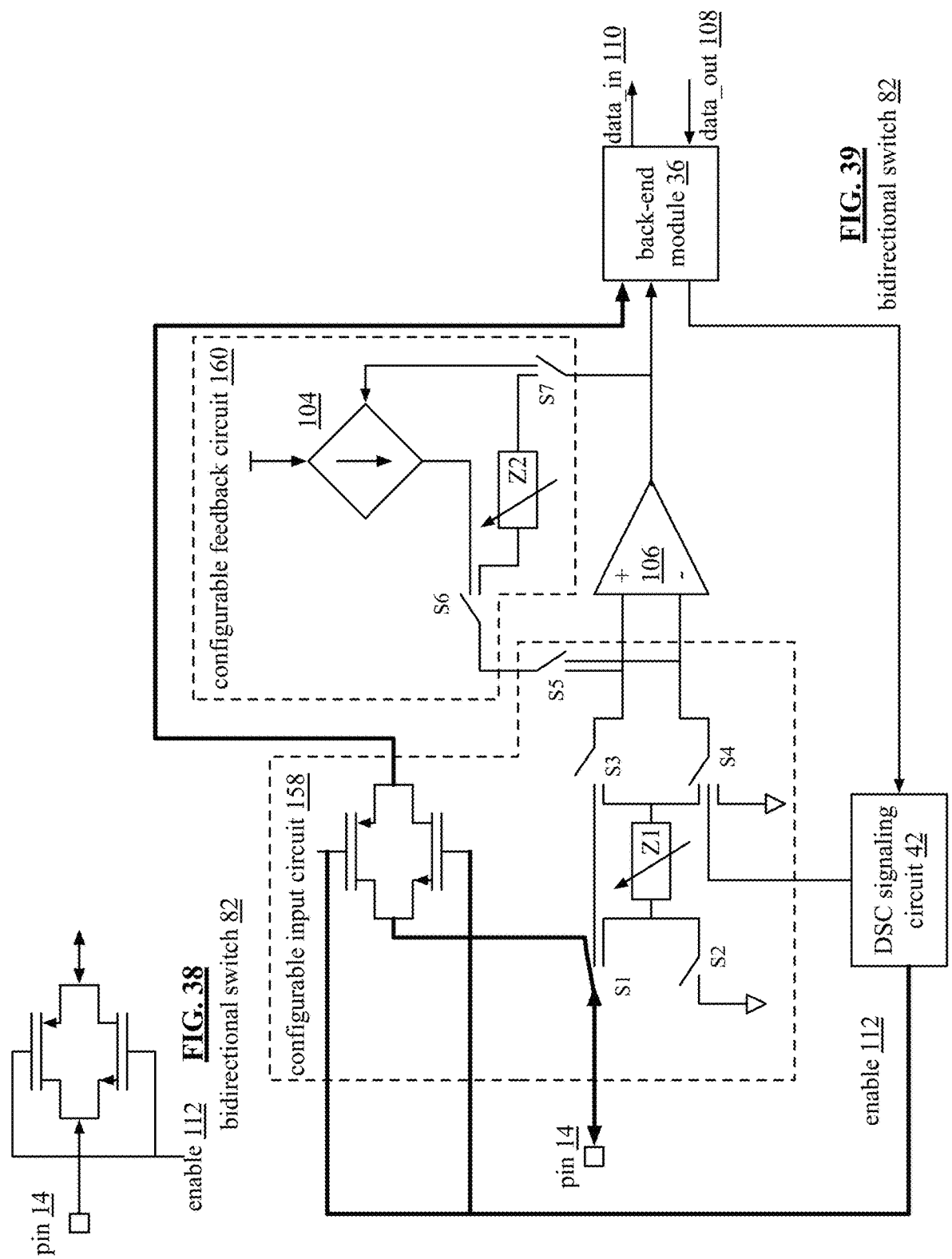

digital filter 88

TX-RX data formatting 96
(transmit side)

signal generator 180

TX-RX data formatting 96 (receive side)

US 12,164,382 B2

PROGRAMMABLE IO MODULE

CROSS-REFERENCE TO RELATED APPLICATIONS

The present U.S. Utility Patent Application claims priority pursuant to 35 U.S.C. § 120 as a continuation of U.S. Utility application Ser. No. 17/660,937, entitled "PROGRAMMING A PROGRAMMABLE INPUT/OUTPUT (I/O) INTERFACE MODULE", filed Apr. 27, 2022, which is a continuation of U.S. Utility application Ser. No. 16/879,905, entitled "INTEGRATED CIRCUIT WITH PROGRAMMABLE INPUT/OUTPUT MODULE" filed May 21, 2020, now U.S. Pat. No. 11,340,995, issue on May 24, 2022, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to integrated circuits and more particularly to input and output interfaces of integrated circuits.

Description of Related Art

Data communication involves sending data from one device to another device via a communication medium (e.g., a wire, a trace, a twisted pair, a coaxial cable, air, etc.). The devices range from dies within an integrated circuit (IC), to ICs on a printed circuit board (PCB), to PCBs within a computer, to computers, to networks of computers, and so on.

Data is communicated via a wired and/or a wireless connection and is done so in accordance with a data communication protocol. Data communication protocols dictate how the data is to be formatted, encoded/decoded, transmitted, and received. For example, a wireless data communication protocol such as IEEE 802.11 dictates how wireless communications are to be done via a wireless local area network. As another example, Sony/Philips Digital Interface Format (SPDIF) dictates how digital audio signals are transmitted and received. As yet another example, Inter-Integrated Circuit (I²C) is a two-wire serial protocol to connect devices such as microcontrollers, digital to analog converters, analog to digital converters, peripheral devices to a computer, and so on.

In addition, data communication protocols dictate how transmission errors are to be handled. For example, wireless communications often experience data errors, so the protocol dictates a form of forward error correction (e.g., Reed Solomon encoding, Turbo encoded, etc.) be used. As another example, wired communications experience much less data errors than wireless communications so the protocol dictates a form of feedback error correction (e.g., resend request, etc.) be used.

For some data communications, digital data is modulated with an analog carrier signal and transmitted/received via a modulated radio frequency (RF) signal. For other data communications, the digital data is transmitted "as is" via a wire or metal trace on a PCB. Regardless of the data communication protocol, digital data is in binary form where a logic "1" value is represented by a voltage that is at least 90% of the positive rail voltage and a logic "0" is represented by a voltage it is at most 10% of the negative rail voltage.

An integrated circuit (IC) is a collection of electronic components (e.g., resistors, transistors, capacitors, etc.) connected in a single package to achieve a specific purpose. Examples of integrated circuits include logic devices, memory devices, sensors, timers, shift registers, operational amplifiers (op-amps), voltage regulators, motor controllers, microcontrollers, microprocessors, field-programmable gate arrays (FPGAs), complex programmable logic devices (CPLDs), digital signal processors (DSPs), memory controllers, and application-specific integrated circuits (ASICs). Integrated circuits include pins for connecting to a circuit board and/or other circuitry.

Fixed ICs are programmed for a particular function and programmable ICs are programmable for a variety of different functions. However, for both fixed and programmable ICs, pins are usually dedicated to a specific function (e.g., power, clock, input, output, etc.).

BRIEF DESCRIPTION OF THE SEVERAL VIEWS OF THE DRAWING(S)

FIG. 1 is a schematic block diagram of an embodiment of an integrated circuit (IC) in accordance with the present invention;

FIGS. 1A-1C are schematic block diagrams of another embodiment of an integrated circuit (IC) in accordance with the present invention;

FIG. 3 is a schematic block diagram of an embodiment of a programmable input/output (10) interface module in accordance with the present invention;

FIG. 4 is a schematic block diagram of an embodiment of a configurable drive-sense circuit (DSC) in accordance with the present invention;

FIG. 5 is a schematic block diagram of another embodiment of a configurable drive-sense circuit (DSC) in accordance with the present invention;

FIG. 6 is a schematic block diagram of another embodiment of a configurable drive-sense circuit (DSC) in accordance with the present invention;

FIG. 14 is a schematic block diagram of an embodiment of an input/output (IO) front-end circuit 2 configuration of a configurable drive-sense circuit (DSC) in accordance with the present invention;

FIG. 15 is a schematic block diagram of an embodiment of a drive-sense circuit (DSC) signaling circuit in accordance with the present invention;

FIG. 26 is a schematic block diagram of an embodiment of a non-inverting operational amplifier (op-amp) configuration of a configurable drive-sense circuit (DSC) in accordance with the present invention;

FIG. 27 is a schematic block diagram of an embodiment of a non-inverting operational amplifier (op-amp) configuration of a configurable drive-sense circuit (DSC) in accordance with the present invention;

FIG. 28 is a schematic block diagram of an output driver configuration of a configurable drive-sense circuit (DSC) in accordance with the present invention;

FIG. 29 is a schematic block diagram of an embodiment of an output driver configuration of a configurable drive-sense circuit (DSC) in accordance with the present invention;

FIG. 30 is a schematic block diagram of an input/output (IO) front-end circuit 1 (concurrent drive & sense circuit) configuration of a configurable drive-sense circuit (DSC) in accordance with the present invention;

FIG. 31 is a schematic block diagram of an input/output (IO) front-end circuit 1 (concurrent drive & sense circuit) configuration of a configurable drive-sense circuit (DSC) in accordance with the present invention;

FIG. 35 is a schematic block diagram of an embodiment of a differential operational amplifier (op-amp) configuration of a configurable drive-sense circuit (DSC) in accordance with the present invention;

FIG. 36 is a schematic block diagram of an embodiment of a differential operational amplifier (op-amp) configuration of a configurable drive-sense circuit (DSC) in accordance with the present invention;

FIG. 38 is a schematic block diagram of an embodiment of a bidirectional switch configuration of a configurable drive-sense circuit (DSC) in accordance with the present invention;

FIG. 39 is a schematic block diagram of an embodiment of a bidirectional switch configuration of a configurable drive-sense circuit (DSC) in accordance with the present invention;

Figure 47:
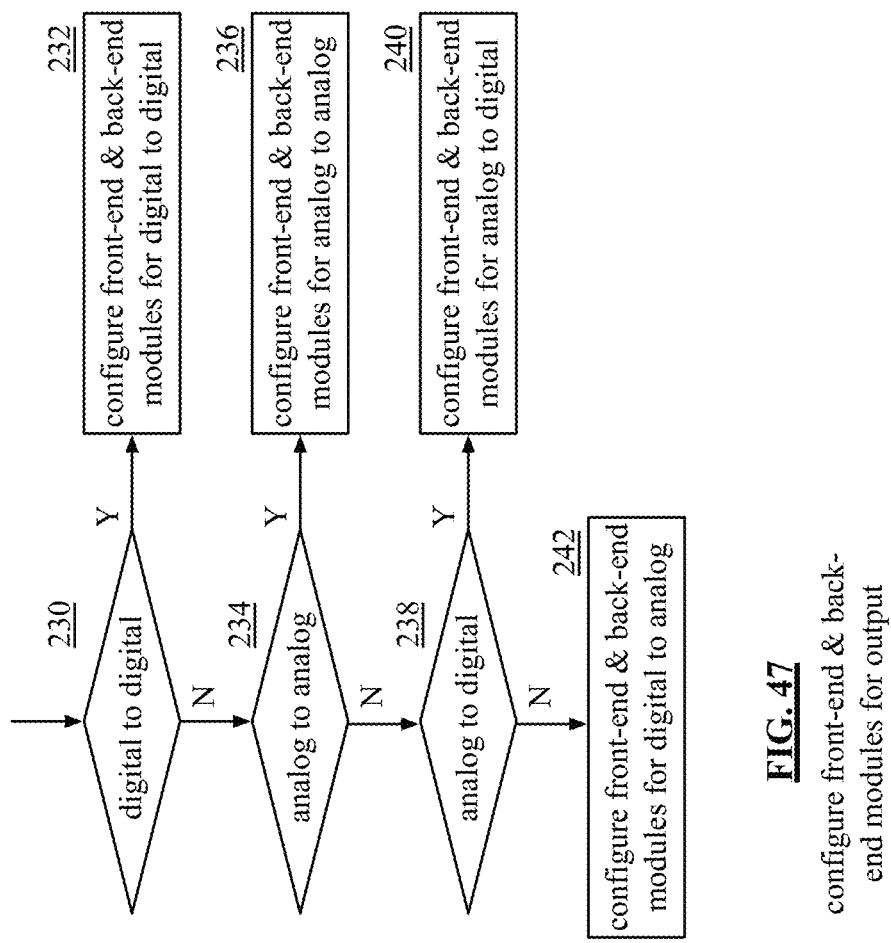
Figure 48:
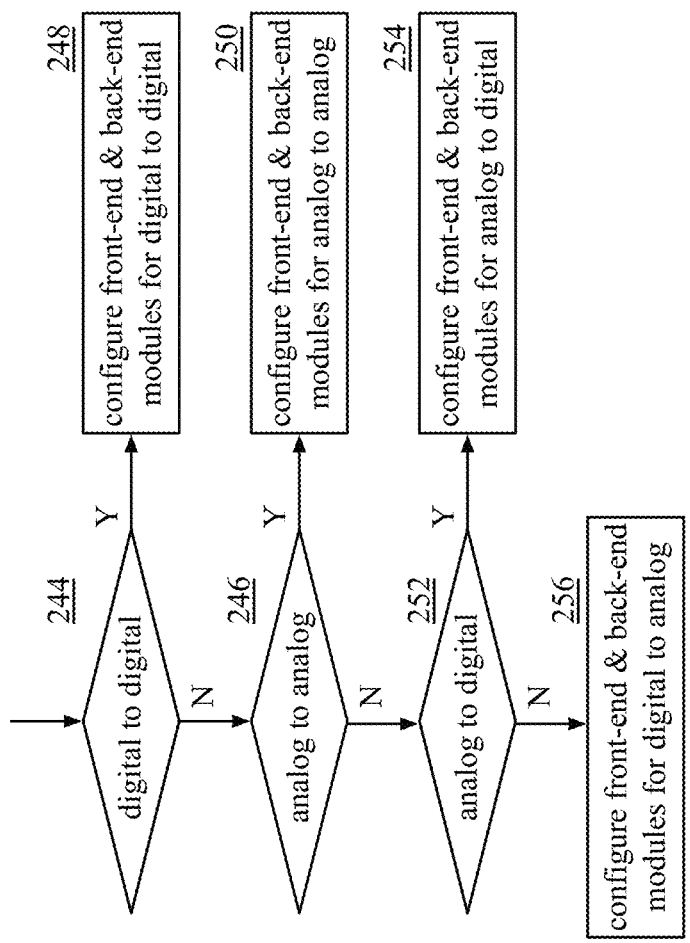

FIG. 47 is a flowchart of an example of a method of programming the front-end and back-end modules of a programmable input/output (IO) interface module for output in accordance with the present invention; and FIG. 48 is a flowchart of an example of a method of programming the front-end and back-end modules of a programmable input/output (IO) interface module for input in accordance with the present invention.

DETAILED DESCRIPTION OF THE INVENTION

FIG. 1 is a schematic block diagram of an embodiment of an integrated circuit (IC) 10 including pins 12-14, a plurality of programmable input/output (IO) interface modules 16, an IO control module 18, an interrupt controller 20, a clock circuit 22, a processing core 24, random access memory (RAM) 26, read-only memory (ROM) 28, and a timing circuit 30.

The IC 10 could be a microcontroller, a microprocessor, a field-programmable gate array (FPGA), a digital signal processor (DSP), a memory controller, an application-specific integrated circuit (ASIC), and any other IC (i.e., a combination of electronic circuits packaged together for a computing purpose). The IC 10 could implement a processing module. A processing module is described in greater detail at the end of the detailed description of the invention section. The IC may include more or less components than what is shown.

The pins 12-14 are electronic interconnection points that can include traditional contact pins (e.g., wire leads) that protrude outward from the IC, flat contact pads, a solder bump bonded to a flat contact pad, a ball bump bonded to a flat contact pad, a micro-bump bonded to a flat contact pad, a fine wire bonded to a flat contact pad, etc. The pins 12 are dedicated input pins to the IC 10. For example, a pin 12 provides an input connection to the interrupt controller 20, a pin 12 provides an input connection to the clock circuit 22, and a pin 12 provides an input connection to the timing circuit 30.

The IO control module 18, the plurality of programmable IO interface modules 16, the processing core 24, the RAM 26, the ROM 28, and the timing circuit 30 are connected via a bus 32. The bus 32 includes one or more lines, each line is a wired connection, a wire, a trace on a PCB, etc.

One or more of the RAM 26 and the ROM 28 store operational instructions for the IC 10. For example, the RAM may store data and operational instructions most relevant for the processing core 24. The processing core 24 includes analog and/or digital circuitry operable to manipulate signals (analog and/or digital) based on hard coding of the processing core's circuitry and/or operational instructions. As an example, the processing core 24 is an arithmetic logic unit (ALU). As another example, the processing core 24 is a multiply and accumulate circuit (MAC). The processing core 24 processes data in accordance with the IC's 10 function.

The timing circuit 30 is operable to generate one or more timing signals (e.g., hold, delay, etc.) for the functions of the IC 10 based on instructions received via the pin 12. The clock circuit 22 is operable to generate one or more clock signals based on clock control parameters and/or information (e.g., received via a pin 12) for synchronizing the operations of the processing core 24. The interrupt controller 20 is operable to transfer one or more interrupt signals received via the pin 12 (e.g., from one or more external devices) to the processing core 24.

In contrast to the pins 12, the pins 14 of the IC 10 can operate as a variety of functions. For example, a pin 14 can operate as a bidirectional interface (e.g., for input or output), an input (analog or digital), an output (analog or digital), a concurrent drive & sense interface (analog or digital), or a concurrent transmit-receive (TX-RX) interface (analog or digital).

The pins 14 are able to operate as different functions due to a signaling scheme controlled by the IO control module 18 to configure the plurality of IO interface modules 16 in accordance with a corresponding pin's desired function. The control module 18 is operable to receive configuration instructions from on-chip (e.g., via the processing core 24) or off-chip regarding a desired IC 10 function and therefore each pin 14's desired function. Based on the configuration instructions, the IO control module 18 instructs one or more of the plurality of programmable IO interface modules 16 to configure one or more pins 14 for a particular function for executing the desired IC function.

The plurality of programmable IO interface modules 16 communicate data between the pins 14 and the bus 32 in accordance with their configured function. The processing core 24 executes operations associated with the data and the desired IC 10 function and the RAM 26 and/or ROM 30 stores data in accordance with the desired IC 10 function. The plurality of programmable IO interface modules 16 will be discussed in further detail in the following Figures.

In traditional fixed and programmable ICs, each pin is designed for a unique purpose (e.g., digital input/output, analog input/output, power, etc.). For example, the pins of a field-programmable gate arrays (FPGA) include power, configuration, dedicated inputs (i.e., clock pins), and configurable IO pins. The configuration pins are used to "download" a logic program into the device where the memory is operable to store the program that customizes the IC.

All instructions in and out of traditional ICs go through pins. With a traditional digital IC, considerable power is required to drive the digital switching necessary for programming various operations. Traditional ICs such as FPGAs and microprocessors can have upwards of a thousand pins, each with a unique function. Many pins of a microprocessor require heat sinking as a result of high power expenditure.

The signaling scheme to configure the plurality of programmable IO interface modules 16 such that the pins 14 have a particular function, reduces power in comparison to programming signaling going in and out of the pins. Further, a single pin 14 can be configured for a heavy input or output whereas traditional ICs typically require multiple traditional input/output pins. Having pins 14 with multiple selectable purposes and single pins 14 that are able to complete the function of multiple traditional pins reduces the amount of pins required in the IC 10 thus reducing the overall footprint of the IC 10.

The signaling scheme to configure the plurality of programmable IO interface modules 16 such that the pins 14 have a particular function further provides versatility in the functionality of the IC 10. For example, a single IC 10 can be easily reconfigured via the plurality of programmable IO interface modules 16 in a wide variety of ways for multiple functions (e.g., full duplex or half duplex communication, data sensing, etc.). The IC 10 could implement a generic AISC with configurable inputs for various functions (i.e., there is no need to customize the IC for a particular function).

FIGS. 1A-1C are schematic block diagrams of embodiments of an integrated circuit (IC) 10 connected for various functions. In FIG. 1A, the pins 14 of the IC 10 are configured for connection to a plurality of sensors 25 for sensing a plurality of conditions. The pins 12 receive interrupt signals 15 and clock signals 17-19 as discussed with reference to FIG. 1. A sensor 25 functions to convert a physical input into an electrical output and/or an optical output. The physical input of a sensor may be one of a variety of physical input conditions.

For example, the physical condition includes one or more of, but is not limited to, acoustic waves (e.g., amplitude, phase, polarization, spectrum, and/or wave velocity); a biological and/or chemical condition (e.g., fluid concentration, level, composition, etc.); an electric condition (e.g., charge, voltage, current, conductivity, permittivity, eclectic field, which includes amplitude, phase, and/or polarization); a magnetic condition (e.g., flux, permeability, magnetic field, which amplitude, phase, and/or polarization); an optical condition (e.g., refractive index, reflectivity, absorption, etc.); a thermal condition (e.g., temperature, flux, specific heat, thermal conductivity, etc.); and a mechanical condition (e.g., position, velocity, acceleration, force, strain, stress, pressure, torque, etc.). For example, piezoelectric sensor converts force or pressure into an eclectic signal. As another example, a microphone converts audible acoustic waves into electrical signals.

There are a variety of types of sensors to sense the various types of physical conditions. Sensor types include, but are not limited to, capacitor sensors, inductive sensors, accelerometers, piezoelectric sensors, light sensors, magnetic field sensors, ultrasonic sensors, temperature sensors, infrared (IR) sensors, touch sensors, proximity sensors, pressure sensors, level sensors, smoke sensors, and gas sensors.

The various types of sensors have a variety of sensor characteristics that are factors in providing power to the sensors, receiving signals from the sensors, and/or interpreting the signals from the sensors. The sensor characteristics include resistance, reactance, power requirements, sensitivity, range, stability, repeatability, linearity, error, response time, and/or frequency response. For example, the resistance, reactance, and/or power requirements are factors in determining drive circuit requirements. As another example, sensitivity, stability, and/or linear are factors for interpreting the measure of the physical condition based on the received electrical and/or optical signal (e.g., measure of temperature, pressure, etc.).

When sensing functionality is desired, the IO control module 18 provides configuration instructions to one or more programmable IO interface modules 16 to configure the one or more programmable IO interface modules 16 such that the pins 14 operate as concurrent drive & sense interfaces in order to communicate sensed data from the sensors 25 to other components of the IC 10 (e.g., the processing core). One or more additional pins 14 may be configured for a variety of other functions (e.g., an output for processed and/or sensed information, etc.).

As an example, a concurrent drive & sense interface provides a drive signal to a sensor 25. An electrical characteristic of the sensor 25 affects the drive signal, which is reflective of the condition that sensor is sensing. A signal representative of the effect on the drive signal as a result of the electrical characteristics of the sensors is determined and communicated to other components of the IC 10 as sensed data. The signal representative of the effect may be an analog signal or a digital signal. The concurrent drive & sense interface adjusts the drive signal based on the signal representative of the effect. The concurrent drive & sense configuration is discussed in more detail with reference to FIGS. 12, 13, 30, and 31.

The processing core of the IC 10 may then interpret the signal representative of the effect to determine a sensed condition. The sensed condition may be provided to an output configured pin where the data can be shared with another device. Alternatively or in addition to, the signals representative of the effect and/or the sensed conditions are stored in the memory of the IC 10.

In FIG. 1B, the pins 14 of the IC are configured for connection to a plurality of actuators 33. The pins 12 receive interrupt signals 15 and clock signals 17-19 as discussed with reference to FIG. 1. An actuator 33 converts an electrical input into a physical output. The physical output of an actuator may be one of a variety of physical output conditions. For example, the physical output condition includes one or more of, but is not limited to, acoustic waves (e.g., amplitude, phase, polarization, spectrum, and/or wave velocity); a magnetic condition (e.g., flux, permeability, magnetic field, which amplitude, phase, and/or polarization); a thermal condition (e.g., temperature, flux, specific heat, thermal conductivity, etc.); and a mechanical condition (e.g., position, velocity, acceleration, force, strain, stress, pressure, torque, etc.). As an example, a piezoelectric actuator converts voltage into force or pressure. As another example, a speaker converts electrical signals into audible acoustic waves.

An actuator 33 may be one of a variety of actuators. For example, an actuator 33 is one of a comb drive, a digital micro-mirror device, an electric motor, an electroactive polymer, a hydraulic cylinder, a piezoelectric actuator, a pneumatic actuator, a screw jack, a servomechanism, a solenoid, a stepper motor, a shape-memory allow, a thermal bimorph, and a hydraulic actuator.

The various types of actuators have a variety of actuators characteristics that are factors in providing power to the actuator and sending signals to the actuators for desired performance. The actuator characteristics include resistance, reactance, power requirements, sensitivity, range, stability, repeatability, linearity, error, response time, and/or frequency response. For example, the resistance, reactance, and power requirements are factors in determining drive circuit requirements. As another example, sensitivity, stability, and/or linear are factors for generating the signaling to send to the actuator to obtain the desired physical output condition.

When connection to a plurality of actuators 33 is desired, the IO control module 18 provides configuration instructions to one or more programmable IO interface modules 16 to configure the one or more programmable IO interface modules 16 such that the pins 14 operate as output drivers for driving power to the actuators 33. One or more additional pins 14 may be configured for a variety of other functions (e.g., an output for connection to another computing device, etc.). The output driver configuration is discussed in more detail with reference to FIGS. 8, 28, and 29.

In FIG. 1C, the pins 14 of the IC 10 are configured for communication with a computing device 45. The pins 12 receive interrupt signals 15 and clock signals 17-19 as discussed with reference to FIG. 1. The computing device 45 may be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment.

When a communication connection to a computing device 45 is desired, the IO control module 18 provides configuration instructions to one or more programmable IO interface modules 16 to configure the one or more programmable IO interface modules 16 such that the pins 14 operate as the pins 14 as concurrent transmit-receive (TX-RX) interfaces (analog or digital) for communication with the computing device 45 and in accordance with a communication protocol. One or more additional pins 14 may be configured for a variety of other functions. The concurrent TX-RX configuration will be discussed in greater detail with reference to FIGS. 14, 15, 32 and 33.

Figure 2:
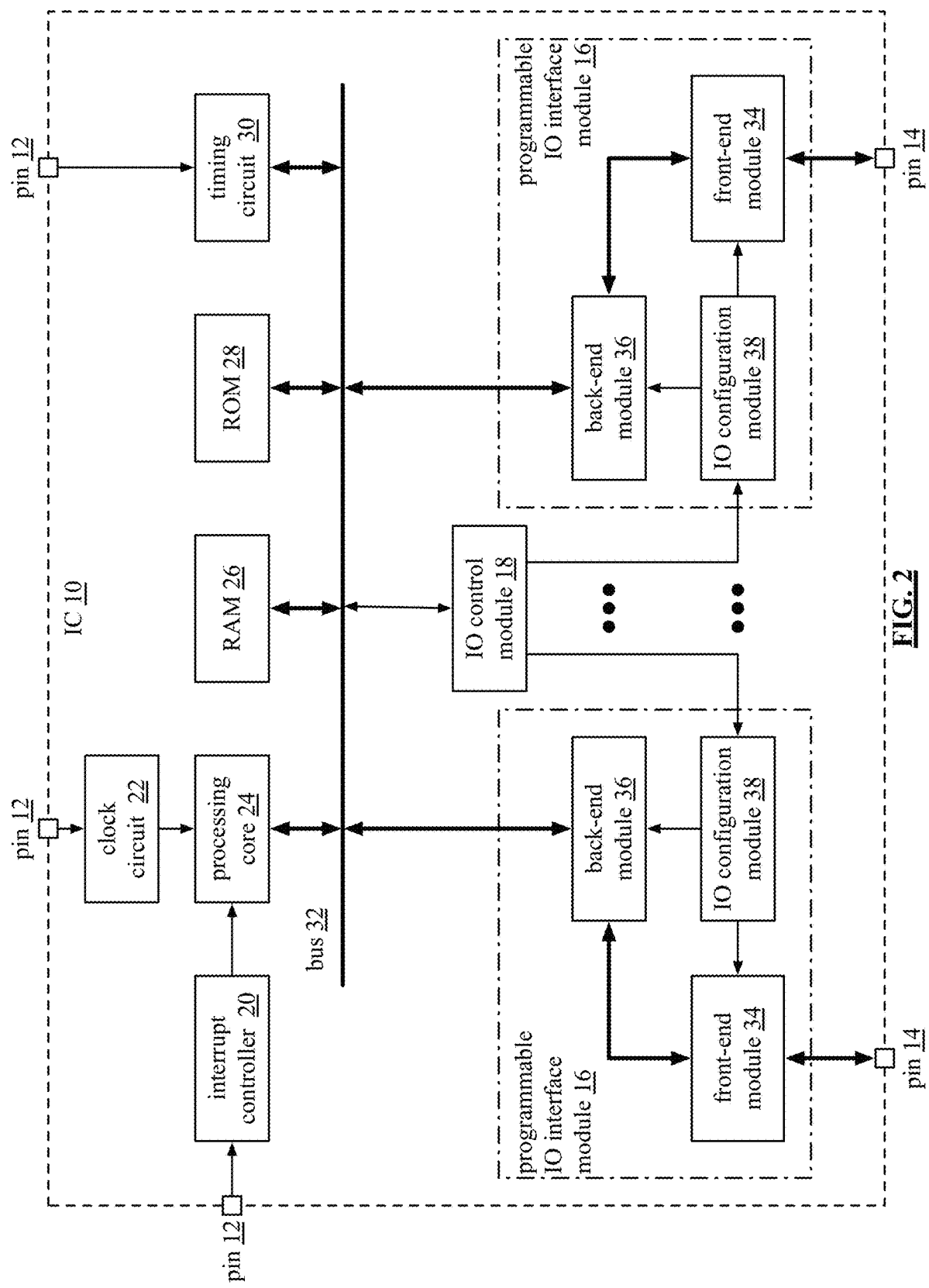
FIG. 2 is a schematic block diagram of another embodiment of an integrated circuit (IC) in accordance with the present invention.

FIG. 2 is a schematic block diagram of another embodiment of an integrated circuit (IC) 10 that includes the plurality of pins 12-14, the plurality of programmable input/output (IO) interface modules 16, the IO control module 18, the interrupt controller 20, the clock circuit 22, the processing core 24, the random access memory (RAM) 26, the read-only memory (ROM) 28, and the timing circuit 30.

The IC 10 of FIG. 2 operates similarly to the IC 10 of FIG. 1 and depicts the programmable IO interface modules 16 in more detail. Each of the programmable IO interface modules 16 includes a front-end module 34, a back-end module 36, and an IO configuration module 38. The IO control module 18 receives configuration instructions from on-chip (e.g., via the processing core 24) or off-chip regarding a desired IC 10 function. The desired IC function specifies the desired functions for the pins 14.

The IO control module 18 provides the configuration instructions to the IO configuration modules 38 of the programmable IO interface modules 16. The IO configuration modules 38 provides the configuration instructions to the front-end modules 34 and the back-end modules 36 of each of the programmable IO interface modules 16 where the configuration instructions configure the front-end modules 34 and the back-end modules 36 such that the pins 14 operate according to the desired functions.

The front-end modules 34 are configured with respect to interfacing between the pin 14 and the back-end module 36 and the back-end modules 36 are configured with respect to interfacing with the front-end module 34 and the bus 32.

FIG. 3 is a schematic block diagram of an embodiment of a programmable input/output (IO) interface module 16 that includes the front-end module 34, the back-end module 36, and the input/output (IO) configuration module 38.

The front-end module 34 includes a configurable drive-sense circuit (DSC) 40 and a DSC signaling circuit 42. The IO configuration module 38 receives configuration instructions (e.g., configuration data 46) regarding programming pin 14 for a particular function from the IO control module 18. The IO configuration module 38 generates configuration data_1 through configuration data_3 from the configuration data 46. The configuration data_1 includes instructions for configuring the back-end module 36, the configuration data_2 includes instructions for configuring the configurable DSC 40, and the configuration data_3 instructs the DSC signaling circuit 42 to generate signaling for the configurable DSC 40 (when applicable).

The IO configuration module 38 provides the configuration data_1 to the back-end module 36, the configuration data_2 to the configurable DSC 40, and the configuration data_3 to the DSC signaling circuit 42. The DSC signaling circuit 42 provides signals to the configurable DSC 40 when applicable for the configured function.

The configurable DSC 40 is configured based on the configuration data_2 and interfaces with the pin 14. The configurable DSC 40 includes components that are configurable in a variety of different ways. For example, the configurable DSC 40 is configurable as an output driver, an inverting operational amplifier (op-amp), a non-inverting op-amp, an IO front-end circuit 1 (a concurrent drive & sense circuit), an IO front-end circuit 2 (a concurrent transmit-receive circuit), a bidirectional switch, a differential op-amp, and a voltage output. The configurations of the configurable DSC circuit are discussed in further detail with reference to FIGS. 7-39.

The back-end module 36 is configured based on the configuration data_1 and interfaces with the bus. The back-end module 36 is configurable as one or more of: an inverter, an analog to digital converter (ADC), a digital filter, a digital to analog converter (DAC), a gain circuit, a level shift circuit, a TX-RX data formatting circuit, a bidirectional switch, a buffer, a delay circuit, and differential op-amp.

The back-end module 36 is configured based on one or more of: a desired data format (e.g., the front-end produces an analog signal from a pin input and a digital input is needed for the bus 32), a configuration of the front-end module, compatibility of the programmable IO interface module with other components of the integrated circuit, and data synchronization of the integrated circuit (IC) 10. The configuration of the back-end module 36 is discussed in further detail with reference to FIGS. 7-45.

When data is received from the pin 14, the configurable DSC 40 processes the data in accordance with its configured function. The processed data from the configurable DSC 40 is provided to the back-end module 36 where the back-end module 36 is operable to further process the data in accordance with its configured function (e.g., delay, buffer, etc.) and send the data to the bus as data_in 48. For example, the back-end module 36 provides the data_in 48 to the processing core 24 via the bus for further processing.

When data is being sent to the pin 14, the back-end module 36 receives data_out 50 from another component of the IC 10 (e.g., the processing core 24, RAM 26, etc.) via the bus 32 and processes the data_out 50 in accordance with its configured function. The back-end module 36 provides the data_out 50 to the configurable DSC 40. The configurable DSC 40 processes the data_out 50 in accordance with its configured function and provides the processed data to pin 14.

FIG. 4 is a schematic block diagram of an embodiment of a configurable drive-sense circuit (DSC) 40 coupled to a pin 14. The configurable drive sense circuit 40 includes a change detection circuit 52, a regulation circuit 54, and a power source circuit 56. The change detection circuit 52, the regulation circuit 54, and the power source circuit 56 operate in concert to keep the inputs of the change detection circuit 52 substantially matching (e.g., voltage to substantially match, current to substantially match, impedance to substantially match).

The change detection circuit 52 may be implemented with an operational amplifier, the power source circuit 56 may be implemented with a dependent current source, and the regulation circuit may be implemented with a feedback circuit. The inputs to the change detection circuit 52 include outbound data 62 and a transmit (TX) signal 58 to the pin 14. The TX signal 58 is created by adjusting the operation of the change detection circuit 52, the regulation circuit 54, and the power source circuit 56 to match the outbound data 62.

FIG. 5 is a schematic block diagram of another embodiment of a configurable drive-sense circuit (DSC) coupled to a pin 14. The configurable drive sense circuit 40 includes the change detection circuit 52, the regulation circuit 54, and the power source circuit 56. The change detection circuit 52, the regulation circuit 54, and the power source circuit 56 function as discussed with reference to FIG. 4 in concert to keep the inputs of the change detection circuit 52 substantially matching.

In this embodiment, however, the inputs to the change detection circuit 52 is a receive (RX) signal 68 and a reference signal 64. With the presence of the RX signal 68, the output of the change detection circuit 52 will vary based on the RX signal 68, which produces the inbound data 66. The regulation circuit 54 converts the inbound data 66 into a regulation signal 60. The power source circuit 56 adjusts the generation of its output (e.g., a regulated voltage or a regulated current) based on the regulation signal 60 to keep the inputs of the change detection circuit 52 substantially matching.

FIG. 6 is a schematic block diagram of another embodiment of a configurable drive-sense circuit (DSC) coupled to a pin 14. The configurable drive sense circuit 40 includes the change detection circuit 52, the regulation circuit 54, and the power source circuit 56. The change detection circuit 52, the regulation circuit 54, and the power source circuit 56 function as discussed with reference to FIGS. 4-5 to keep the inputs of the change detection circuit 52 substantially matching.

In this embodiment, however, the inputs to the change detection circuit 52 include the outbound data 62, the receive (RX) signal 68, and the transmit (TX) signal 58. The TX signal 58 is created by adjusting the operation of the change detection circuit 52, the regulation circuit 54, and the power source circuit 56 to match the outbound data 62.

With the presence of the RX signal 68, the output of the change detection circuit 52 will vary based on the RX signal 68, which produces the inbound data 66. The regulation circuit 54 converts the inbound data 66 into a regulation signal 60. The power source circuit 56 adjusts the generation of its output (e.g., a regulated voltage or a regulated current) based on the regulation signal 60 to keep the inputs of the change detection circuit 52 substantially matching. As such, the configurable drive-sense circuit 40 is operable to transmit data as shown in FIG. 4, to receive data as shown in FIG. 5, and/or concurrently transmit and receive data as shown here.

Figure 7:
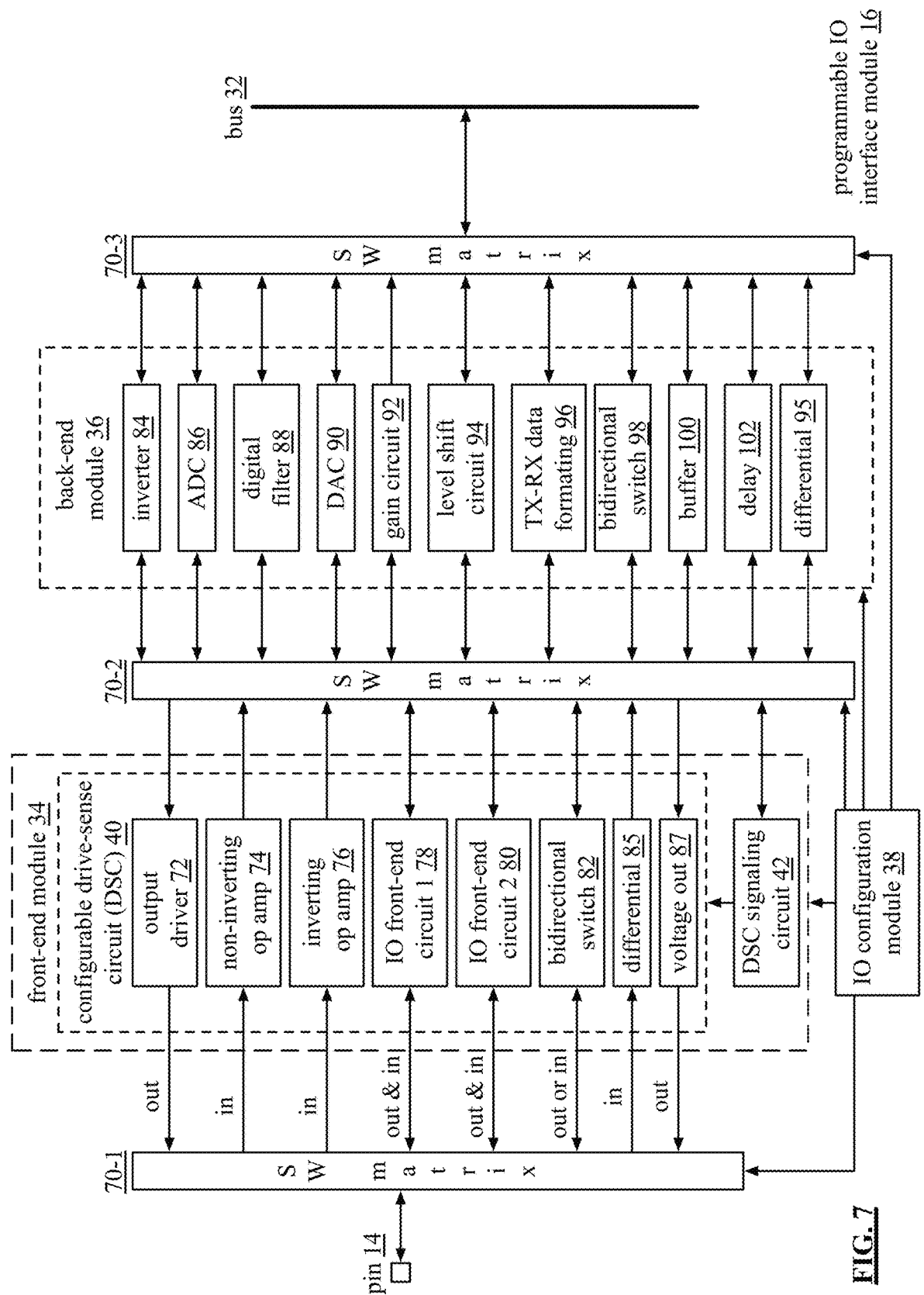
FIG. 7 is a schematic block diagram of another embodiment of a programmable input/output (IO) interface module in accordance with the present invention.

FIG. 7 is a schematic block diagram of another embodiment of a programmable input/output (IO) interface module 16 coupled to a pin 14 and the bus 32. The programmable IO interface module 16 includes the front-end module 34, the back-end module 36, the IO configuration module 38, and switching matrices 70-1 through 70-3.

The front-end module 34 includes the configurable drive-sense circuit (DSC) 40 and the DSC signaling circuit 42. The configurable DSC circuit 40 is configurable as an output driver 72, a non-inverting operational amplifier (op-amp) 74, an inverting op-amp 76, an IO front-end circuit 1 (e.g., a concurrent drive & sense circuit), an IO front-end circuit 2 80 (e.g., a concurrent transmit-receive (TX-RX) circuit), a bidirectional switch 82, a differential op-amp 95 (e.g., where the input would need to include another pin 14), and a voltage output 87. The configurations of the configurable DSC circuit 40 are discussed in more detail with reference to FIGS. 8-39.

The back-end module 36 is configurable as one or more of: an inverter 84, an analog to digital converter (ADC) 86, a digital filter 88, a digital to analog converter (DAC) 90, a gain circuit 92, a level shift circuit 94, a transmit-receive (TX-RX) data formatting circuit 96, a bidirectional switch 98, a buffer 100, a delay circuit 102, and a differential op-amp 95. The back-end module 36 may include a plurality of each of the above components.

The inverter 84 may be implemented with a unity gain inverting op-amp. The ADC 86 may be implemented in a variety of ways. For example, the (ADC) is one of: a flash ADC, a successive approximation ADC, a ramp-compare ADC, a Wilkinson ADC, an integrating ADC, a delta encoded ADC, and/or a sigma-delta ADC.

The digital filter 88 may be a bandpass digital filter, a low pass digital filter, a high pass digital filter or a notch digital filter and may be implemented with a cascaded integrated comb (CIC) filter, a finite impulse response (FIR) filter, an infinite impulse response (IIR) filter, a Butterworth filter, a Chebyshev filter, an elliptic filter, etc. An example of the back-end module 36 as a bandpass digital filter is discussed with reference to FIGS. 40-42.

The gain circuit 92 may be implemented by a non-inverting op-amp having a desired gain. The DAC 90 may be a sigma-delta DAC, a pulse width modulator DAC, a binary weighted DAC, a successive approximation DAC, and/or a thermometer-coded DAC.

The level shift circuit 94 translates signals from one logic level or voltage domain to another allowing compatibility between components with different voltage requirements. The level shift circuit 94 may be implemented by cascaded and differentially switched complimentary metal-oxide semiconductor (CMOS) transistors, by a non-inverting op-amp level shifter, etc.

The TX-RX data formatting circuit 96 is operable to format TX-RX signals in accordance with a data communication protocol. For example, the TX-RX data formatting circuit 96 may format digital data into data packets for a packetized data transmission based on the data communication protocol. In another example, the TX-RX data formatting circuit 96 modulates digital data with an analog carrier signal for transmitting/receiving via a modulated radio frequency (RF) signal. An example of the back-end module 36 as the TX-RX data formatting circuit 96 is discussed with reference to FIGS. 43-45.

The bidirectional switch 98 is operable to allow current to flow in one direction or another thus allowing input or output depending on control signaling. The bidirectional switch 98 may be implemented by a complementary metal oxide semi-conductor (CMOS) transmission gate (e.g., a p-channel metal oxide semiconductor field effect transistor (MOSFET) or simply, PMOS, connected to a n-channel MOSFET or simply, NMOS, in parallel). The bidirectional switch 98 is discussed in more detail with reference to the configurable DSC circuit configuration of the bidirectional switch in FIG. 11.

The buffer 100 buffers an input from its output while providing an electrical impedance transformation. The buffer 100 may be implemented by a non-inverting op-amp unity gain buffer, a single transistor circuit (e.g., a voltage follower), etc. A buffer has a very high input impedance and a low output impedance level allowing for circuits to be connected without impedance problems.

Further, buffers allow for input/output control to and/or from the switching matrices 70-2 through 70-3 and the bus 32. For example, the buffer allows for temporary storage of data in order to provide data to the bus 32 with the correct input/output timing. The buffer also allows for data to be fed back to multiple circuit elements of the back-end module. For example, data goes through the ADC 86 to the buffer 100 and the buffer 100 feeds the data to the digital filter 88.

The delay circuit 102 may be implemented using a timer circuit and assists in the correct timing of sending and receiving data between the back-end module and the front-end module and the back-end module and the bus. The differential 95 may be a differential op-amp for comparing inputs from two front-end modules 34 (e.g., from two pins 14). The differential 95 is discussed in more detail with reference to FIG. 18.

The back-end module 36 is configurable for a function or a combination of functions depending on one or more of: a desired data format for data going out or coming into the back-end module 36, the configuration of the front-end module, data synchronization, and compatibility of the programmable IO interface module 16 with other integrated circuit components. For example, if the front-end module 34 sends an analog output to the back-end module 36 but the desired data output to the bus 32 is digital data, the back-end module 36 may be configured as the ADC 86 and the digital filter 88, the ADC 86 and the buffer 100, etc.

The switching matrices 70-1 through 70-3 each include a plurality of switches (e.g., diodes, transistors, etc.) to enable and/or disable the inputs and outputs of various configurations of the front-end module 34 and the back-end module 36 based on configuration data from the IO control module 18. The switching matrix 70-1 controls inputs and outputs between the pin 14 and the configurable DSC 40. The switching matrix 70-2 controls inputs and outputs between the configurable DSC 40 and the back-end module 36 and between the DSC signaling circuit 42 and the back-end module 36. The switching matrix 70-3 controls inputs and outputs between the back-end module 36 and the bus 32.

In an example of operation, the IO configuration module 38 sends configuration data to the switching matrices 70-1 through 70-3, the front-end module 34, and the back-end module 36 based on a desired functionality of the pin 14. For example, the IO configuration module 38 sends configuration data to the front-end module 34 regarding a desired configuration of the configurable DSC 40 to achieve the desired functionality of the pin 14 and the appropriate signaling instructions for the desired configuration when necessary (via the DSC signaling circuit 42). The IO configuration module 38 instructs the switching matrices 70-1 and 70-2 to open and/or close switches regarding the selected configuration of the front-end module 34.

Similarly, the IO configuration module 38 sends configuration data to the back-end module 36 regarding how to configure the back-end module 36 to achieve the desired functionality of the IC 10. The IO configuration module 38 instructs the switching matrices 70-2 and 70-3 to open and/or close switches regarding the selected configuration of the back-end module 36.

As an example, an overall desired IC 10 function may require non-inverting inputs to the IC 10. For the pin 14, the IO configuration module 38 directs the configurable DSC 40 to be configured as the non-inverting op-amp 74. The IO configuration module 38 directs the switch in the switching matrix 70-1 from the pin 14 to the non-inverting op-amp 74 configuration of the configurable DSC 40 to be closed and other switches of the switching matrix 70-1 to be open. The IO configuration module 38 further directs the switch in the switching matrix 70-2 from the non-inverting op-amp 74 output to be closed.

With the pin 14 is configured as a non-inverting input, the back-end module 36 could be implemented in a variety of ways based on the desired output to the bus 32. In an example, the IO configuration module 38 sends configuration data to the back-end module 36 to enable the gain circuit 92 and the buffer 100. The IO configuration module 38 instructs the switching matrices 70-2 and 70-3 to close switches for the input and outputs of the gain circuit 92 and the buffer 100 at desired times (e.g., data from the front-end module is provided to the input of the gain circuit 92 then to the buffer 100 and then to the bus).

Figure 8:
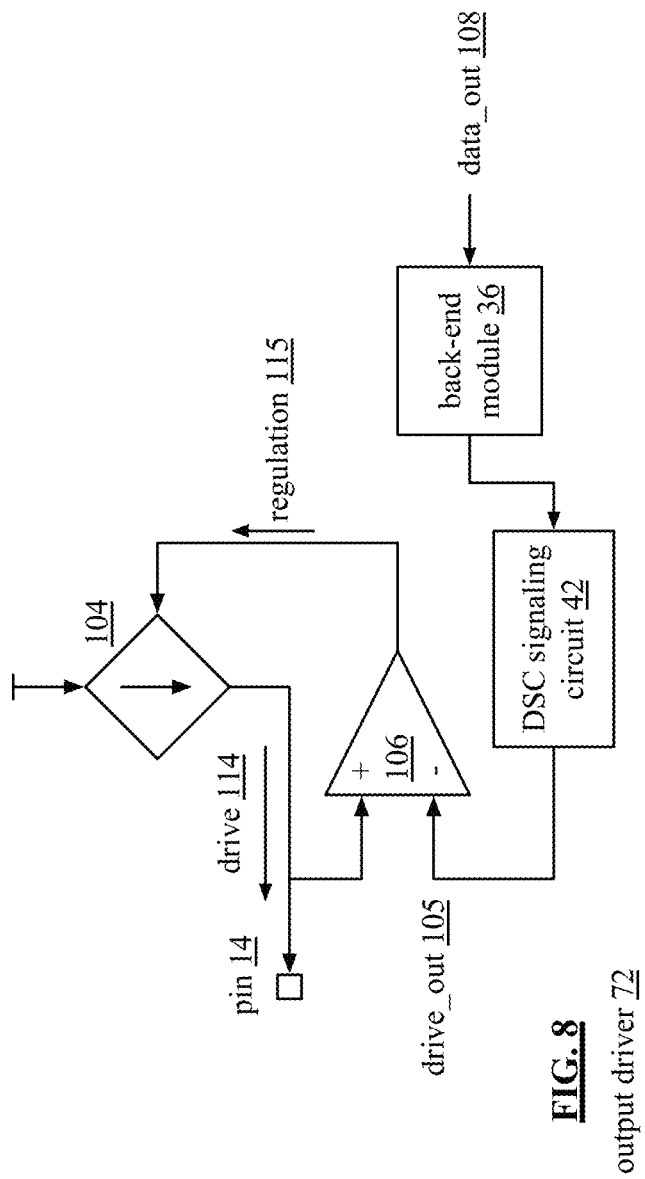
FIG. 8 is a schematic block diagram of an embodiment of an output driver configuration of a configurable drive-sense circuit (DSC) in accordance with the present invention.

FIG. 8 is a schematic block diagram of an embodiment of an output driver 72 configuration of a configurable drive-sense circuit (DSC) coupled to a pin 14, the DSC signaling circuit 42, and the back-end module 36. The back-end module 36 may be a bidirectional switch, a buffer, a digital to analog converter (DAC), a level shift circuit, and/or a combination thereof depending on one or more of: a desired data format for data_out 108, data synchronization of data_out 108, and compatibility of the output driver 72 with other integrated circuit components. The output driver 72 may be digital or analog.

The output driver 72 includes a dependent current source 104 and an operational amplifier (op-amp) 106. The dependent current source 104 may be implemented in a variety of ways. For example, the dependent current source 104 is a current mirror circuit sourced via a DC input voltage to produce a drive 114 signal to the pin 14 based on a regulation 115 signal generated at the output of the op-amp 106. As another example, the dependent current source 104 is a voltage controlled current source. As yet another example, the dependent current source 104 is a current controlled current source.

The back-end module 36 receives data_out 108 (e.g., from another component of the IC via the bus) and processes it in accordance with its configured function (e.g., bidirectional switch, buffer, a digital to analog conversion, level shift, and/or a combination thereof). The back-end module 36 sends the processed data_out 108 to the DSC signaling circuit 42 where the DSC signaling circuit 42 may further process the data_out 108 to produce a drive_out 105 signal. For example, the DSC signaling circuit 42 modulates the data_out 108 to produce the drive_out 105 signal. The DSC signaling circuit 42 sends the processed data_out 108 as a drive_out 105 reference signal to the op-amp 106.

The op-amp 106 compares the drive_out 105 signal with the drive 114 signal produced by the dependent current source 104 to produce the regulation signal 115 at the output of the op-amp 106. The dependent current source 104 adjusts the drive signal 114 based on the regulation signal 115. Thus, the output driver 72 configuration is a control loop that regulates the drive signal 114 to the pin 14 to substantially match the drive_out 105 signal. The output driver 72 can be used to drive an actuator (e.g., as in the example of FIG. 1B) and/or any other device requiring a particular voltage and/or current level control for operation.

Figure 9:
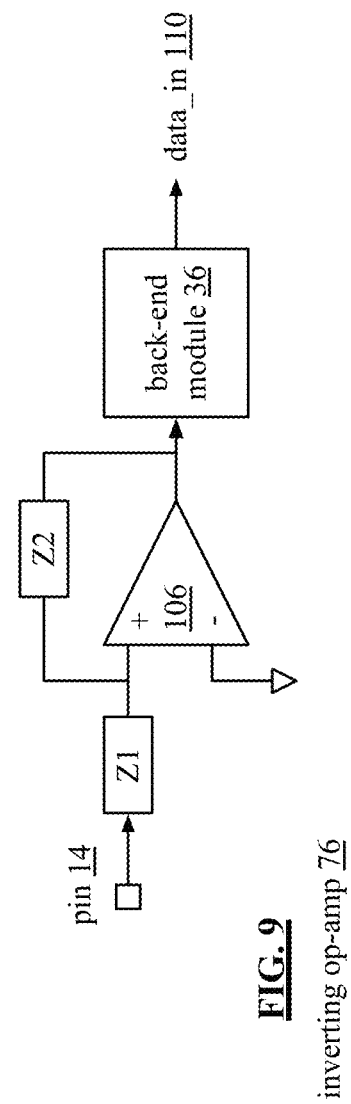
FIG. 9 is a schematic block diagram of an embodiment of an inverting operational amplifier (op-amp) configuration of a configurable drive-sense circuit (DSC) in accordance with the present invention.

FIG. 9 is a schematic block diagram of an embodiment of an inverting operational amplifier (op-amp) 76 configuration of a configurable drive-sense circuit (DSC) coupled to a pin 14 and the back-end module 36. The back-end module 36 may be a bidirectional switch, a buffer, a digital to analog converter (DAC), a level shift circuit, and/or a combination thereof depending on one or more of: a desired data format for data_in 110, data synchronization of data_in 110, and compatibility of the inverting op-amp 76 with other integrated circuit components.

The inverting op-amp 76 includes an op-amp 106 with one terminal connected to ground and the other terminal connected to the pin 14 through an input impedance Z1. A feedback impedance Z2 is connected to the input terminal of the op-amp 106 and the output of the op-amp 106. The input impedance Z1 and the feedback impedance Z2 are typically implemented with resistors.

For an ideal op-amp, no current flows into the input terminal and the differential input voltage is zero. As such, the junction of the input and the feedback signal (e.g., V2) creates a virtual earth node. The current input from the pin to the output of the op-amp 106 is given by the equations i=(Vin−Vout)/(Z1+Z2) and i=(Vin−V2)/(Z1)=(V2−Vout)/Z2, where Vin is the voltage at the pin 14. Therefore, the closed loop voltage gain of an inverting op-amp is given as −Z2/Z1, where the values of Z1 and Z2 set the gain of the inverting op-amp 76.

For a unity gain, the impedance of Z1 should be set equal to the impedance of Z2. The output of the op-amp 106 (e.g., Vout) is provided to the back-end module 36, where the back-end module 36 processes it in accordance with its configured function (e.g., bidirectional switch, buffer, a digital to analog conversion, level shift, and/or a combination thereof) to produce and/or transfer the output as data_in 110.

Figure 10:
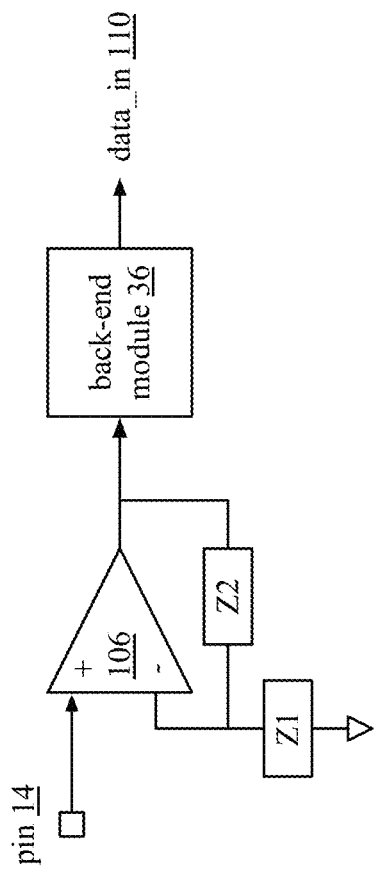
FIG. 10 is a schematic block diagram of an embodiment of a non-inverting operational amplifier (op-amp) configuration of a configurable drive-sense circuit (DSC) in accordance with the present invention.

FIG. 10 is a schematic block diagram of an embodiment of a non-inverting operational amplifier (op-amp) 74 configuration of a configurable drive-sense circuit (DSC) coupled to a pin 14 and the back-end module 36. The back-end module 36 may be a bidirectional switch, a buffer, a digital to analog converter (DAC), a level shift circuit, and/or a combination thereof depending on one or more of: a desired data format for data_in 110, data synchronization of data_in 110, and compatibility of the non-inverting op-amp 74 with other integrated circuit components.

The non-inverting op-amp 74 includes an op-amp 106 where one terminal is connected to the pin 14 and another terminal is connected to ground through impedance Z1 and to a feedback impedance Z2. The feedback impedance Z2 is also connected to the output of the op-amp 106. The output of the op-amp 106 is provided to the back-end module 36. The impedance Z1 and the feedback impedance Z2 are typically implemented with resistors.

As discussed with reference to FIG. 9, for an ideal op-amp, no current flows into the input terminal and the differential input voltage is zero. As such, the junction of the input and the feedback signal (e.g., V1) creates a virtual earth node. Because of this virtual earth node, the resistors Z2 and Z1 form a simple potential divider network across the non-inverting amplifier with the voltage gain of the circuit being determined by the ratios of Z1 and Z2.

For example, V1=(Z1/(Z1+Z2))*Vout, where V1(virtual earth node)=Vin (the input at the pin 14) and Vout is the output of the op-amp 106. Voltage gain is equal to Vout/Vin thus, Vout/Vin=(Z1+Z2)/Z1 and the gain of the non-inverting op-amp is equal to 1+(Z2/Z1). For a unity gain, the impedance of Z2 should be set equal to zero. The output of the op-amp 106 is provided to the back-end module 36, where the back-end module 36 processes it in accordance with its configured function (e.g., bidirectional switch, buffer, a digital to analog conversion, level shift, and/or a combination thereof) to produce and/or to transfer the output as the data_in 110.

Figure 11:
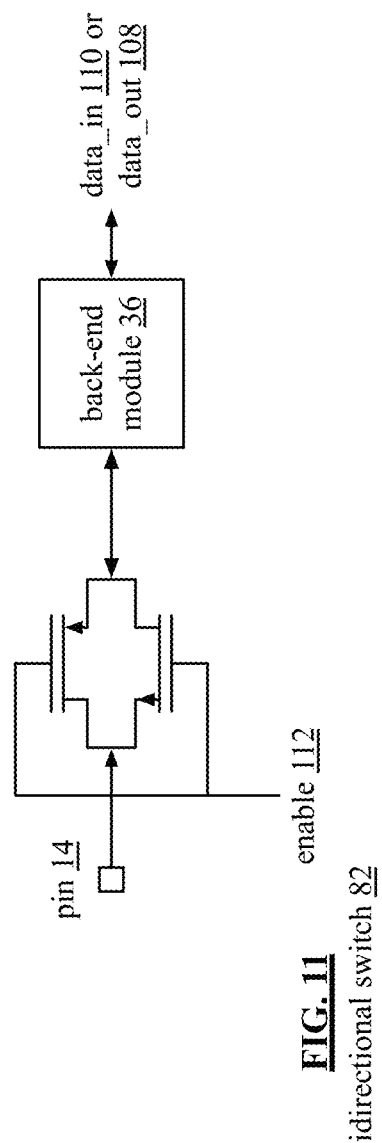
FIG. 11 is a schematic block diagram of an embodiment of a bidirectional switch configuration of a configurable drive-sense circuit (DSC) in accordance with the present invention.

FIG. 11 is a schematic block diagram of an embodiment of a bidirectional switch 82 configuration of a configurable drive-sense circuit (DSC) coupled to a pin 14 and the back-end module 36. The back-end module 36 may be a bidirectional switch, a buffer, a digital to analog converter (DAC), a level shift circuit, and/or a combination thereof depending on one or more of: a desired data format for data-out 108 or data_in 110, data synchronization of data-out 108 or data_in 110, and compatibility of the bidirectional switch 82 with other integrated circuit components.

The bidirectional switch 82 includes a p-channel field effect transistor (e.g., a p-channel metal oxide semiconductor field effect transistor (MOSFET) or simply, PMOS) with its source terminal connected to the pin 14 and its drain terminal connected to the back-end module 36 and an n-channel field effect transistor (e.g., an n-channel metal oxide semiconductor field effect transistor (MOSFET) or simply, NMOS) with its drain terminal connected to the pin 14 and its source terminal connected to the back-end module 36 (e.g., the NMOS and PMOS are connected in parallel). This configuration is referred to as a complementary metal oxide semi-conductor (CMOS) transmission gate.

In an enhancement mode MOSFET (e.g., a MOSFET that is normally "off" or non-conducting when the gate bias voltage (Vgs) is zero), an NMOS drain current (e.g., current from the pin 14 to the back-end module 36) will flow when a positive voltage is applied to its drain terminal (at the pin 14) and a positive voltage is applied to its gate terminal greater than a threshold voltage. With a PMOS, drain current (e.g., current from the back-end module 36 to the pin 14) will flow when a positive voltage is applied to its source terminal (at the back-end module 36) and a negative voltage greater than a threshold voltage is applied to its gate terminal.

As such, when the NMOS is on, the drain current flows from the pin 14 to the back-end module 36 such that the pin 14 operates as an input. The back-end module 36 processes data from the pin 14 accordance with its configured function (e.g., bidirectional switch, buffer, a digital to analog conversion, level shift, and/or a combination thereof) to produce the data_in 110.

When the PMOS is on, the drain current flows from the back-end module 36 to the pin 14 such that the pin 14 operates as an output. The back-end module 36 receives data_out 108, processes it in accordance with its configured function (e.g., bidirectional switch, buffer, a digital to analog conversion, an analog to digital conversion, level shift, and/or a combination thereof), and passes it through to the pin 14.

An enable 112 signal (e.g., via the DSC signaling circuit) is provided to the gate terminals of the NMOS and PMOS to control whether the transistors are on or off. With a high enable signal, the NMOS is on and the PMOS is off allowing the current to flow from the pin 14 to the back-end module 36 and thus allowing input from the pin 14. With a low enable signal, the PMOS is on and the NMOS is off allowing the current to flow from the back-end module 36 to the pin 14 and thus allowing output to the pin 14.

Figure 12:
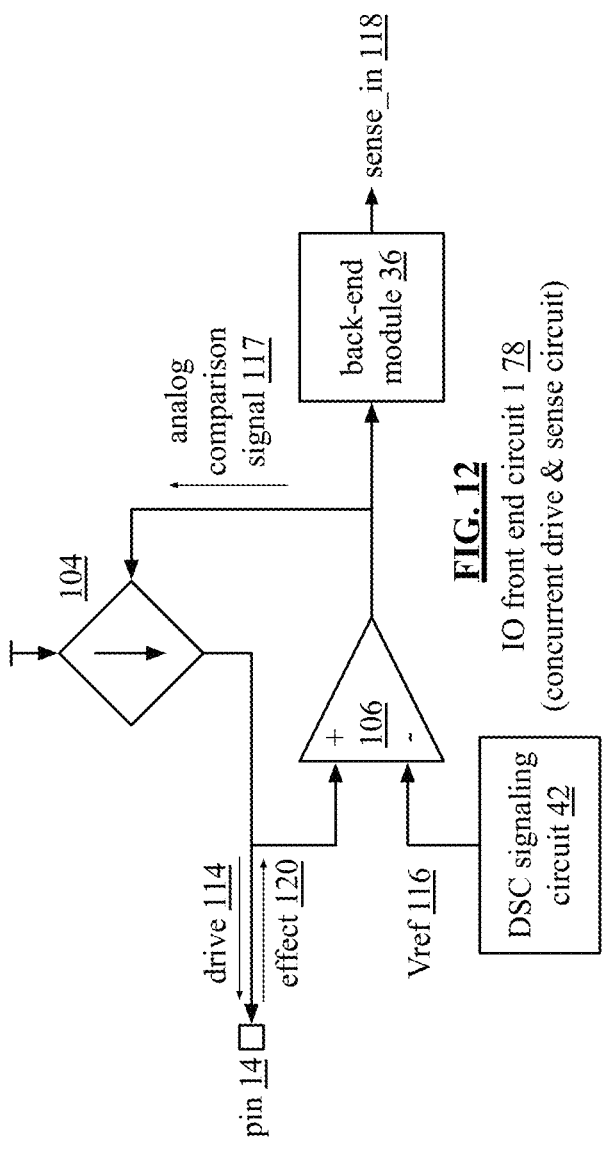
FIG. 12 is a schematic block diagram of an embodiment of an input/output (IO) front-end circuit 1 configuration of a configurable drive-sense circuit (DSC) in accordance with the present invention.

FIG. 12 is a schematic block diagram of an embodiment of an input/output (IO) front-end circuit 1 78 (e.g., concurrent drive & sense circuit) configuration of a configurable drive-sense circuit (DSC) coupled to a pin 14, the DSC signaling circuit 42, and the back-end module 36. The back-end module 36 may be a bidirectional switch circuit, a buffer, an analog to digital converter (ADC), digital filter, a gain circuit, and/or a combination thereof depending on one or more of: a desired data format for sense_in 118 (e.g., sensed data from the pin 14), data synchronization of sense_in 118, and compatibility of the IO front-end circuit 1 78 with other integrated circuit components.

The IO front-end circuit 1 78 includes a dependent current source 104 and an operational amplifier (op-amp) 106. The dependent current source 104 may be implemented in a variety of ways. For example, the dependent current source 104 is a current mirror circuit sourced via a DC input voltage to produce a drive 114 signal to the pin 14 based on an analog comparison signal 117 at the output of the op-amp 106. As another example, the dependent current source 104 is a voltage controlled current source. As yet another example, the dependent current source 104 is a current controlled current source.

The DSC signaling circuit 42 generates and provides a voltage reference (Vref) 116 signal to the op-amp 106 where Vref includes an a DC component and an oscillating component. As such, the analog comparison signal 117 will have a substantially matching DC component and oscillating component as Vref 116. The voltage reference signal Vref 116 is described in greater detail with reference to FIG. 13.

When the drive signal 114 is provided to a sensor connected to the pin 14 and the sensor is exposed to a condition, an electrical characteristic of the sensor will affect the drive signal 114. The effect on the drive signal 114 is referred to as the effect 120. The op-amp 106 compares the effect 120 with Vref 116 to produce the analog comparison signal 117 at the output of the op-amp 106. The dependent current source 104 generates the drive 114 signal based on the analog comparison signal 117. Therefore, the control loop that regulates the drive 114 signal to substantially match the reference signal Vref 116 will adjust the analog comparison signal 117 to compensate for the effects the sensor has on the drive 114 signal. As such, the analog comparison signal 117 is representative of sensed data from the pin 14.

The analog comparison signal 117 is provided to the back-end module 36, where the back-end module 36 processes it in accordance with its configured function to produce and/or to transfer the analog comparison signal 117 as sense_in 118. For example, when the desired format of the sense_in 118 data is digital, the back-end module 36 includes an ADC function where the back-end module 36 converts the analog comparison signal 117 to a digital sense_in 118 signal.

Figure 13:
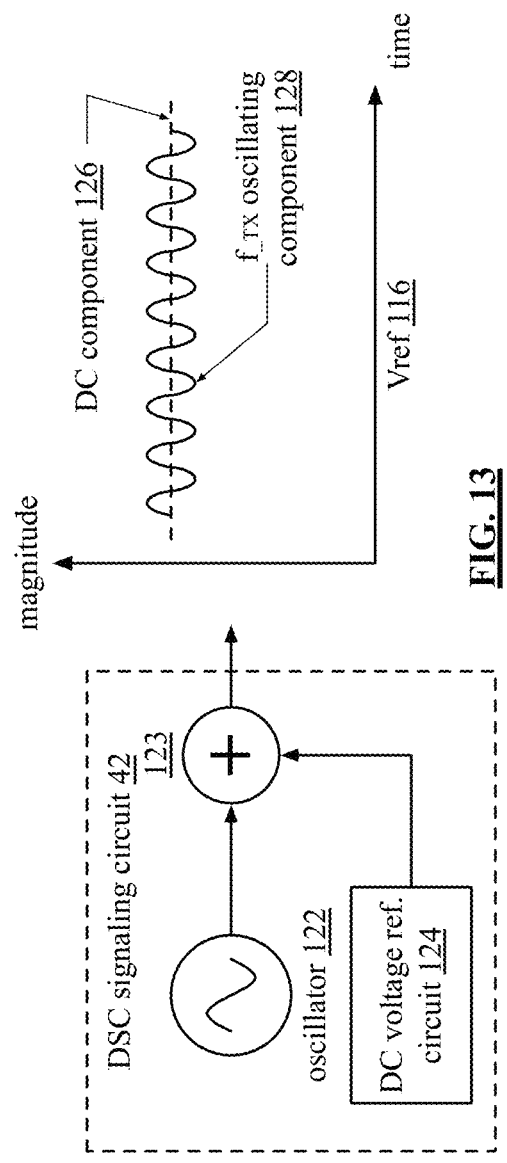
FIG. 13 is a schematic block diagram of an embodiment of a drive-sense circuit (DSC) signaling circuit in accordance with the present invention.

FIG. 13 is a schematic block diagram of an embodiment of a drive-sense circuit (DSC) signaling circuit 42 that includes a direct current (DC) voltage reference circuit 124, an oscillator 112, and an adder 123. The oscillator 112 (e.g., a crystal oscillator) produces the oscillating component 128 of the Vref 116 signal at a particular frequency (e.g., $f_{\_TX}$). The oscillating component 128 includes a sinusoidal signal, a square wave signal, a triangular wave signal, a multiple level signal (e.g., has varying magnitude over time with respect to the DC component), and/or a polygonal signal (e.g., has a symmetrical or asymmetrical polygonal shape with respect to the DC component).

The frequency of the oscillating component 128 may vary so that it can be tuned to the impedance of a sensor and/or to be off-set in frequency from other sensor signals in a system. For example, a capacitance sensor's impedance decreases with frequency. As such, if the frequency of the oscillating component is too high with respect to the capacitance, the capacitor looks like a short and variances in capacitances will be missed. Similarly, if the frequency of the oscillating component is too low with respect to the capacitance, the capacitor looks like an open and variances in capacitances will be missed.

The DC voltage reference circuit 124 produces a DC component 126 of the Vref 116 signal. The DC component 126 is a DC voltage in the range of a few hundred milli-volts to tens of volts or more. The adder 123 combines the oscillating component 128 with the DC component 126 to produce the Vref 116 signal.

FIG. 14 is a schematic block diagram of an embodiment of an input/output (IO) front-end circuit 2 80 (e.g., concurrent transmit-receive (TX-RX) circuit) configuration of a configurable drive-sense circuit (DSC) coupled to a pin 14, the DSC signaling circuit 42, and the back-end module 36. The input/output (IO) front-end circuit 2 80 may be configured as an analog concurrent TX-RX circuit or a digital concurrent TX-RX circuit.

The back-end module 36 may be a bidirectional switch, a buffer, an analog to digital converter (ADC), digital filter, a gain circuit, and/or a combination thereof depending on one or more of: a desired data format for the data_in 134 and the data_out 136, data synchronization of the data_in 134 and the data_out 136, and compatibility of the IO front-end circuit 2 80 with other integrated circuit components.

The IO front-end circuit 2 80 includes a dependent current source 104 and an operational amplifier (op-amp) 106. The dependent current source 104 may be implemented as discussed in previous Figures.

For data transmit, a data_out 136 signal is provided to the back-end module 36, where the back-end module 36 processes the data_out 136 signal in accordance with its configured function to produce and/or to transfer the data_out 136 to the DSC signaling circuit 42. The DSC signaling circuit 42 generates and provides a transmit (TX) data 132 reference signal to the op-amp 106. An example of generating the TX data 132 reference signal is described in greater detail with reference to FIG. 15.

The op-amp 106 outputs a regulation signal 142 representative of the difference between its inputs. The dependent current source 104 adjusts the TX signal 138 to the pin based on a regulation signal 142 in order to keep the inputs of the op-amp 106 substantially matching (e.g., the control loop generated by the dependent current source 104 and the op-amp 106 regulates the TX signal to substantially match the TX data 132).

For receiving data (e.g., a receive (RX) signal 140), the regulation signal 142 will vary based on the RX signal 140. The regulation signal 142 representative of the RX signal 140 is provided to the back-end module 36, where the back-end module 36 processes it in accordance with its configured function to produce and/or to transfer the regulation signal 142 as data_in 134.

FIG. 15 is a schematic block diagram of an embodiment of a drive-sense circuit (DSC) signaling circuit 42 that includes a direct current (DC) voltage reference circuit 124, a frequency mixer 148, an adder 123, and multiplexors 150. The frequency mixer 148 is operable to modulate the data_out 136 with a carrier signal 144. The modulation may include signal amplitude shift keying (ASK), phase shift keying (PSK), frequency shift keying (FSK), and/or a combination thereof to modulate the carrier signal 144 to represent the data_out 136.

The DC voltage reference circuit 124 provides a DC voltage component to the adder 123 where the adder 123 is operable to add the DC voltage component to the data_out signal 136. The configuration data_3 146 instructs the multiplexors 150 on how to pass the data_out 136 through the DSC signaling circuit 42 (e.g., whether to add a DC component, whether to modulate the signal, etc.) to produce the desired TX_data 132 reference signal.

The input/output (IO) front-end circuit 2 80 may be configured as an analog concurrent TX-RX circuit or a digital concurrent TX-RX circuit. If the concurrent TX-RX circuit is digital and the data_out 136 signal is digital, the configuration data_3 146 may instruct the multiplexors 150 to pass the data_out 136 signal through as the TX data 132. As another example, the configuration data_3 146 may instruct the multiplexors 150 to pass a digital data_out 136 signal to adder 123 to add a DC voltage component to produce an adjusted DC signal as the TX data 132.

If the concurrent TX/RX circuit is analog, the configuration data_3 146 instructs the multiplexors as to whether to pass the data_out 136 to the frequency mixer 148 to modulate the signal and/or to pass the data_out 136 to the adder 123 to add a DC voltage component to the data_out 136 signal. As such the DSC signaling circuit 42 is configured by the configuration data_3 146 to produce the desired transmit (TX) data 132 from a received data_out 136 signal (analog or digital).

Figure 16:
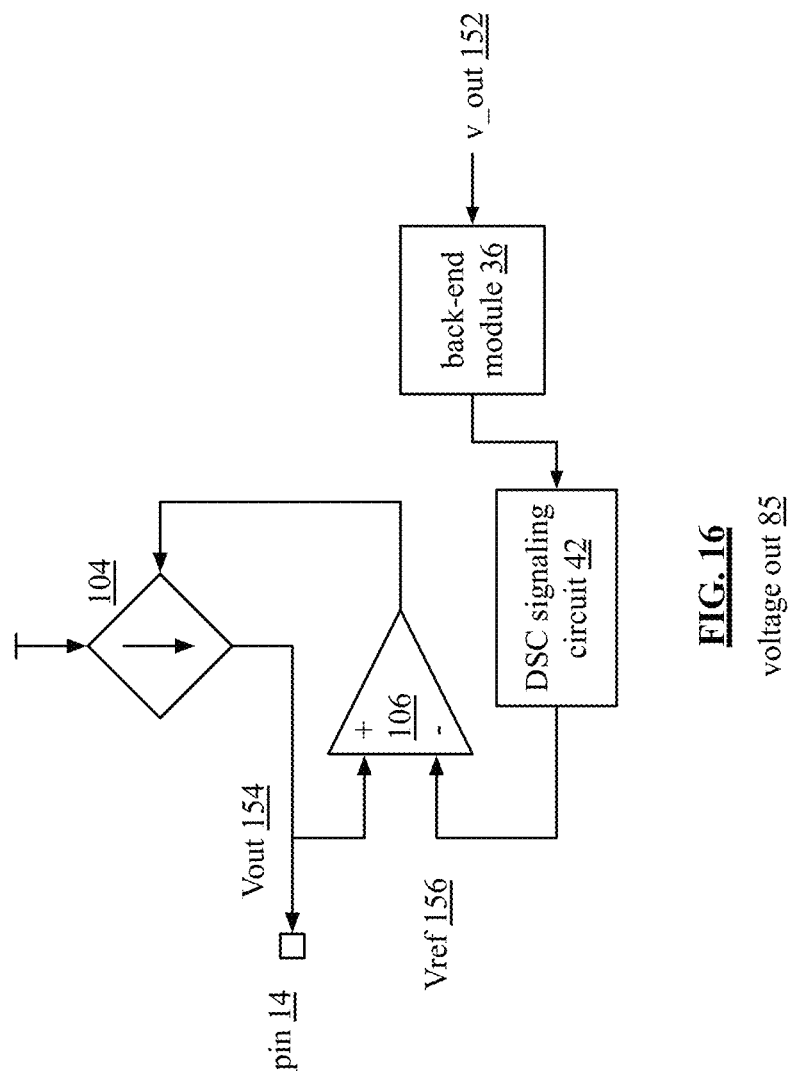
FIG. 16 is a schematic block diagram of an embodiment of a voltage out configuration of a configurable drive-sense circuit (DSC) in accordance with the present invention.

FIG. 16 is a schematic block diagram of an embodiment of a voltage out 85 configuration of a configurable drive-sense circuit (DSC) coupled to a pin 14, the DSC signaling circuit 42, and the back-end module 36. The back-end module 36 may be a bidirectional switch, a buffer, a digital to analog converter (DAC), a level shift circuit, and/or a combination thereof depending on one or more of: a desired data format for output voltage, data synchronization of v_out 152, and compatibility of the voltage out 85 with other integrated circuit components.

The voltage out 85 configuration operates similarly to the output driver 72 configuration of FIG. 8 except that the DSC signaling circuit 42 produces a DC voltage reference (Vref) 156 based on a v_out 152 signal for input to the op-amp 106. The op-amp 106 compares Vref 156 with a voltage out (Vout) 154 signal produced by the dependent current source 104 to produce a regulation signal at the output of the op-amp 106.

The dependent current source 104 adjusts the Vout 154 signal based on the regulation signal. Thus, the voltage out 87 configuration is a control loop that regulates the Vout 154 signal to the pin 14 to substantially match the Vref 156. The voltage out 85 configuration transforms a pin 14 as a voltage output at any voltage.

Figure 17:
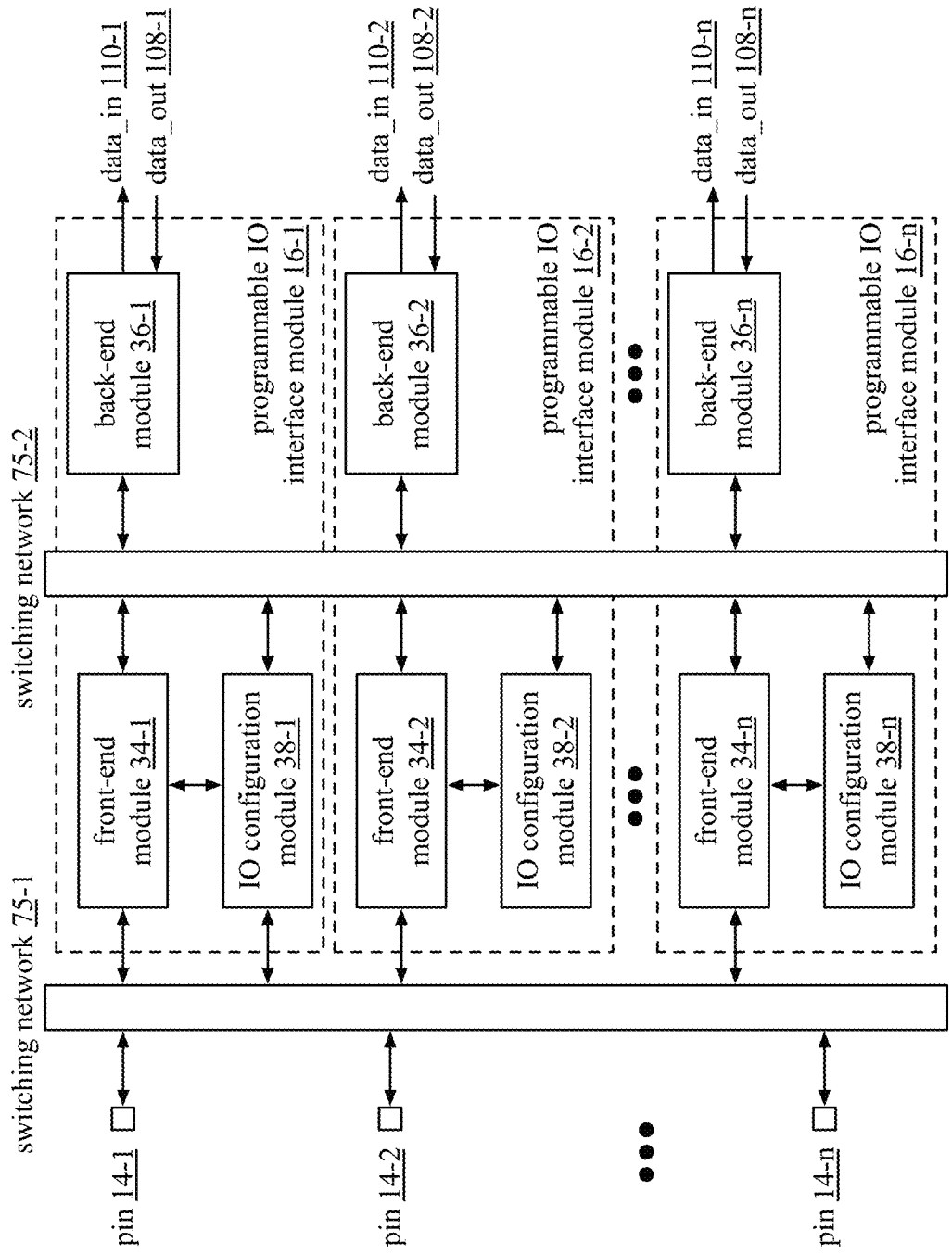
FIG. 17 is a schematic block diagram of an embodiment of a plurality of programmable input/output (IO) interface modules and a plurality of pins connected via switching networks in accordance with the present invention.

FIG. 17 is a schematic block diagram of an embodiment of a plurality of programmable input/output (10) interface modules 16-1 through 16-n, and a plurality of pins 14-1 through 14-n connected via switching networks 75-1 and 75-2.

Based on the desired configuration of a programmable IO interface module, the components of each programmable IO interface modules can be connected to components of other programmable IO interface modules as well as more than one pin of the integrated circuit via control signaling provided to the switching networks 75-1 and 75-2. Multiple connection options allow for the programmable IO interface module components to perform functions involving multiple inputs and/or outputs.

For example, the switching network 75-1 is operable to connect one or more of the pins 14-1 through 14-n to a particular front-end module of the programmable IO interface modules 16-1 through 16-n. Thus, a front-end module can perform a function on multiple inputs received or output data to multiple pins.

The switching network 75-2 is operable to connect one or more front-end modules to a one or more back-end modules. For example, the switching network 75-2 connects the output of a front-end module 34-1 to a back-end module 36-2 where the back-end module 36-2 receives input from the front-end module 34-1 and the front-end module 34-2 to perform a particular multi-input function (e.g., a differential)

Figure 18:
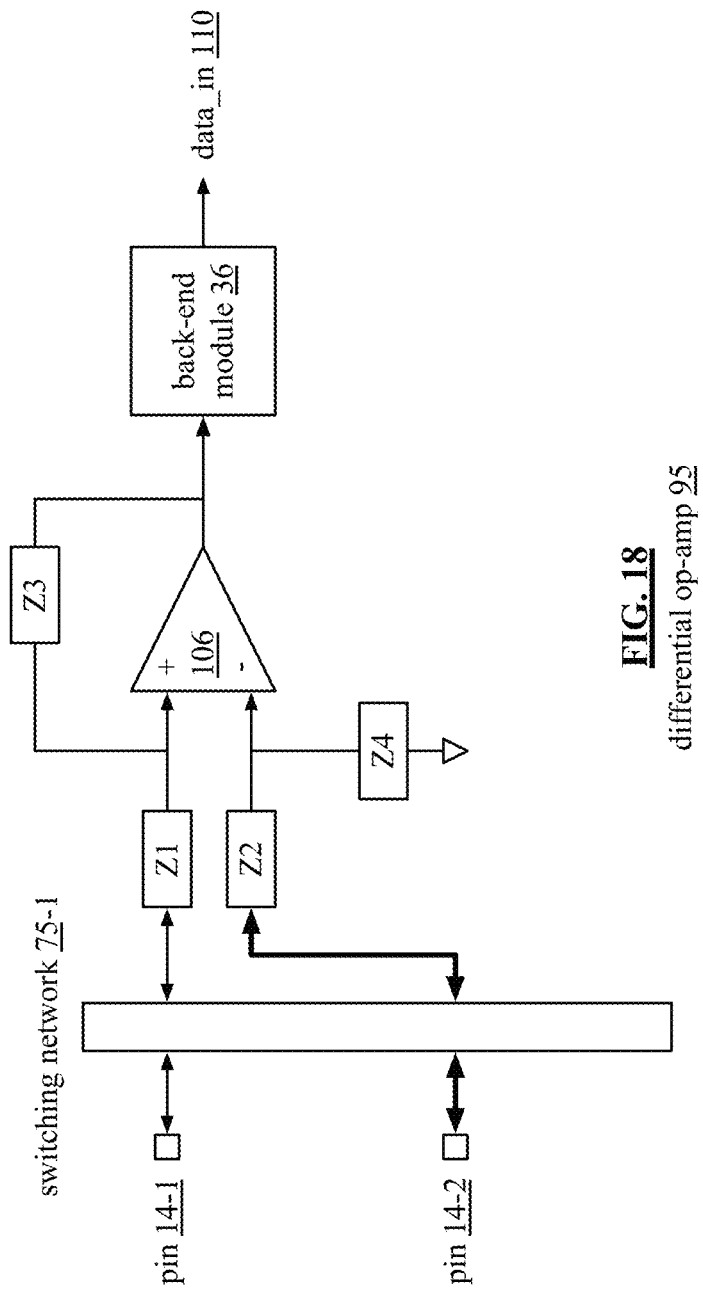
FIG. 18 is a schematic block diagram of an embodiment of a differential operational amplifier (op-amp) configuration of a configurable drive-sense circuit (DSC) in accordance with the present invention.

FIG. 18 is a schematic block diagram of an embodiment of a differential operational amplifier (op-amp) 95 configuration of a configurable drive-sense circuit (DSC) coupled to pins 14-1 and 14-2 via the switching network 75-1 and the back-end module 36. The back-end module 36 may be a bidirectional switch, a buffer, a digital to analog converter (DAC), a level shift circuit, and/or a combination thereof depending on one or more of: a desired data format for data_in 110, data synchronization of data_in 110, and compatibility of the differential op-amp 95 with other integrated circuit components.

The differential op-amp 95 includes an op-amp 106 where a first terminal is connected to pin 14-1 through an input impedance Z1 and a second terminal is connected to pin 14-2 though an input impedance Z2. A feedback impedance Z3 is connected to the first terminal and to the output of the op-amp 106. An impedance Z4 is in connected to the second terminal of the op-amp 106 and ground. The impedances Z1-Z4 are typically implemented with resistors.

While an op-amp alone is differential, the impedances and feedback shown here allow for gain and output control. If Z1 is equal to Z2 and Z4 is equal to Z3, then the output of the op-amp 106 (e.g., voltage output (Vout)) is equal to (Z3/Z1) multiplied by the difference of the inputs from the pins 14. As such, the values of Z3 and Z1 set the gain of the differential 95 and the output provides the difference between the two inputs. For a unity gain differential op-amp 95, the impedance of Z1 is set equal to the impedance of Z3.

The output of the op-amp 106 (e.g., Vout) is provided to the back-end module 36, where the back-end module 36 processes it in accordance with its configured function (e.g., bidirectional switch, buffer, a digital to analog conversion, level shift, and/or a combination thereof) to produce and/or transfer the output as data_in 110.

Figure 19:
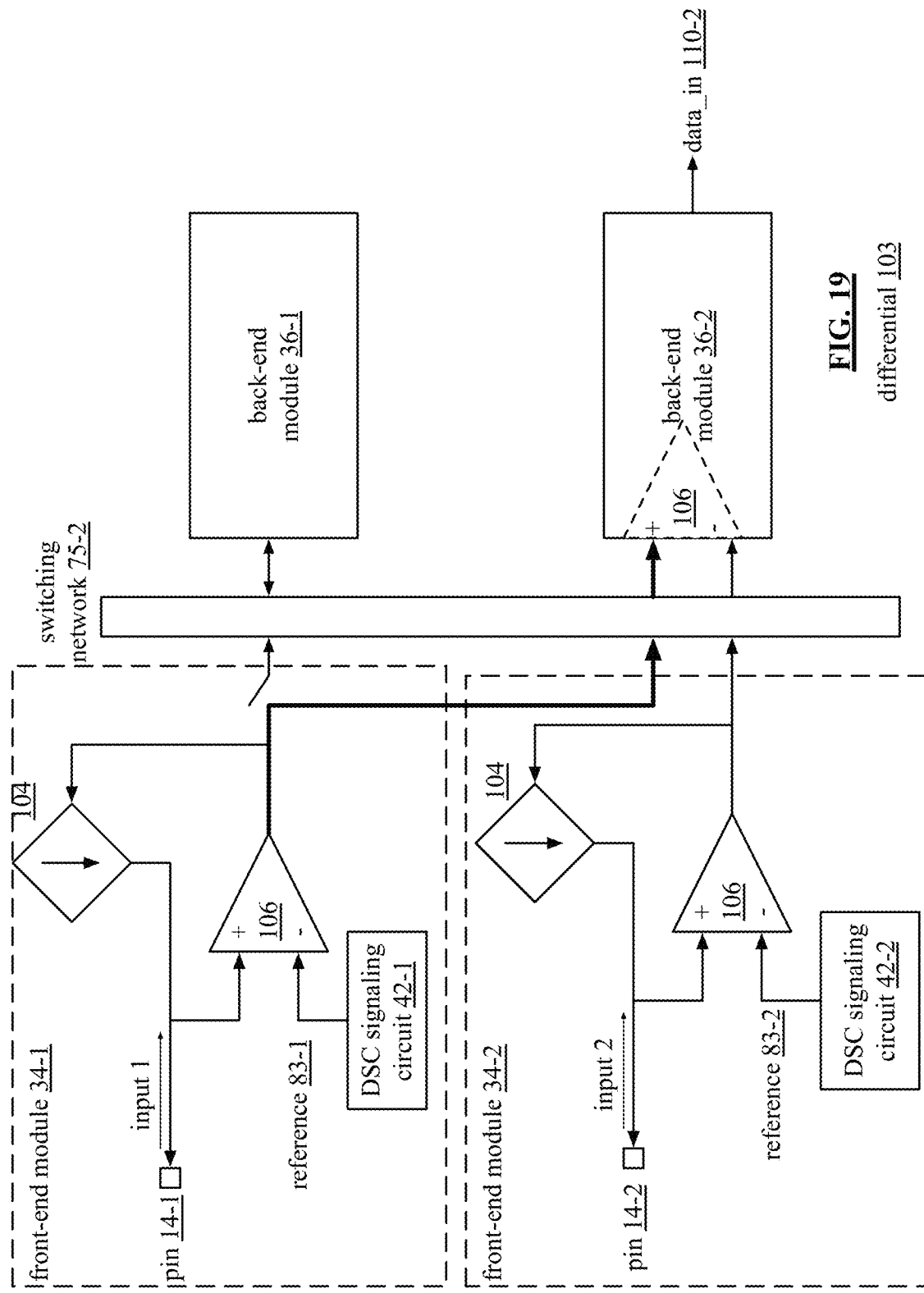
FIG. 19 is a schematic block diagram of an embodiment of a differential configuration in accordance with the present invention.

FIG. 19 is a schematic block diagram of an example of a differential 103 configuration that includes a front-end module 34-1 and a back-end module 36-1 of a programmable input/out (IO) interface module 16-1 and a front-end module 34-2 and a back-end module 36-2 of a programmable input/out (IO) interface module 16-2. The back-end modules 36-1 through 36-2 include a differential operational amplifier (op-amp) configuration such that they are operable to receive two inputs (one to a first terminal and one to a second terminal of the differential op-amp).

The front-end modules 34-1 through 34-2 include configurable drive-sense circuits (DSCs) and DSC signaling circuits 42-1 through 42-2. The configurable DSCs operate similarly to the IO front-end circuit 1 78 configuration of FIG. 12. The front-end module 34-1 receives an input 1 from a pin 14-1 and the front-end module 34-2 receives an input 2 from a pin 14-2. The DSC signaling circuit 42-1 generates and provides a voltage reference 83-1 signal to the op-amp 106. The DSC signaling circuit 42-2 generates and provides a voltage reference 83-2 signal to the op-amp 106.

The control loops that regulates the input signals 1-2 to substantially match the reference signals will adjust a comparison signal to compensate for inputs 1-2. As such, the signal output from the front-end module 34-1 is representative of input 1 data and the signal output from the front-end module 34-2 is representative of input 2 data.

The output of the front-end module 34-1 is provided (via the switching network 75-2) to a first terminal of a differential op-amp (shown here a simply op-amp 106) of the back-end module 36-2. The output of the front-end module 34-2 is provided (via the switching network 75-2) to a second terminal of the op-amp 106 of the back-end module 36-2. The differential op-amp of the back-end module 36-2 is operable to produce a signal representative of the difference between input 1 and input 2 (e.g., data_in 110-2).

The back-end module 36-2 may further process the signal representative of the difference between input 1 and input 2 in accordance with its configured function (e.g., analog to digital converter (ADC), buffer, etc.) to produce data_in 110-2.

Providing inputs 1-2 from the front-end modules 34-1 and 34-2 to a differential op-amp of the back-end module 36-2, reduces the impedance on the pins 14-1 through 14-2 in comparison to the example of FIG. 18.

Figure 20:
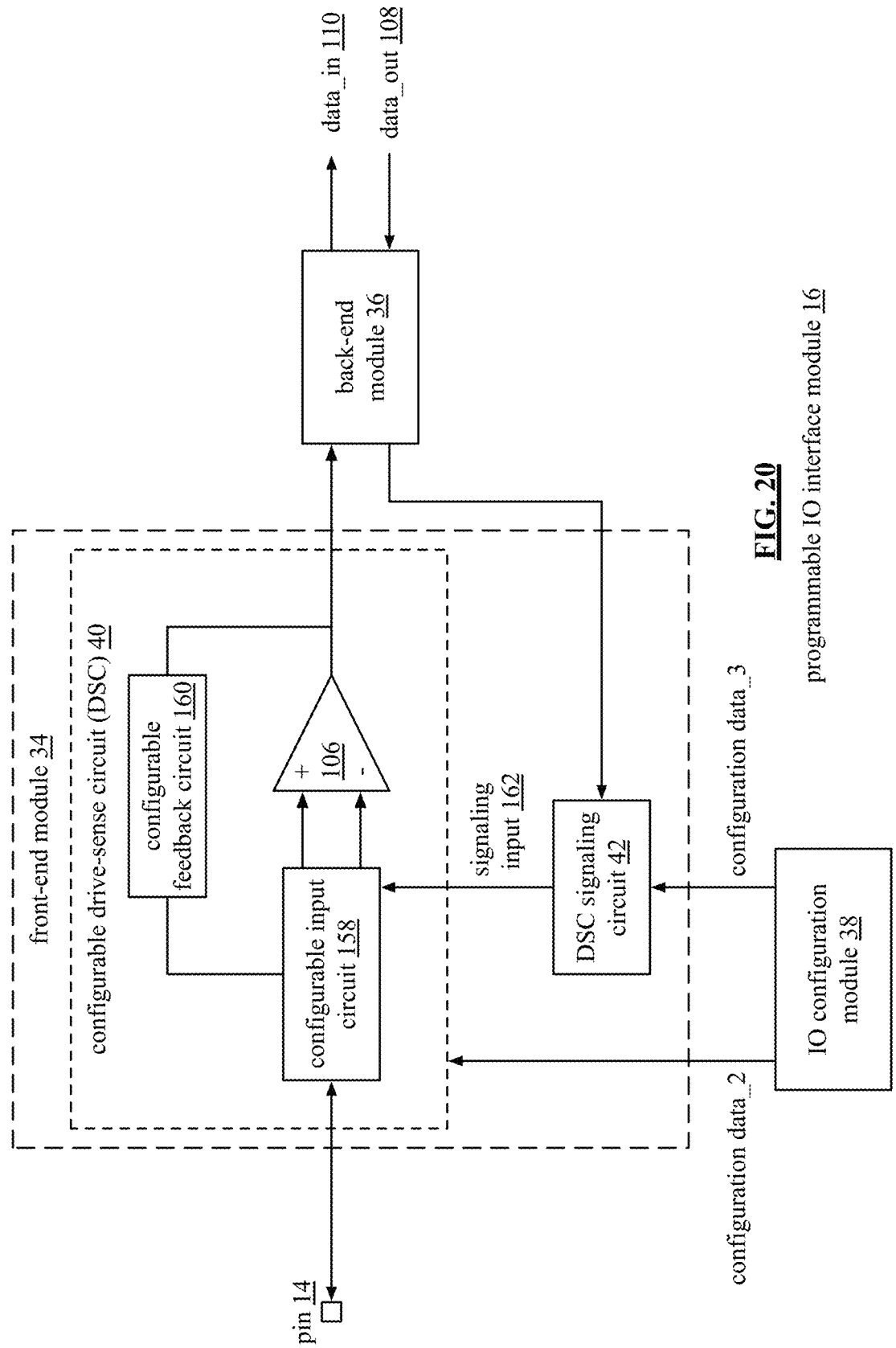
FIG. 20 is a schematic block diagram of another embodiment of a programmable input/output (IO) interface module in accordance with the present invention.

FIG. 20 is a schematic block diagram of another embodiment of a programmable input/output (IO) interface module 16 that includes the front-end module 34, the back-end module 36, and the IO configuration module 38. The front-end module includes the configurable drive-sense circuit (DSC) 40 that includes a configurable input circuit 158, an operational-amplifier (op-amp) 106, and a configurable feedback circuit 160.

As discussed with reference to FIGS. 8-19, the configurable drive-sense circuit (DSC) 40 is configurable for a variety of different functions. In most cases, the different functions require some type of feedback loop (e.g., a feedback impedance, a dependent current source, etc.) and an op-amp. Thus, instead of having the different configuration options as separate circuits for selection within the configurable DSC, the same circuit components can be used but connected differently via switching to provide different configurable DSC configurations.

The IO configuration module 38 provides configuration data_2 signals to the configurable DSC circuit 40 and provides configuration data_3 signals to the DSC signaling circuit 42 regarding the appropriate signaling for a configurable DSC function. The back-end module 36 may provide data (e.g., data_out 108) to the DSC signaling circuit 42 depending on the configuration of the configurable DSC.

The configuration data_2 signals include instructions that control the switching within the configurable input circuit 158 and the configurable feedback circuit 160 to configure the circuits in accordance with a desired function (e.g., impedances are connected to inputs, feedback is connected to the op-amp, etc.).

The DSC signaling circuit 42 is operable to produce a signaling input 62 based on the configuration data_3 (and possibly data from the back-end module 36) and provide the signaling input 62 to the configurable input circuit 158 when required. For example, the DSC signaling circuit 42 creates a reference signal for input to the op-amp 106 and the configurable input circuit 158 controls how that input is input to the op-amp 106.

Figure 21:
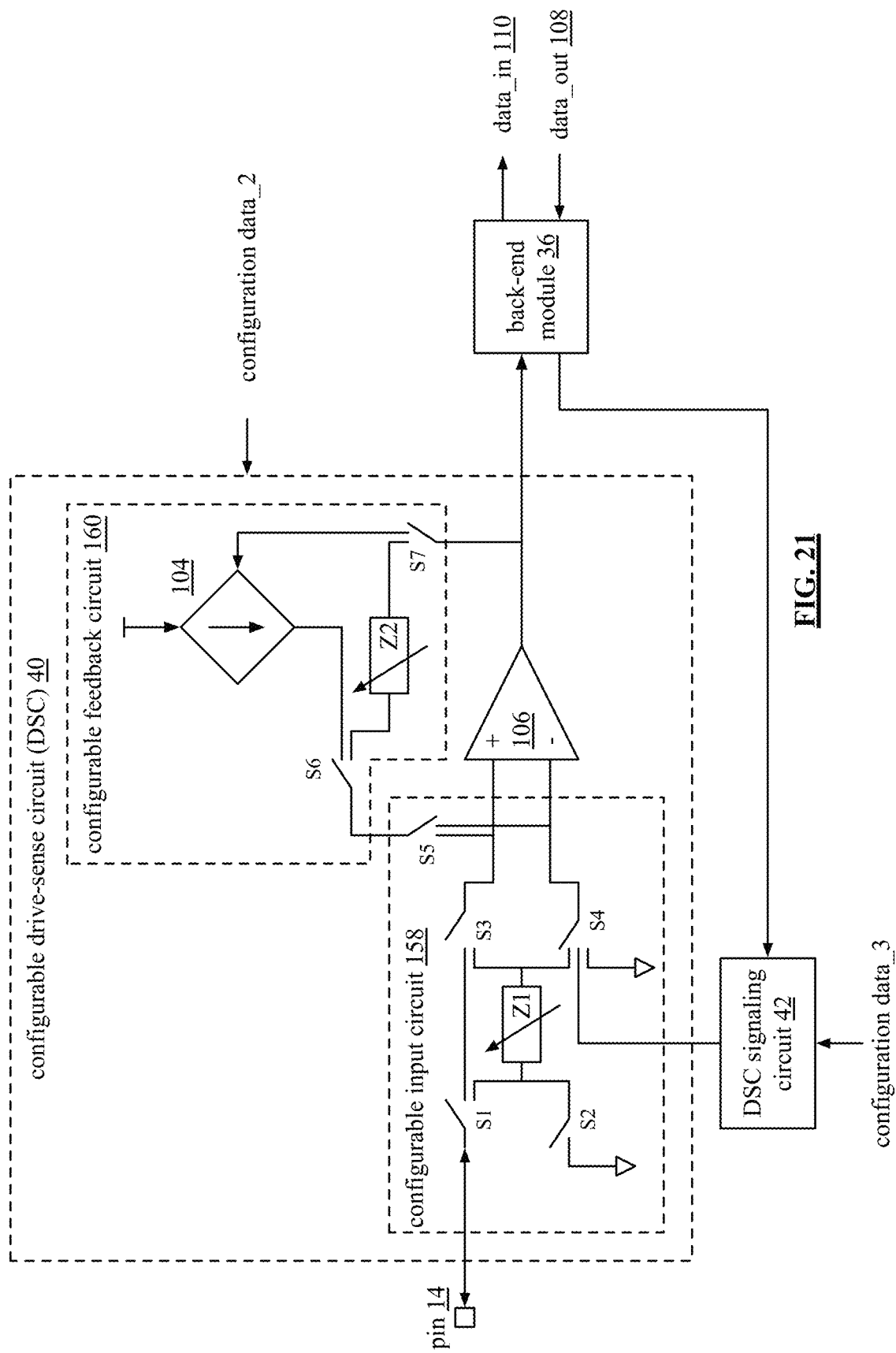
FIG. 21 is a schematic block diagram of another embodiment of a configurable drive-sense circuit (DSC) in accordance with the present invention.

FIG. 21 is a schematic block diagram of another embodiment of a configurable drive-sense circuit (DSC) 40 coupled to a pin 14 and the back-end module 36. The configurable drive-sense circuit (DSC) 40 includes the configurable input circuit 158, an operational-amplifier (op-amp) 106, and the configurable feedback circuit 160.

The configurable input circuit 158 includes switches S1-S5 and a variable impedance Z1. The configurable feedback circuit 160 includes a dependent current source 104, switches S6-S7, and a variable impedance Z2. The variable impedances Z1-Z2 may be variable resistors, variable capacitors, variable inductors, and/or a combination thereof.

The configurable DSC 40 receives configuration data_2 from the input/output (IO) control module. The configuration data 2 includes instructions as to which switches to close and/or open, and what values to set the variable impedances Z1-Z2 (if any) based on the desired configuration of the configurable DSC 40.

The DSC signaling circuit 42 receives configuration data_3 from the input/output (IO) control module. The configuration data 3 includes instructions for setting the signaling to the configurable DSC 40 if necessary for the desired functionality of the configurable DSC 40. The back-end module 36 may also provide data (e.g., data_out 108 or processed data_out 108) to the DSC signaling circuit 42 depending on the configuration of the configurable DSC.

Figure 22:
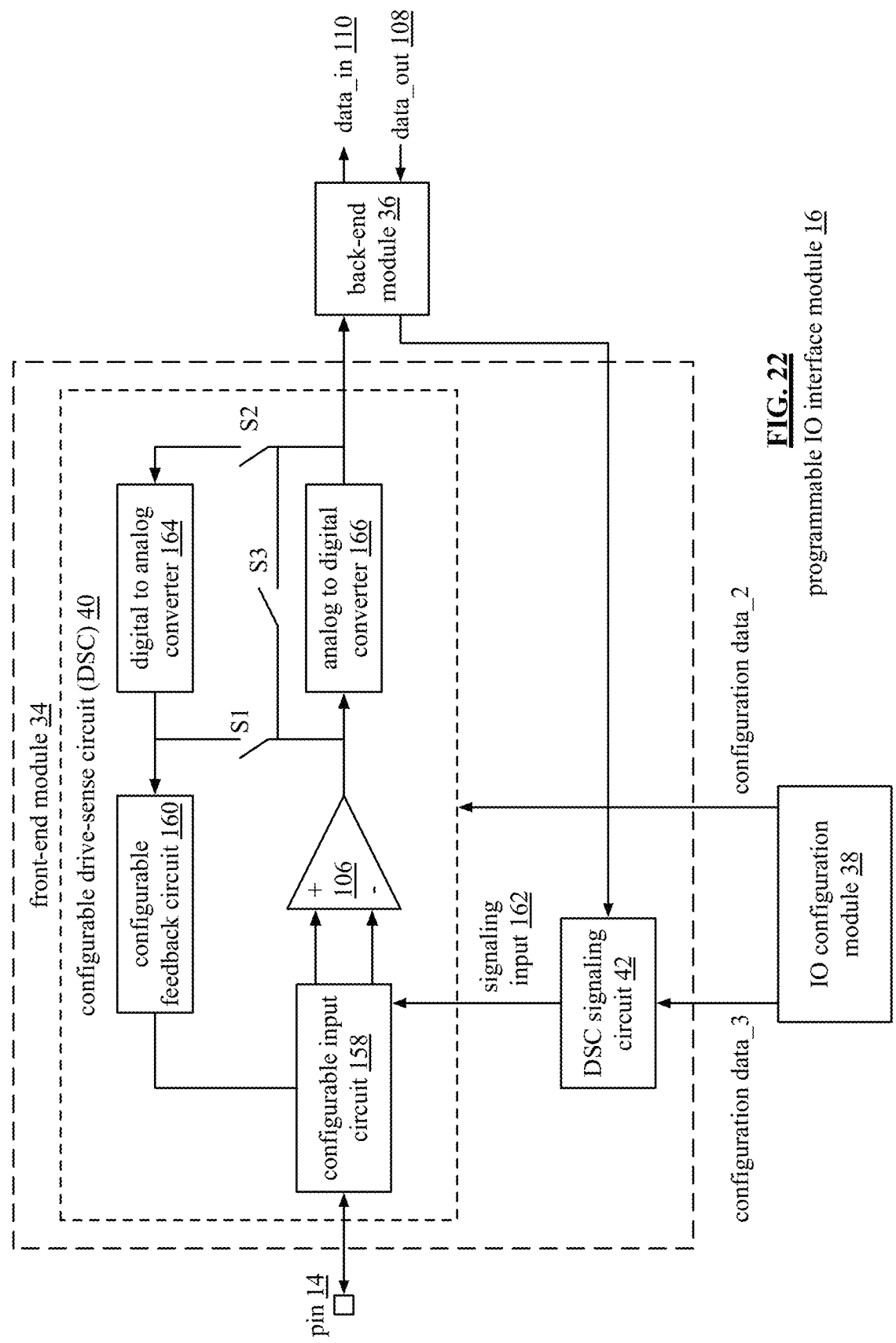
FIG. 22 is a schematic block diagram of another embodiment of a programmable input/output (IO) interface module in accordance with the present invention.

FIG. 22 is a schematic block diagram of another embodiment of a programmable input/output (IO) interface module 16 that includes the front-end module 34, the back-end module 36, and the IO configuration module 38. The front-end module includes the configurable drive-sense circuit (DSC) 40 that includes the configurable input circuit 158, an operational-amplifier (op-amp) 106, the configurable feedback circuit 160, switches S1-S3, an analog to digital converter 166, and a digital to analog converter 164.

FIG. 22 operates similarly to FIG. 20 except for the addition of the switches S1-S3, the analog to digital converter 166, and the digital to analog converter 164 which provides further functionality to the configurable DSC 40. In many cases, the configurable front-end module operates using analog signals but the input or output to/from the integrated circuit needs to be converted to a digital signal. While the back-end module is configurable as an analog to digital converter and/or a digital to analog converter, it may be desirable to include these options within the front-end module and free up the back-end module for other functions (e.g., filtering, data formatting, etc.).

The configuration data_2 includes instructions as to whether to close or open switches S1-S3 to include one or more of the analog to digital converter 166 and the digital to analog converter 164 to the configuration of the configurable DSC 40.

The analog to digital converter 166 is operable to generate a digital output from an analog input provided by the op-amp 106 when data is being received from the pin or from the back-end module 36 when data is being transmitted. Closing switch S3 bypasses the analog to digital converter 166.

The digital to analog converter 164 is operable to convert a digital input (e.g., from the output of the op-amp, the analog to digital converter 166, from the back-end module 36) to an analog output. When switch S1 is closed, the output of the op-amp is connected to the configurable feedback circuit 160.

As an example, when the configurable input circuit 158 and the configurable feedback circuit 160 are configured in accordance with an input/output (IO) front-end circuit 1 (concurrent drive & sense circuit) 78 configuration and switch S2 is closed, the analog comparison signal is provided to the analog to digital converter 166. The analog to digital converter 166 converts the analog comparison signal into a digital signal representative of sensed data. The digital signal representative of the sensed data is provided to the digital to analog converter 164 where the digital to analog converter 164 converts the digital signal into an analog regulation signal for input to the configurable feedback circuit 160.

Figure 23:
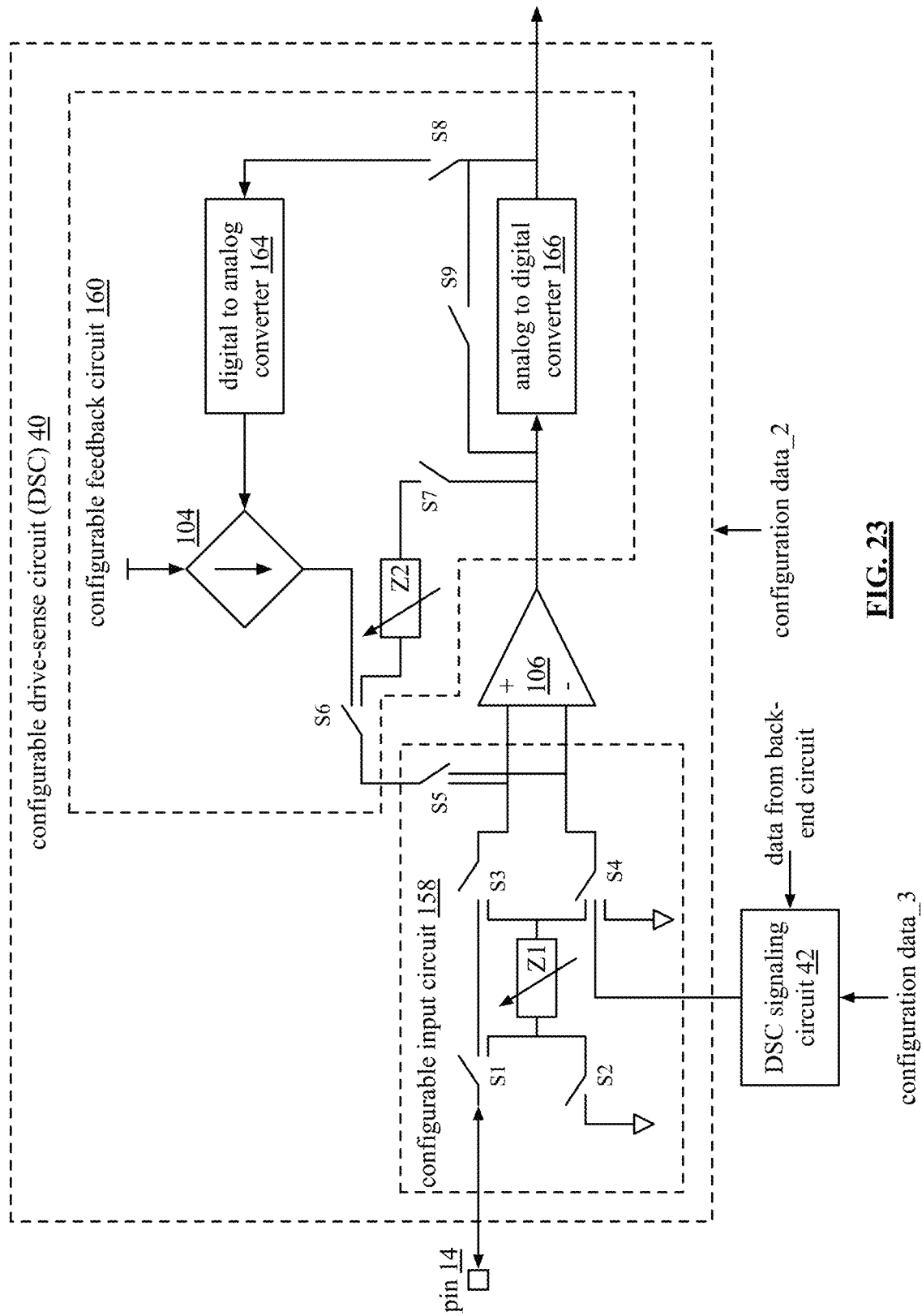
FIG. 23 is a schematic block diagram of another embodiment of a configurable drive-sense circuit (DSC) in accordance with the present invention.

FIG. 23 is a schematic block diagram of another embodiment of a configurable drive-sense circuit (DSC) 40 coupled to a pin 14 and the DSC signaling circuit 42. The configurable DSC 40 includes a configurable input circuit 158, an operational-amplifier (op-amp) 106, and a configurable feedback circuit 160.

FIG. 23 operates similarly to FIG. 21 except that the digital to analog converter 164, the analog to digital converter 166, and switches S6-S9 are incorporated into the configurable feedback circuit 160 along with the dependent current source 104 and the variable impedance Z2.

The configurable DSC 40 receives the configuration data_2 which includes instructions as to which switches to close and what values to set the variable impedances Z1-Z2 based on the desired functionality of the configurable DSC 40. The DSC signaling circuit 42 receives configuration data_3 and sets the signaling to the configurable DSC 40 if necessary for the function of the configurable DSC 40. The back-end module 36 may also provide data to the DSC signaling circuit 42 depending on the configuration of the configurable DSC.

Figures 24, 25:
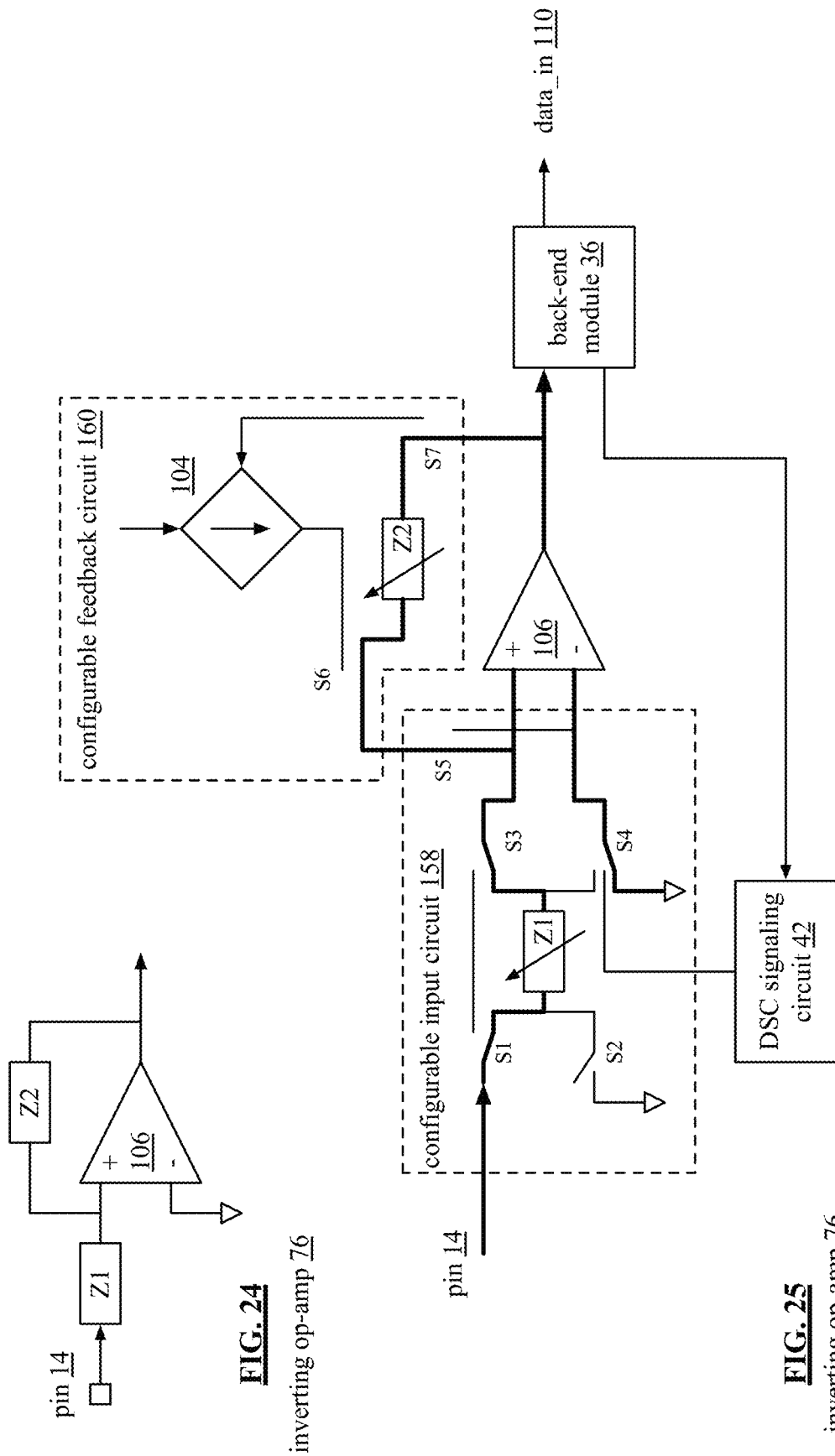
FIG. 24 is a schematic block diagram of an embodiment of an inverting operational amplifier (op-amp) configuration of a configurable drive-sense circuit (DSC) in accordance with the present invention.
FIG. 25 is a schematic block diagram of an embodiment of an inverting operational amplifier (op-amp) configuration of a configurable drive-sense circuit (DSC) in accordance with the present invention.

FIG. 24 is a schematic block diagram of an embodiment of an inverting operational amplifier (op-amp) 76 configuration of a configurable drive-sense circuit (DSC) 40 coupled to a pin 14. The inverting op-amp 76 includes an op-amp 106, impedances Z1 and Z2, and operates as described with reference to FIG. 9.

FIG. 25 is a schematic block diagram of an embodiment of an inverting operational amplifier (op-amp) 76 configuration of a configurable drive-sense circuit (DSC) 40 coupled to a pin 14, the DSC signaling circuit 42, and the back-end module 36. The configurable drive-sense circuit (DSC) 40 includes the configurable input circuit 158, an op-amp 106, and the configurable feedback circuit 160.

The configurable input circuit 158 includes switches S1-S5 and a variable impedance Z1. The configurable feedback circuit 160 includes a dependent current source 104, switches S6-S7, and a variable impedance Z2. To configure the configurable DSC 40 as an inverting op-amp as shown in FIG. 24, the configurable DSC circuit 40 receives configuration data instructing the configurable input circuit 158 to close switch S1 from the pin 14 to the impedance Z1, to set the variable impedance Z1 to a desired impedance, to close switch S3 from the impedance Z1 to a first terminal of the op-amp 106, to connect switch S4 to ground, and to close switch S5 to connect the first terminal of the op-amp 106 to the configurable feedback circuit 160.

The configurable DSC circuit 40 further receives configuration data instructing the configurable feedback data circuit 160 to close switch S6 to the variable impedance Z2, to close switch S7 to the output of the op-amp 106, and to set the variable impedance Z2 to a desired feedback impedance. For a unity gain, the configuration data instructs the impedance values of variable impedances Z1 and Z2 to be equal.

FIG. 26 is a schematic block diagram of an embodiment of a non-inverting operational amplifier (op-amp) 74 configuration of a configurable drive-sense circuit (DSC) 40 coupled to a pin 14. The non-inverting op-amp 74 includes an op-amp 106, impedances Z1 and Z2 and operates as described with reference to FIG. 10.

FIG. 27 is a schematic block diagram of an embodiment of a non-inverting operational amplifier (op-amp) 74 configuration of a configurable drive-sense circuit (DSC) 40 coupled to a pin 14, the DSC signaling circuit 42, and the back-end module 36. The configurable drive-sense circuit (DSC) 40 includes the configurable input circuit 158, the op-amp 106, and the configurable feedback circuit 160.

The configurable input circuit 158 includes switches S1-S5 and a variable impedance Z1. The configurable feedback circuit 160 includes a dependent current source 104, switches S6-S7, and a variable impedance Z2. To configure the configurable DSC 40 as a non-inverting op-amp as shown in FIG. 26, the configurable DSC circuit 40 receives configuration data instructing the configurable input circuit 158 to close switches S1 and S3 from the pin 14 to a first terminal of the op-amp 106, to set the variable impedance Z1 to a desired impedance, to close switch S2 from the variable impedance Z1 to ground, to close switch S4 to from the variable impedance Z1 to a second terminal of the op-amp, and to close switch S5 from the second terminal of the op-amp 106 to the feedback circuit 160.

The configurable DSC circuit 40 further receives configuration data instructing the configurable feedback data circuit 160 to close switch S6 to the variable impedance Z2, to close switch S7 from the variable impedance Z2 to the output of the op-amp 106, and to set the variable impedance Z2 to a desired feedback impedance.

FIG. 28 is a schematic block diagram of an output driver 72 configuration of a configurable drive-sense circuit (DSC) 40 coupled to a pin 14. The output driver 72 includes an op-amp 106 and a dependent current source 104 and operates as described with reference to FIG. 8.

FIG. 29 is a schematic block diagram of an embodiment of an output driver 72 configuration of a configurable drive-sense circuit (DSC) 40 coupled to a pin 14, the DSC signaling circuit 42, and the back-end module 36. The configurable drive-sense circuit (DSC) 40 includes the configurable input circuit 158, an op-amp 106, and the configurable feedback circuit 160.

The configurable input circuit 158 includes switches S1-S5 and a variable impedance Z1. The configurable feedback circuit 160 includes a dependent current source 104, switches S6-S7, and a variable impedance Z2. The back-end module 36 receives a data_out 108 signal. The DSC signaling circuit 42 receives configuration data pertaining to generating a desired drive_out 105 signal from the signal received from the back-end module 36 (e.g., data_out 108 or a processed version of data_out). Based on the configuration data, the DSC signaling circuit 42 generates and provides a signaling input drive_out 105 to the configurable input circuit 158.

To set the configurable DSC 40 as an output driver 72 as shown in FIG. 28, the configurable DSC circuit 40 receives configuration data instructing the configurable input circuit 158 to close switch S1 and switch S3 from the pin 14 to a first terminal of the op-amp 106, to close switch S4 to the signaling input drive_out 105 from DSC signaling circuit 42 to connect with a second terminal of the op-amp 106, and to close switch S5 to a first terminal of the op-amp 106 to connect to the configurable feedback circuit 160.

The configurable DSC 40 further receives configuration data instructing the configurable feedback data circuit 160 to close switch S6 to the dependent current source 104, and to close switch S7 to the output of the op-amp 106.

A voltage output 85 configuration of the configurable DSC 40 (e.g., as described with reference to FIG. 16) would look similar to the example shown except that the DSC signaling circuit 42 receives configuration data pertaining to generating a desired voltage reference from the signal received from the back-end module 36. Based on the configuration data, the DSC signaling circuit 42 generates and provides voltage reference signal to the configurable input circuit 158.

FIG. 30 is a schematic block diagram of an input/output (IO) front-end circuit 1 (concurrent drive & sense circuit) 78 configuration of a configurable drive-sense circuit (DSC) 40 coupled to a pin 14. The IO front-end circuit 1 78 includes an op-amp 106 and a dependent current source 104 and operates as described with reference to FIG. 12.

FIG. 31 is a schematic block diagram of an embodiment of an input/output (IO) front-end circuit 1 (concurrent drive & sense circuit) 78 configuration of a configurable drive-sense circuit (DSC) 40 coupled to a pin 14, the DSC signaling circuit 42, and the back-end module 36. The configurable drive-sense circuit (DSC) 40 includes the configurable input circuit 158, the op-amp 106, and the configurable feedback circuit 160.

The DSC signaling circuit 42 receives configuration data pertaining to generating a desired voltage reference signal Vref 116. Based on the configuration data, the DSC signaling circuit 42 generates and provides a signaling input Vref 116 to the configurable input circuit 158.

The configurable input circuit 158 includes switches S1-S5 and a variable impedance Z1. The configurable feedback circuit 160 includes a dependent current source 104, switches S6-S7, and a variable impedance Z2.

To set the configurable DSC 40 as the IO front-end circuit 1 78 as shown in FIG. 30, the configurable DSC circuit 40 receives configuration data instructing the configurable input circuit 158 to close switch S1 and switch S3 from the pin 14 to a first terminal of the op-amp 106, to close switch S4 to the signaling input Vref 116 from DSC signaling circuit 42 to connect with a second terminal of the op-amp 106, and to close switch S5 to the first terminal of the op-amp 106 to connect to the configurable feedback circuit 160.

The configurable DSC 40 further receives configuration data instructing the configurable feedback data circuit 160 to close switch S6 to the dependent current source 104 and to close switch S7 to the output of the op-amp 106.

Figure 32:
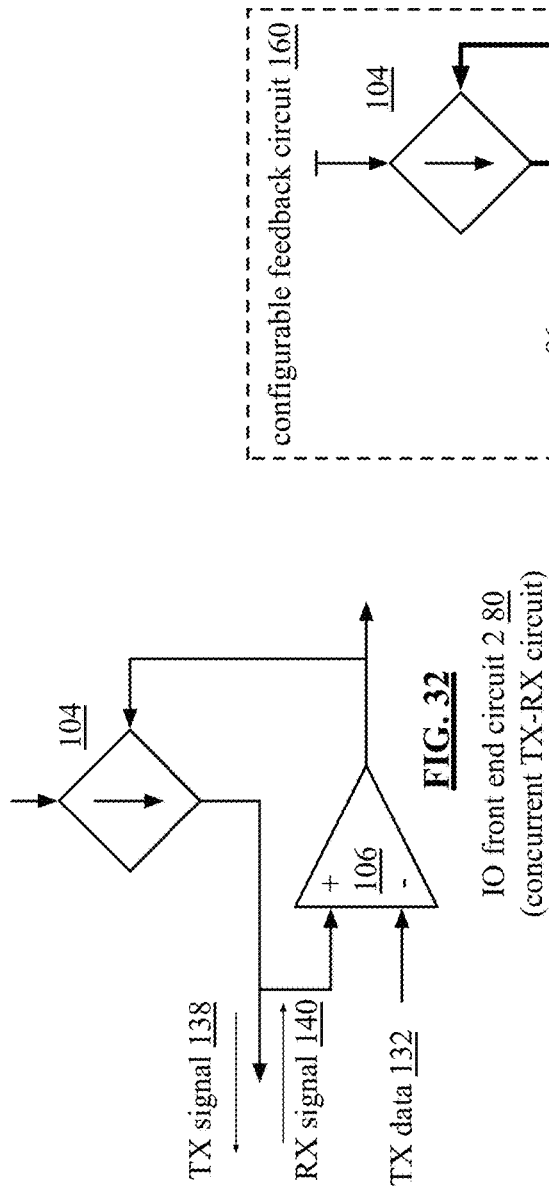
FIG. 32 is a schematic block diagram of an input/output (IO) front-end circuit 2 (concurrent transmit-receive (TX-RX) circuit) configuration of a configurable drive-sense circuit (DSC) in accordance with the present invention.

FIG. 32 is a schematic block diagram of an input/output (IO) front-end circuit 2 (concurrent transmit-receive (TX-RX) circuit) 80 configuration of a configurable drive-sense circuit (DSC) 40 that includes an op-amp 106 and a dependent current source 104 and operates as described with reference to FIG. 14.

Figure 33:
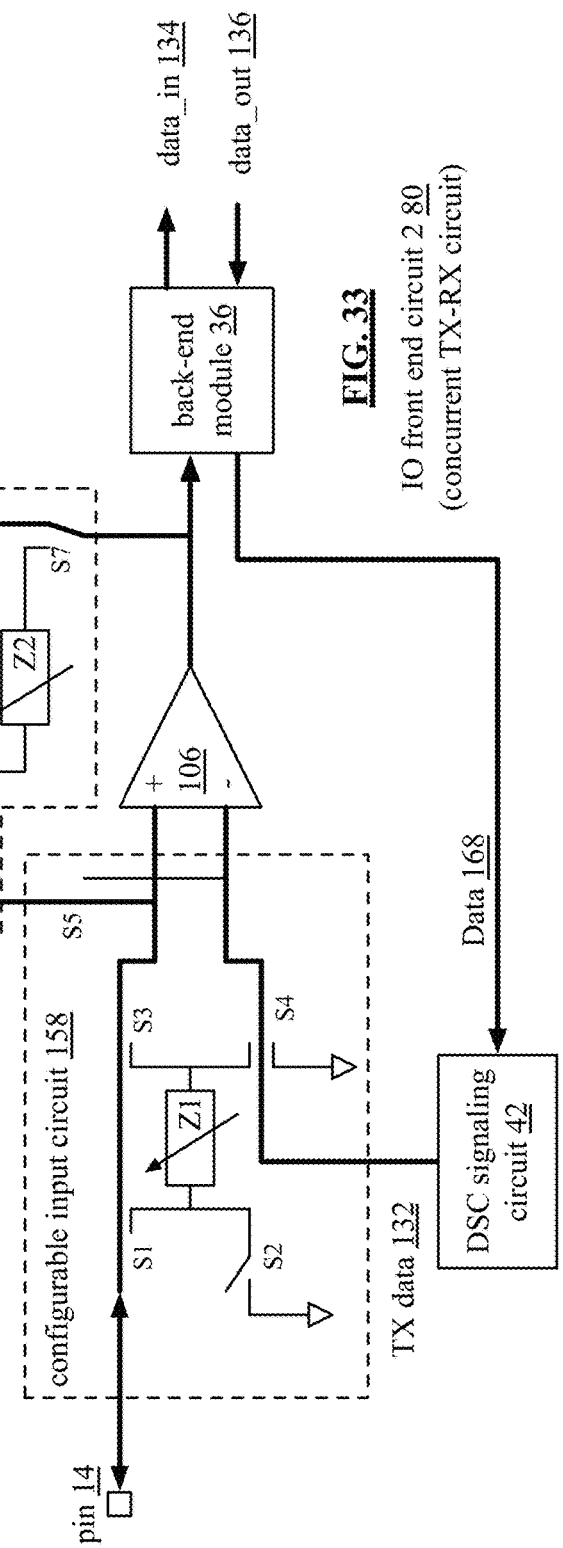
FIG. 33 is a schematic block diagram of an input/output (IO) front-end circuit 2 (concurrent transmit-receive (TX-RX) circuit) configuration of a configurable drive-sense circuit (DSC) in accordance with the present invention.

FIG. 33 is a schematic block diagram of an embodiment of an input/output (IO) front-end circuit 2 (concurrent transmit-receive (TX-RX) circuit) 80 configuration of a configurable drive-sense circuit (DSC) 40 coupled to a pin 14, the DSC signaling circuit 42, and the back-end module 36. The configurable drive-sense circuit (DSC) 40 includes the configurable input circuit 158, the op-amp 106, and the configurable feedback circuit 160.

The DSC signaling circuit 42 receives configuration data pertaining to generating a desired reference signal (TX_data 132) for transmitting data. Based on the configuration data and the Data 168 (e.g., data_out 136 processed by the back-end module 36), the DSC signaling circuit 42 generates and provides a signaling input TX data 132 to the configurable input circuit 158. The DSC signaling circuit 42 provides the signaling input (e.g., TX data 132) to the configurable input circuit 158.

The configurable input circuit 158 includes switches S1-S5 and a variable impedance Z1. The configurable feedback circuit 160 includes a dependent current source 104, switches S6-S7, and a variable impedance Z2.

To set the configurable DSC 40 as the IO front-end circuit 2 80 as shown in FIG. 32, the configurable DSC circuit 40 receives configuration data instructing the configurable input circuit 158 to close switch S1 and switch S3 from the pin 14 to a first terminal of the op-amp 106, to close switch S4 to the signaling input TX data 132 from the DSC signaling circuit 42 to connect with a second terminal of the op-amp 106, and to close switch S5 to the first terminal of the op-amp 106 to connect to the configurable feedback circuit 160.

The configurable DSC circuit 40 further receives configuration data instructing the configurable feedback data circuit 160 to close switch S6 to the dependent current source 104, and to close switch S7 to the output of the op-amp 106.

Figure 34:
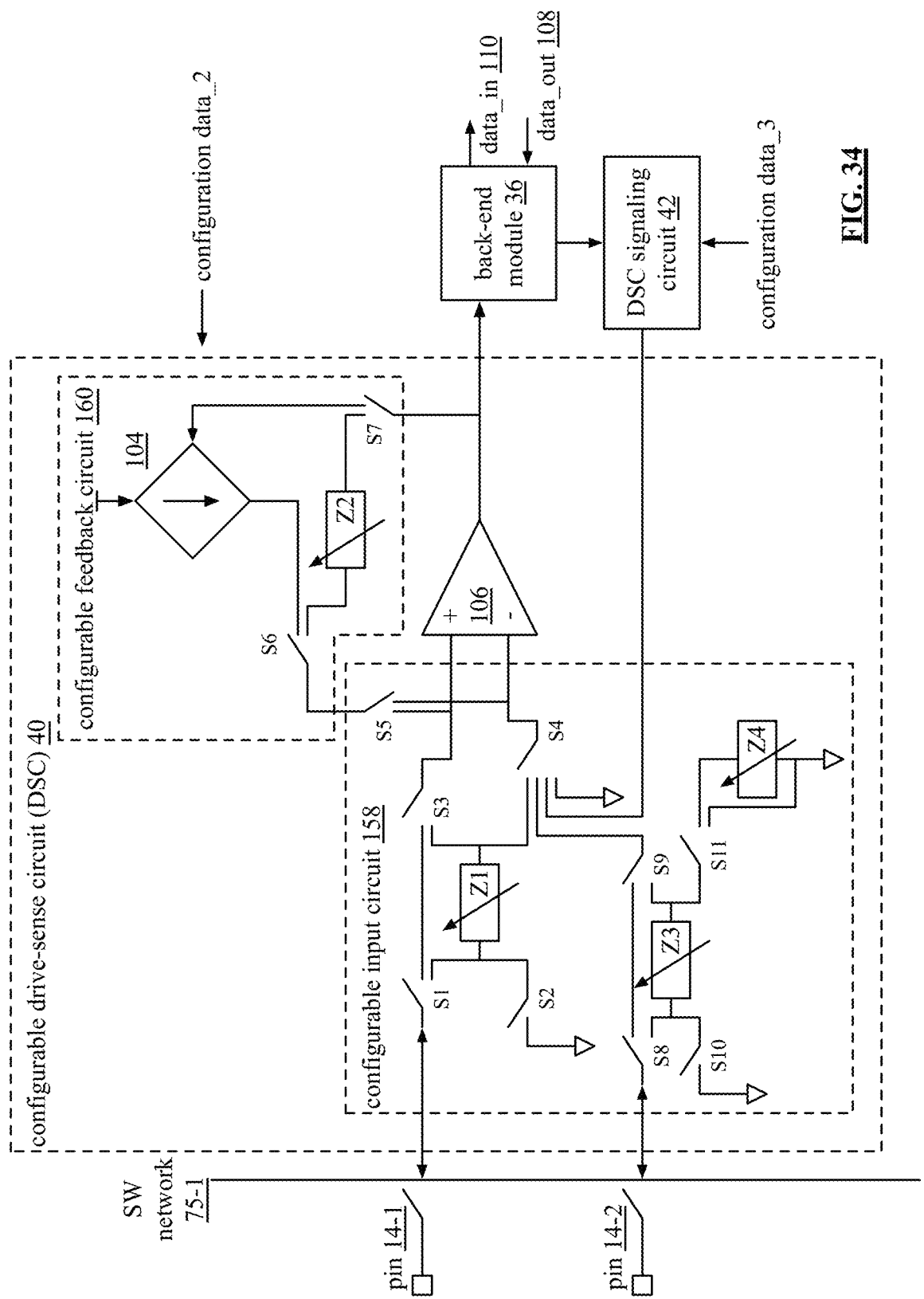
FIG. 34 is a schematic block diagram of another embodiment of a configurable drive-sense circuit (DSC) in accordance with the present invention.

FIG. 34 is a schematic block diagram of another embodiment of a configurable drive-sense circuit (DSC) 40 coupled to the DSC signaling circuit 42 and the back-end module 36. FIG. 34 operates similarly to the example of FIG. 21 except that pins 14-1 and 14-2 are connectable to the configurable input circuit 158 via a switching (SW) network 75-1 and the configurable input circuit 158 further includes switches S8-S11 and variable impedances Z3-Z4. The embodiment shown allows for two pins to be selectively connected to the configurable input circuit 158.

FIG. 35 is a schematic block diagram of an embodiment of a differential operational amplifier (op-amp) 95 configuration of a configurable drive-sense circuit (DSC) 40 coupled to pins 14-1 and 14-2. The differential op-amp 95 includes op-amp 106, impedances Z1-Z4, and operates as described in FIG. 18

FIG. 36 is a schematic block diagram of an embodiment of differential op-amp 95 configuration of a configurable drive-sense circuit (DSC) 40 coupled to pins 14-1 and 14-2 via a switching (SW) network 75-1, the DSC signaling circuit 42, and the back-end module 36.

The configurable input circuit 158 includes switches S1-S5 and S8-S11 and variable impedances Z1, Z3, and Z4. The configurable feedback circuit 160 includes a dependent current source 104, switches S6-S7, and a variable impedance Z2.

To set the configurable DSC 40 as a differential op-amp 95 as shown in FIG. 35, the SW network 75-1 receives instructions to close switches from pins 14-1 and 14-2 to the configurable input circuit 158. The configurable DSC circuit 40 receives configuration data instructing the configurable input circuit 158 to close switch S1 from the pin 14-1 to variable impedance Z1, to set the variable impedance Z1 to a desired impedance, to close switch S3 from the variable impedance Z1 to a first terminal of the op-amp 106, and to close switch S5 to connect with the configurable feedback circuit 160 with a first terminal of the op-amp 106.

The configurable DSC circuit 40 further receives configuration data instructing the configurable input circuit 158 to close switch S8 from the pin 14-2 to variable impedance Z3, to close switch S9 from the variable impedance Z3 to the switch S4 to a second terminal of the op-amp 106, to close switch S11 to the grounded variable impedance Z4, and to set the variable impedances Z3-Z4 to desired impedances.

The configurable DSC circuit 40 further receives configuration data instructing the configurable feedback data circuit 160 to close switch S6 to connect the variable impedance Z2, to close switch S7 from the variable impedance Z2 to the output of the op-amp 106, and to set the variable impedance Z2 to a desired feedback impedance.

Figure 37:
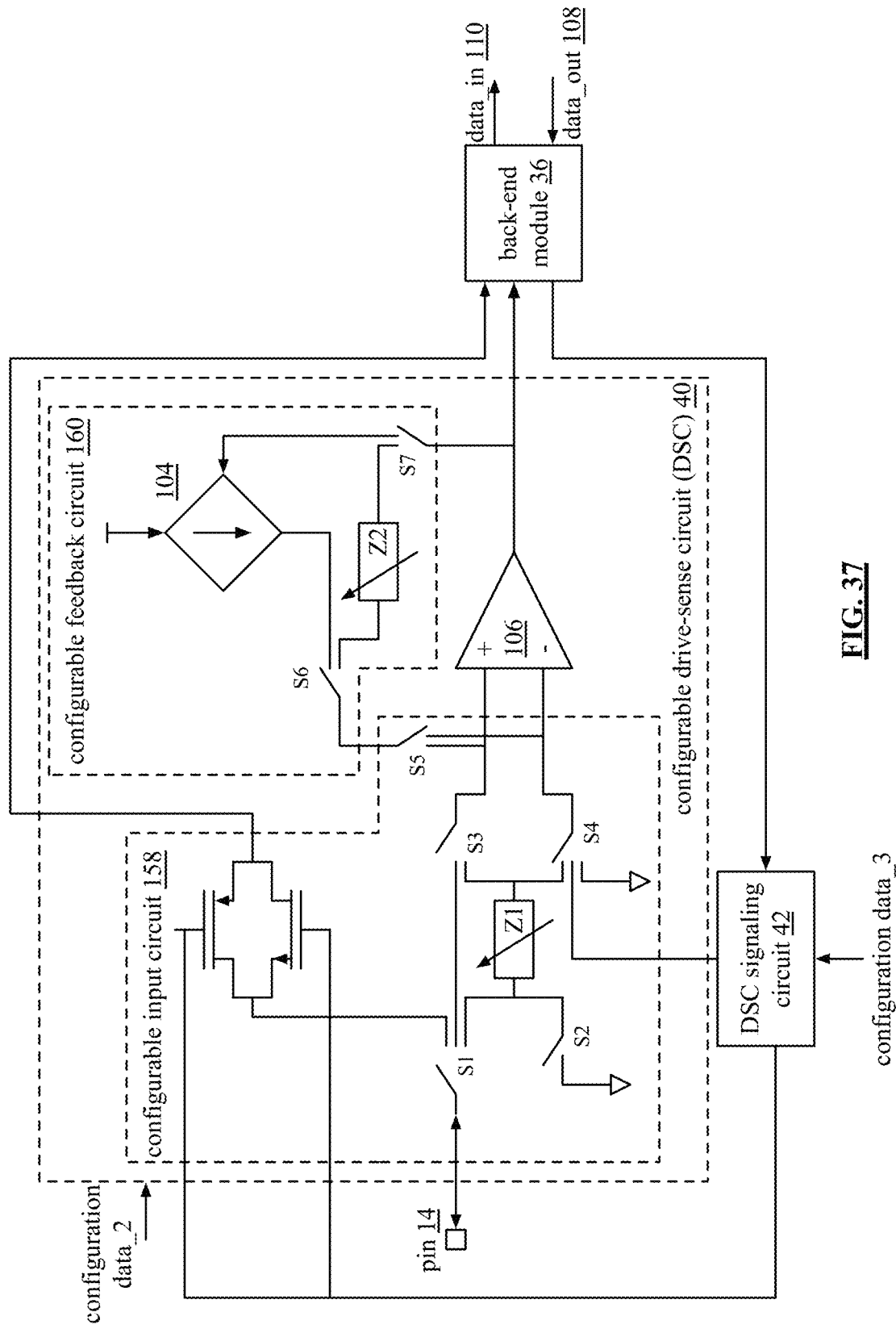
FIG. 37 is a schematic block diagram of another embodiment of a configurable drive-sense circuit (DSC) in accordance with the present invention.

FIG. 37 is a schematic block diagram of another embodiment of a configurable drive-sense circuit (DSC) 40 coupled to DSC signaling circuit 42 and a back-end module 36. FIG. 37 operates similarly to the example of FIG. 21 except that the configurable input circuit 158 includes a bidirectional switch component.

FIG. 38 is a schematic block diagram of an embodiment of a bidirectional switch 82 configuration of a configurable drive-sense circuit (DSC) 40 coupled to a pin 14. The bidirectional switch 82 includes a p-channel field effect transistor (e.g., a p-channel metal oxide semiconductor field effect transistor (MOSFET) or PMOS) with its source terminal connected to the pin 14 and its drain terminal connected to the back-end module 36 and an n-channel field effect transistor (e.g., an n-channel metal oxide semiconductor field effect transistor (MOSFET) or NMOS) with its drain terminal connected to the pin 14 and its source terminal connected to the back-end module 36. The bidirectional switch 82 operates as described with reference to FIG. 11.

FIG. 39 is a schematic block diagram of an embodiment of a bidirectional switch 82 configuration of a configurable drive-sense circuit (DSC) 40 coupled to a pin 14, the DSC signaling circuit 42, and the back-end module 36.

To set the configurable DSC 40 as a bidirectional switch 82 as shown in FIG. 38, the configurable DSC circuit 40 receives configuration data instructing the configurable input circuit 158 to close switch S1 from the pin 14 to the input of the bidirectional switch component. The output of the bidirectional switch component is connected to the back-end module 36 such that the configurable feedback circuit 160 is not used in this example.

The DSC signaling circuit 42 receives configuration data pertaining to generating an enable signal 112 for the bidirectional switch. The DSC signaling circuit 42 sends the enable signal 112 to the gate terminals of the bidirectional switch transistors.

Figure 40:
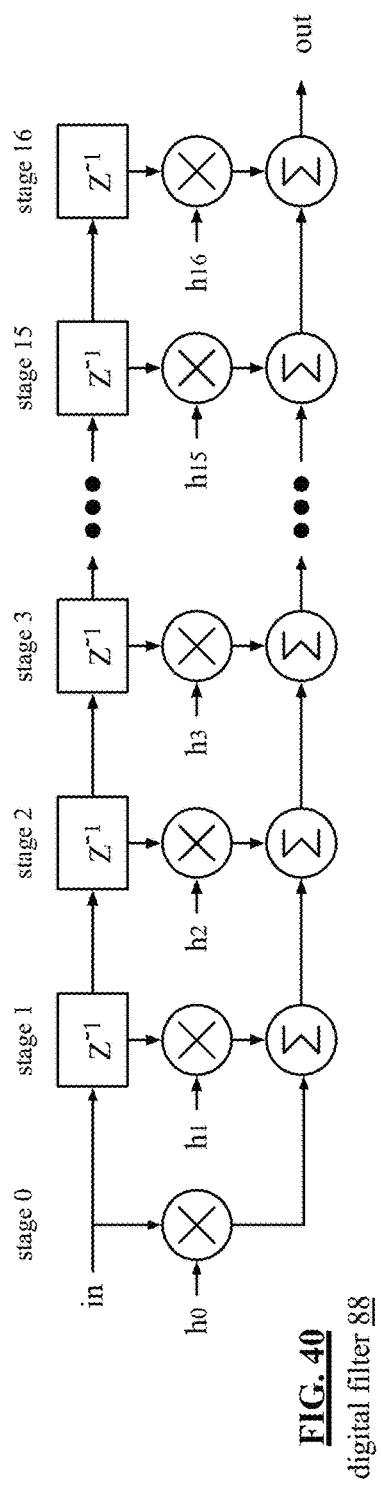
FIG. 40 is a schematic block diagram of an embodiment of a digital filter configuration of a back-end module in accordance with the present invention.

FIG. 40 is a schematic block diagram of an embodiment of a digital filter 88 configuration of a back-end module of a programmable input/output (I/O) interface module. The back-end module 36 may be configured as a digital filter when the data to and from the front-end module requires digital filtering.

As an example, the digital filter 88 configuration is a bandpass filter (BPF) that includes 16 taps but could have more or less taps than the 16 shown (e.g., "x" taps where "x" is an integer of 1 or more) depending on how many data points/samples are needed to accurately interpret a cycle of the input signal. An input signal (e.g., data from a configurable drive-sense circuit (DSC) or another component of an integrated circuit) enters the digital filter 88 at stage 0 where it is multiplied by coefficient $h_0$ and also input into stage 1. Stages 1-16 each include a unit delay $Z^{-1}$ in Z-transform notation to provide delayed inputs (taps) to each stage's multiplication operation (i.e., the input signal is multiplied by the next coefficient (e.g., $h_1$-$h_{16}$) after a delay $Z^{-1}$). The results of the multiplication operation from each stage are added to create the output. In this example, the output is a pulse representative of 1 or 2-bits of filtered digital data (e.g., −1 or 1 for 1-bits, and −2, −1, 1, 2 for 2-bits).

Figure 41:
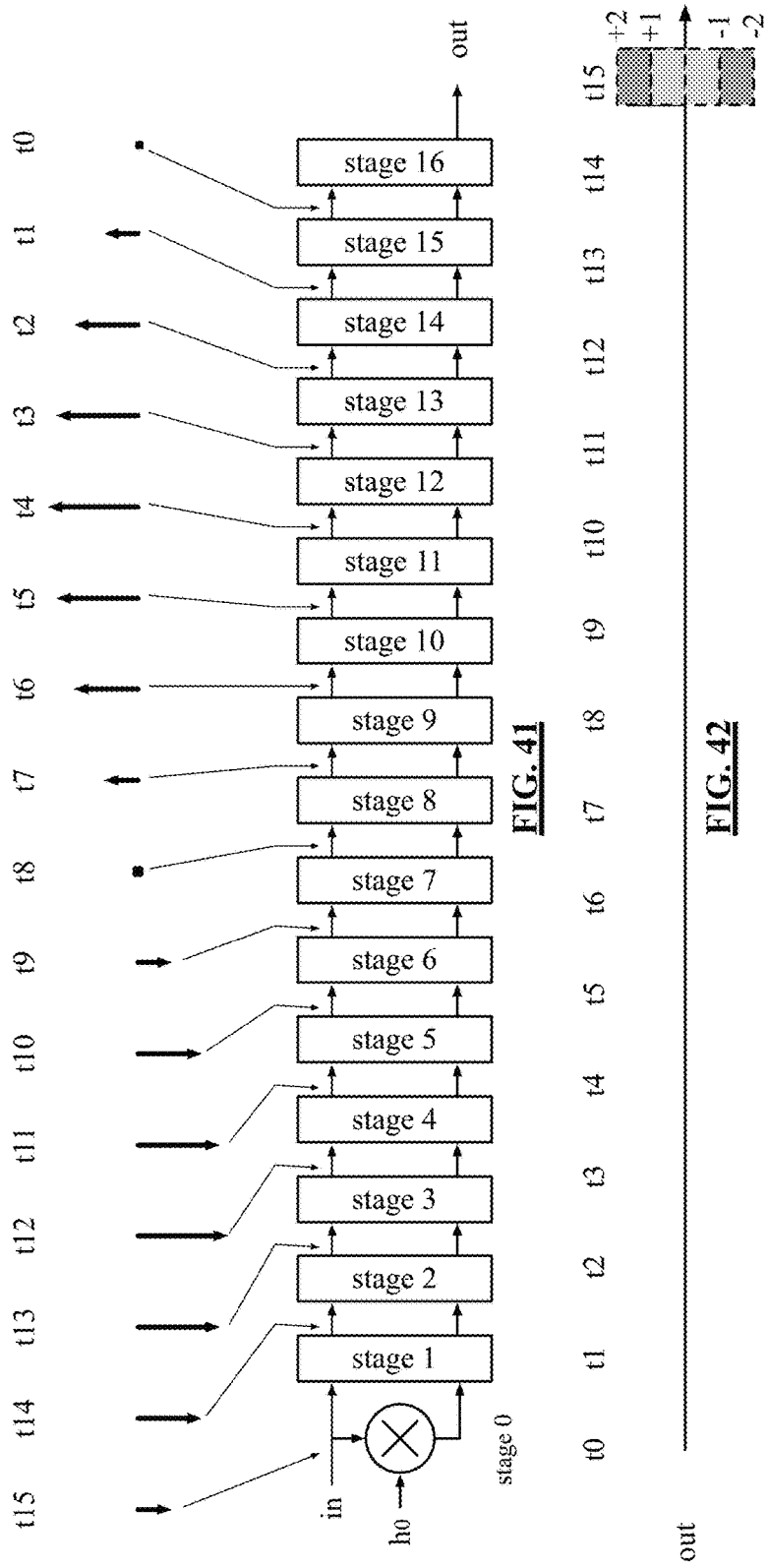
FIG. 41 is a schematic block diagram of another embodiment of a digital filter configuration of a back-end module in accordance with the present invention.

FIG. 41 is a schematic block diagram of another embodiment of the digital filter 88 configuration of a back-end module of a programmable input/output (I/O) interface module. The digital filter 88 is a digital bandpass filter (BPF) having 16 stages and filters an input signal (e.g., data from a configurable drive-sense circuit (DSC) or another component of an integrated circuit) from time t0 to t15.

The digital filter 88 is set to recognize when a full cycle of the input signal has passed through its 16 taps. At a snapshot in time, every time the pattern is in the shown position (e.g., the input signal enters the digital filter 88 at stage 0, time t0, and a full cycle of the input signal is recognized at the taps of the digital filter 88 by stage 16, time t15), the digital filter 88 outputs a pulse representative of the input signal at t15 (e.g., logic 1 or 0 for 1-bit or logic 00, 01, 10, or 11 for 2-bit based on magnitude, phase, and/or frequency, etc.).

Figure 42:
FIG. 42 is a schematic block diagram of an embodiment of the output of the digital filter of FIGS. 40 and 41 in accordance with the present invention.

FIG. 42 is a schematic block diagram of an embodiment of the output of the digital filter 88 of FIGS. 40 and 41. At time t15, when the pattern shown (e.g., one cycle of the input signal) in FIG. 41 is recognized by the digital filter 88, the digital filter 88 outputs a pulse representative of the input signal (e.g., logic 1 or 0 for 1-bit or logic 00, 01, 10, or 11 for 2-bit based on magnitude, phase, and/or frequency, etc.).

As a specific example, the digital filter 88 filters one cycle of the input signal with magnitude $V_{p-p1}$ (e.g., 0.5) and 0° phase (where 0.5 magnitude and 0° phase correspond to logic "00") and produces an output pulse of −2 corresponding to 2-bits of filtered digital data representative of logic "00" at time t15 (i.e., as soon as the pattern shown in FIG. 41 is recognized by the filter).

Figure 43:
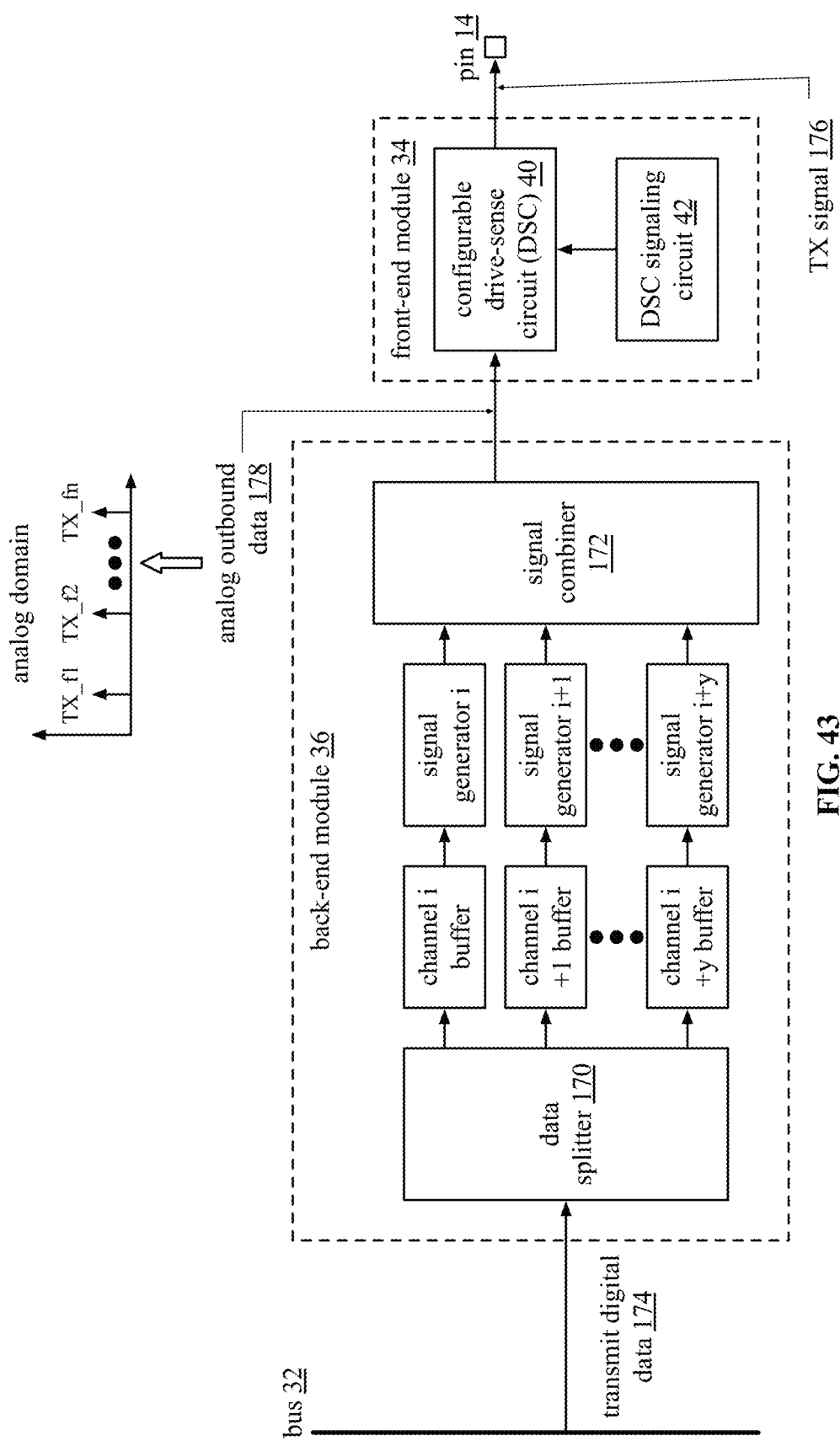
FIG. 43 is a schematic block diagram of an embodiment of a transmit-receive (TX-RX) data formatting configuration of a back-end module in accordance with the present invention.

FIG. 43 is a schematic block diagram of an embodiment of a transmit-receive (TX-RX) data formatting 96 configuration of a back-end module 36 of a programmable input/output (IO) interface module 16. The back-end module 36 is coupled to the bus 32 and a front-end module 34 and the front-end module 34 is coupled to the pin 14. The front-end module 40 includes a configurable drive sense circuit (DSC) 40 and a DSC signaling circuit 42. The back-end module 36 may be configured for TX-RX data formatting 96 when the configurable DSC circuit 40 is configured as the input/output (IO) front-end circuit 2 (concurrent transmit-receive TX-RX circuit).

In this example, the back-end module 36 is configured for formatting digital data for transmit. The back-end module 36 includes a data splitter 170, a plurality of channel buffers (i through i+y), a plurality of signal generators (i through i+y), and a signal combiner 172.

In an example, the data splitter 170 receives transmit digital data 174 (e.g., data_out 136) from a line of the bus 32 and divides it into a plurality of data streams. For example, the data splitter 170 splits transmit digital data 174 into a data packet amount of data at a time. A corresponding channel buffer stores a data stream. For instance, channel buffer i stores data stream i; channel buffer i+1 stores data stream i+1, and so on. The data streams are written into the channel buffers in accordance with the host data rate. The data, however, is read out of the channel buffers in accordance with transmit clock rates for each of the signal generators. The transmit clocks corresponds to the frequency of the channel being used by a signal generator.

Each enabled signal generator uses a different channel to convert bits of its respective data stream into respective portions of the analog outbound data 178. For example, signal generator i uses channel 1, which has a first frequency (f1), signal generator i+1 uses channel 2, which has a second frequency (f2), and so on. Note that, one or more of the signal generators is activated to convert the transmit digital data 174 into the analog outbound data 178.

As a specific example, signal generator i converts n-bits of its data stream at a time into an analog signal component of the analog outbound data 178, where n is an integer greater than or equal to one. For an n-bit sample of its data stream, the signal generator encodes the n-bit sample into a sinusoidal signal having a frequency at f1 using amplitude shift keying (ASK) signal and/or a phase shift keying (PSK) signal. Signal generator i+1 functions similarly by encoding an n-bit sample of its data stream into a sinusoidal signal having a frequency at f2 using ASK and/or PSK.

The configurable DSC 40 converts the analog outbound data 178 into an analog transmit (TX) signal 176, which it transmits on to a pin 14.

Figure 44:
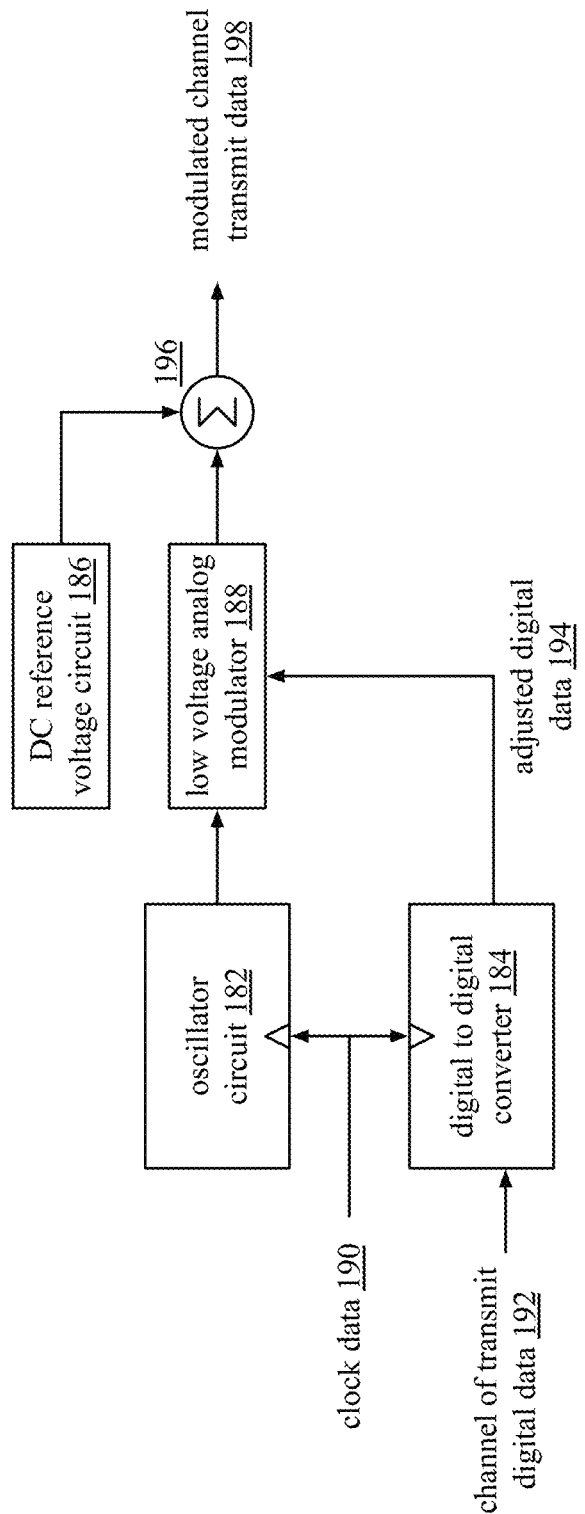
FIG. 44 is a schematic block diagram of an embodiment of a signal generator in accordance with the present invention.

FIG. 44 is a schematic block diagram of an embodiment of a signal generator 180 that includes a digital to digital converter 184, an oscillator circuit 182, a low voltage analog modulator 188, a direct current (DC) reference voltage circuit 186, and a summing circuit 196.

The digital to digital converter 184 is operable to convert a channel of transmit digital data 192 into the adjusted digital data 194, where the transmit digital data is synchronized to the clock data 190. For example, the digital to digital converter 184 converts the channel of transmit digital data 192 into 2-bit digital inputs as the adjusted digital data 194.

The oscillator circuit 182 is synchronized with the clock data 190 and generates an oscillating signal component at a particular frequency. The oscillating signal component is limited to a range that is less than a difference between the magnitudes of the power supply rails of the signal generator 180. For example, the magnitude of the oscillating signal component can be in range of 5% to 75% of the difference between magnitudes of power supply rails.

The low voltage analog modulator 188 modulates the adjusted digital data 194 with the oscillating signal component generated by the oscillator circuit 182. For example, the low voltage analog modulator 188 uses amplitude shift keying (ASK), phase shift keying (PSK), frequency shift keying (FSK), and/or a combination thereof to modulate the oscillating signal component to represent the adjusted digital data 194.

As an example, when the adjusted digital data 194 is a 2-bit digital input representative of a digital logic value and the low voltage analog modulator 188 is using ASK modulation, the oscillating signal component's peak-to-peak voltage $V_{p\text{-}p}$ is adjusted based on a digital logic value. For example, the low voltage analog modulator 188 adjusts the oscillating signal component's peak-to-peak voltage $V_{p\text{-}p}$ to a peak-to-peak voltage "$V_{p\text{-}p1}$" to represent a logic "00" of the adjusted digital data 194, to a peak-to-peak voltage "$V_{p\text{-}p2}$" to represent a logic "01" of the adjusted digital data 194, to a peak-to-peak voltage "$V_{p\text{-}p3}$" to represent a logic "10" of the adjusted digital data 194, and to a peak-to-peak voltage "$V_{p\text{-}p4}$" to represent a logic "11" of the adjusted digital data 194.

As another example, when the adjusted digital data 194 is a 2-bit digital input representative of a digital logic value and the low voltage analog modulator 188 is using PSK modulation, the oscillating signal component's phase is adjusted based on a digital logic value. For example, a 0° phase shift represents a logic "00" of the adjusted digital data 194, a 90° phase shift represents a logic "01" of the adjusted digital data 194, a 180° phase shift represents a logic "10" of the adjusted digital data 194, and a 270° phase shift represents a logic "11" of the adjusted digital data 194.

The DC reference voltage circuit 186 is operable to produce a DC component that has a magnitude between the magnitudes of the power supply rails of the signal generator 180. The modulated oscillating signal component and the DC component are combined by the summing circuit 196 to produce modulated channel transmit data 198.

Figure 45:
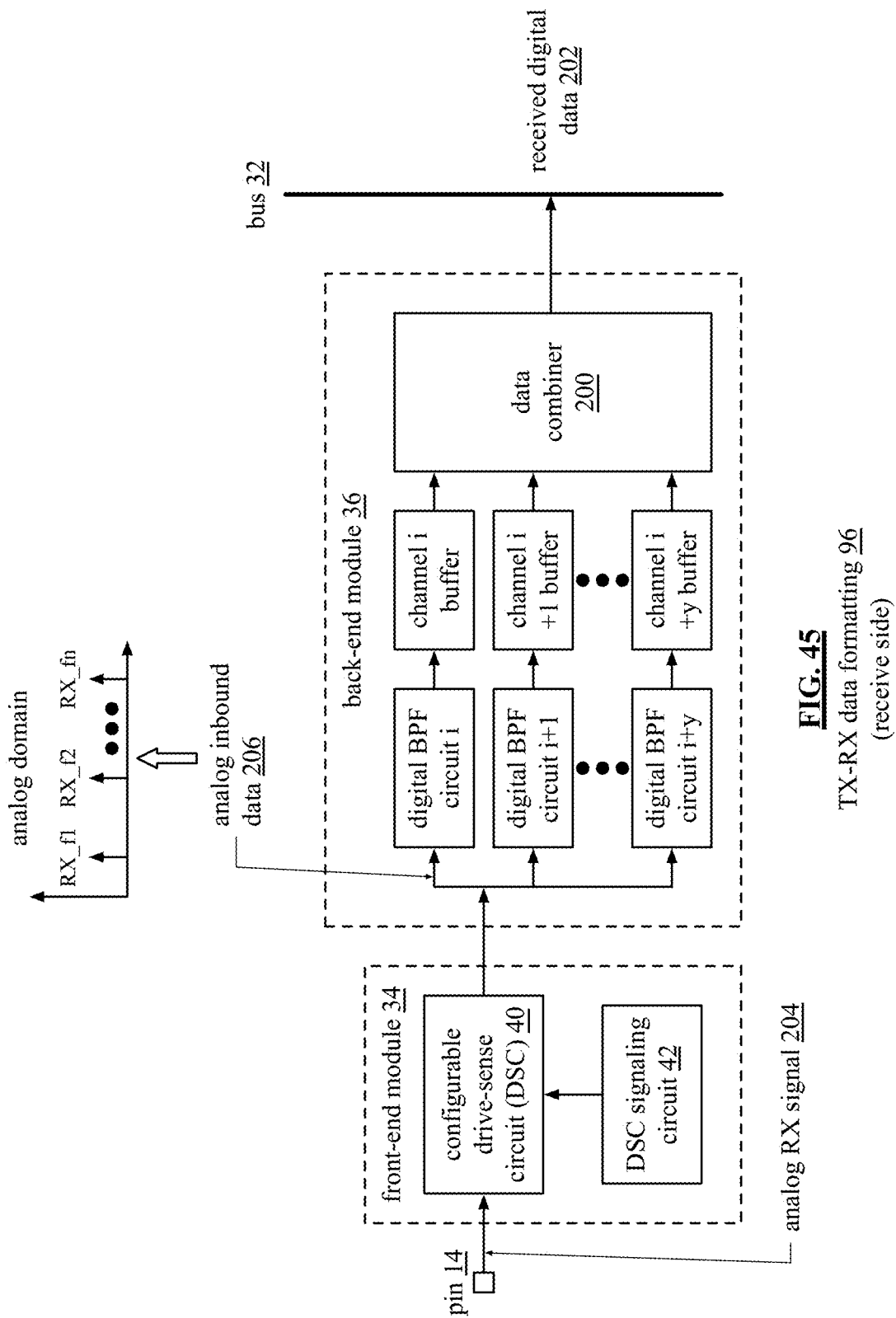
FIG. 45 is a schematic block diagram of an embodiment of a transmit-receive (TX-RX) data formatting configuration of a back-end module in accordance with the present invention.

FIG. 45 is a schematic block diagram of a transmit-receive data formatting configuration 96 of a back-end module 36 of a programmable input/output (IO) interface module 16. The back-end module 36 is coupled to the bus 32 and a front-end module 34 and the front-end module 34 is coupled to a pin 14. The front-end module 40 includes a configurable drive sense circuit (DSC) 40 and a DSC signaling circuit 42. The configurable drive sense circuit 40 receives an analog receive (RX) signal 204 (e.g., RX signal 140) via the pin 14 and converts it into analog inbound data 206.

FIG. 45 operates similarly to FIG. 43 except that the back-end module 36 is configured for formatting analog data that is received (e.g., the analog inbound data 206) and includes a plurality of digital bandpass filter circuits (BPF i through i+y), a plurality of channel buffers (i through i+y), and a data combiner 200.

Each digital bandpass filter (BPF) circuit includes an analog to digital converter and a digital bandpass filter. Each active digital BPF circuit receives the analog inbound data 206. In addition, each active digital BPF circuit is tuned for a different channel. For example, digital BPF circuit i is tuned for frequency 1, digital BPF circuit i+1 is tuned for frequency 2, and so on. As such, digital BPF circuit i converts the analog inbound data into digital inbound data, filters it, and outputs the n-bit digital values corresponding to the data stream processed by signal generator i. Similarly, digital BPF circuit i+1 converts the analog inbound data into digital inbound data, filters it, and outputs the n-bit digital values corresponding to the data stream processed by signal generator i+1; and so on.

The channel buffers store the n-bit digital values outputted by their respective digital BPF circuits. The data combiner 200 retrieves data from the channel buffers and periodically outputs the received digital data 202 (e.g., data_in 134). For example, a block of data is inputted into the data splitter 200 in accordance with a data rate of a device sending the analog RX signal (e.g., a host device). As a specific simplified example, assume the data block includes 24-bits and is clocked into the data splitter serially over 24 intervals of a data clock of a host device. Further assume that the 24-bits are divided into three data streams, each 8-bits (i.e., 3, 8-bit data packets where data combiner combines signals a data packet worth of data at a time). As such, three paths will be activated to the data combiner 200.

Each activated path operates independent of the other paths and at different rates to process their respective data streams of the data block. For example, the first path (e.g., signal generator i through digital BPF circuit i) operates in accordance with frequency f1, which is at slightly higher frequency than that of the data rate of host 1; the second path (e.g., signal generator i+1 through digital BPF circuit i+1) operates in accordance with frequency f2, which is at slightly higher frequency than that of frequency f1; and the third path (e.g., signal generator i+2 through digital BPF circuit i+2) operates in accordance with frequency f3, which is at slightly higher frequency than that of frequency f2.

Continuing with the simplified example, further assume that the data clock of host 1 is 1.000 GHz for a 125 Mega Byte per second (MBps) data rate, which corresponds to a 1 Gbps data rate; data is provided to the data splitter a byte at a time; frequency f1 is at 1.010 GHz, frequency f2 is at 1.020 GHz, and frequency f2 is at 1.030 GHz. There are a variety of ways the data splitter can divide the data and put it into the channel buffers. For example, the data splitter uses a bit-by-bit round robin distribution.

Figure 46:
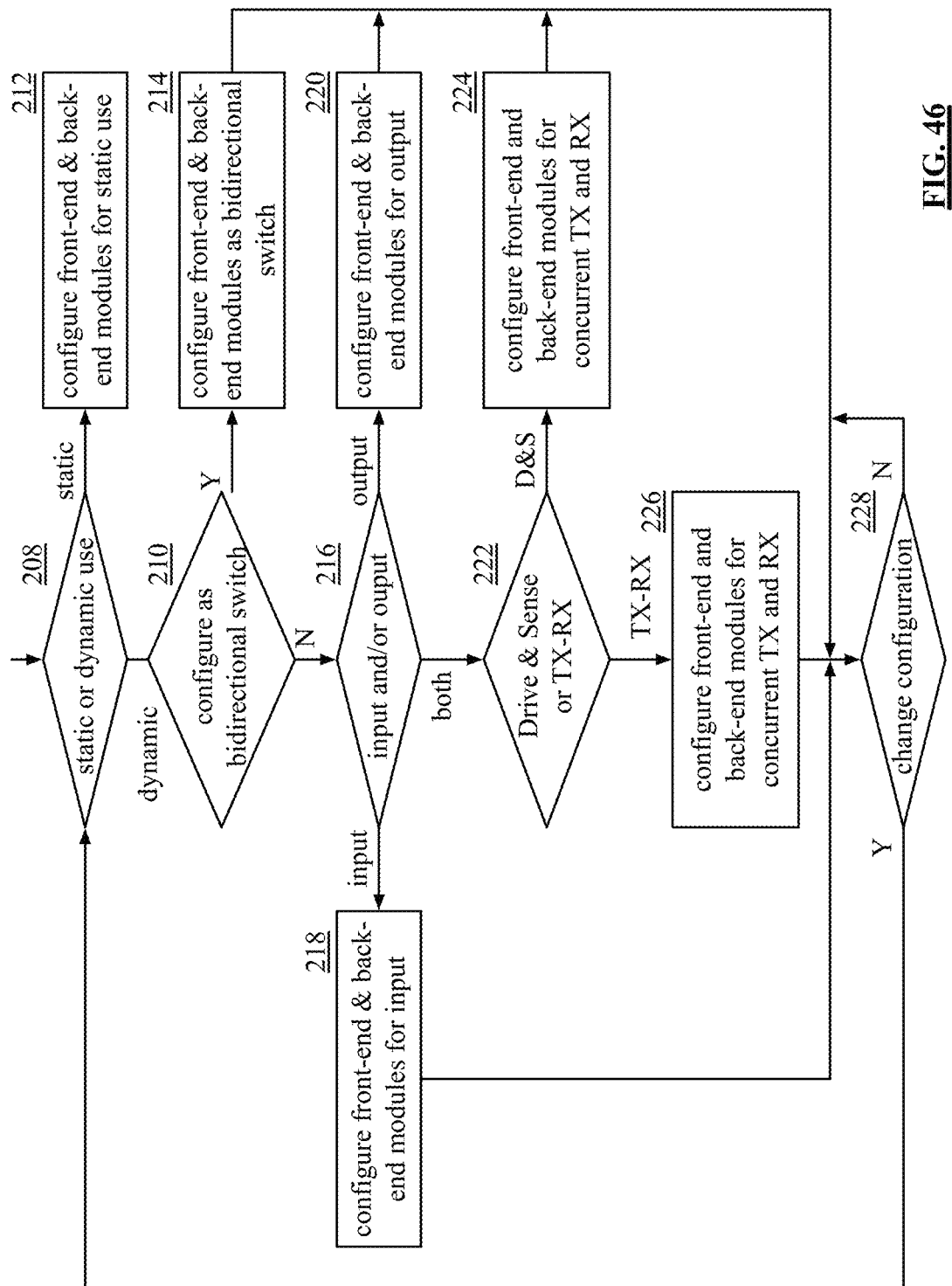
FIG. 46 is a flowchart of an example of a method of programming of a programmable input/output (IO) interface module in accordance with the present invention.

FIG. 46 is a flowchart of an example of a method of programming of a programmable input/output (IO) interface module. For example, at the power up of an integrated circuit (IC), the IO control module of the IC determines how to program each programmable IO interface module of the IC. The method begins with step 208, where the IO control module of the IC determines whether the programmable IO interface module is for static or dynamic use.

If the programmable IO interface module is for static use, the method continues with step 212 where the IO control module configures the front-end and back-end modules of the programmable IO interface module for static use. For static use, the programmable IO interface module is configured in accordance with a fixed purpose. To configure the programmable IO interface module in accordance with a static use, the IO control module looks up the appropriate configuration from a lookup table. Alternatively, the steps for determining dynamic use (e.g., steps 210-226) can be used to determine the initial static use configuration.

If the programmable IO interface module is for dynamic use (e.g., the configuration can be dynamically changed), the method continues with step 210 where the IO control module determines whether to configure the programmable IO interface module as a bidirectional switch. When the IO control module determines to configure the programmable IO interface module as the bidirectional switch, the method continues with step 214 where the IO control module configures one or more of the front-end and back-end modules of the programmable IO interface module as a bidirectional switch.

For example, to implement a bidirectional switch, the front-end module is configured as discussed with reference to FIGS. 11, 38, and 39 and the back-end module is configured as a bidirectional switch, a buffer, a digital to analog converter (DAC), a level shift circuit, and/or a combination thereof depending on how the data should be formatted to and from the bus.

When the IO control module does not determine to configure the programmable IO interface module as the bidirectional switch at step 210, the method continues with step 216 where the IO control module determines whether to configure the programmable IO interface module for input and/or output.

When the IO control module determines to configure the programmable IO interface module as an input, the method continues with step 218 where the IO control module configures the front-end and back-end modules of the programmable IO interface module for input. For example, the front-end module includes the configurable drive-sense circuit (DSC) and the DSC signaling circuit. The configurable DSC circuit is configurable as a non-inverting operational amplifier (op-amp) (e.g., as discussed with reference to FIGS. 10, 26, and 27), an inverting op-amp (e.g., as discussed with reference to FIGS. 9, 24, and 25), or a differential circuit (e.g., a differential op-amp as discussed with reference to FIGS. 18 and 34-36 or as part of the differential circuit as discussed with reference to FIG. 19).

The back-end module 36 may be a bidirectional switch, a buffer, a digital to analog converter (DAC), a level shift circuit, an analog to digital converter (ADC), a gain circuit, an inverter, a digital filter, a differential op-amp (e.g., as part of the differential circuit as discussed with reference to FIG. 19), and/or a combination thereof. The configuration of the front-end and back-end modules depends on whether the input is from digital to digital, analog to analog, analog to digital, or digital to analog from the pin to the bus. The configuration of the front-end and back-end modules for input is discussed further with reference to FIG. 48.

When the IO control module determines to configure the programmable IO interface module as an output, the method continues with step 220 where the IO control module configures the front-end and back-end modules of the programmable IO interface module for output. For example, the configurable DSC circuit of the front-end module is configurable as an output driver (e.g., as discussed with reference to FIGS. 8, 28, and 29) or as a voltage output (e.g., a discussed with reference to FIG. 16).

The back-end module 36 may be a bidirectional switch, a buffer, a digital to analog converter (DAC), a level shift circuit, an analog to digital converter (ADC), a gain circuit, an inverter, a digital filter, and/or a combination thereof. The configuration of the front-end and back-end modules depends on whether the output is from digital to digital, analog to analog, analog to digital, or digital to analog from the bus to the pin. The configuration of the front-end and back-end modules for output is discussed further with reference to FIG. 47.

When the IO control module does not determine to configure the programmable IO interface module for input and/or output at step 216, the method continues with step 222 where the IO control module determines whether to configure the programmable IO interface module for concurrent drive & sense or concurrent transmit-receive (TX-RX).

When the IO control module determines to configure the programmable IO interface module for concurrent drive & sense (D&S), the method continues with step 224 where the IO control module configures the front-end and back-end modules of the programmable IO interface module for concurrent drive & sense (D&S). For example, the configurable DSC circuit of the front-end module is configurable as a concurrent drive & sense circuit (e.g., as discussed with reference to FIGS. 12, 13, 30, and 31). The back-end module 36 may be configured as a bidirectional switch, a buffer, an analog to digital converter (ADC), a digital filter, a gain circuit, and/or a combination thereof depending on one or more of: a desired data format for sensed data from the pin, data synchronization of sensed data from the pin, and compatibility with other integrated circuit components.

When the IO control module determines to configure the programmable IO interface module for concurrent transmit-receive (TX-RX), the method continues with step 226 where the IO control module configures the front-end and back-end modules of the programmable IO interface module for concurrent transmit and receive (TX-RX). For example, the configurable DSC circuit of the front-end module is configurable as a concurrent TX-RX circuit (e.g., as discussed with reference to FIGS. 14, 15, 32, and 33). The back-end module is configurable be as a bidirectional switch, a buffer, an analog to digital converter (ADC), digital filter, a gain circuit, and/or a combination thereof depending on one or more of: a desired data format for the data coming in to the bus and/or out to the front-end module, data synchronization of data coming in to the bus and/or out to the front-end module, and compatibility with other integrated circuit components.

After the programmable IO interface module is configured for a particular use at steps 214, 218, 220, 224, or 226, the method continues to step 228 where the IO control module determines whether to change the configuration. If the IO control module determines to change the configuration, the method branches back to step 208 to determine the next configuration. If the IO control module determines to not to change the configuration, the method branches back to step 228 until a change in configuration is desired. For a next configuration, static or dynamic use can be predetermined such that the query at step 208 is skipped with an automatic response.

FIG. 47 is a flowchart of an example of a method of programming the front-end and back-end modules of a programmable input/output (IO) interface module for output. When the IO control module determines to configure the programmable IO interface module as a bidirectional switch or as an output in steps 214 or 220 of FIG. 46, the method continues with step 230 of FIG. 47 where the IO control module determines whether to set up the output as digital to digital (e.g., digital from the bus to the pin).

When the IO control module determines to configure the output for digital to digital, the method continues with step 232 where the IO control module configures the front-end and back-end modules of the programmable IO interface module for digital to digital output. For example, the back-end module is configured as a buffer, a bidirectional switch, delay circuit, a digital circuit, a level shift, an inverter, or a combination thereof. The front-end is configured as a digital output driver, a bidirectional switch, or a digital voltage output.

When the IO control module determines to not configure the output for digital to digital, the method continues with step 234 where the IO control module determines whether to set up the output as analog to analog.

When the IO control module determines to configure the output for analog to analog, the method continues with step 236 where the IO control module configures the front-end and back-end modules of the programmable IO interface module for analog to analog output. For example, the back-end module is configured as a buffer, a bidirectional switch, delay circuit, a level shift, a gain, an inverter, or a combination thereof. The front-end is configured as an analog output driver, a bidirectional switch, or an analog voltage output.

When the IO control module determines to not configure the output for analog to analog, the method continues with step 238 where the IO control module determines whether to set up the output as analog to digital.

When the IO control module determines to configure the output for analog to digital, the method continues with step 240 where the IO control module configures the front-end and back-end modules of the programmable IO interface module for analog to digital output. For example, the back-end module is configured as a buffer, a bidirectional switch, delay circuit, a level shift, an analog to digital converter (ADC), a digital filter, or a combination thereof. The front-end is configured as a digital output driver, a bidirectional switch, or a digital voltage output.

When the IO control module determines to not configure the output for analog to digital, the method continues with step 242 where the IO control module determines to configure the front-end and back-end modules of the programmable IO interface module for digital to analog output. For example, the back-end module is configured as a buffer, a bidirectional switch, delay circuit, a level shift, a digital to analog converter (DAC), or a combination thereof. The front-end is configured as an analog output driver, a bidirectional switch, or an analog voltage output.

FIG. 48 is a flowchart of an example of a method of programming the front-end and back-end modules of a programmable input/output (IO) interface module for input. When the IO control module determines to configure the programmable IO interface module as a bidirectional switch or as an input in steps 214 or 218 of FIG. 46, the method continues with step 244 of FIG. 48 where the IO control module determines whether to set up the input as digital to digital (e.g., digital the pin to the bus).

When the IO control module determines to configure the input for digital to digital, the method continues with step 248 where the IO control module configures the front-end and back-end modules of the programmable IO interface module for digital to digital input. For example, the front-end is configured as a bidirectional switch, a non-inverting operational amplifier (op-amp), an inverting op-amp, a differential op-amp, or part of a differential circuit. The back-end module is configured as a differential op-amp, a buffer, a bidirectional switch, delay circuit, a digital filter, a level shift, an inverter, or a combination thereof.

When the IO control module determines to not configure the input for digital to digital, the method continues with step 246 where the IO control module determines whether to set up the input as analog to analog.

When the IO control module determines to configure the input for analog to analog, the method continues with step 250 where the IO control module configures the front-end and back-end modules of the programmable IO interface module for analog to analog input. For example, the front-end is configured as a bidirectional switch, a non-inverting op-amp, an inverting op-amp, a differential op-amp, or part of a differential circuit. The back-end module is configured as a differential op-amp, a buffer, a bidirectional switch, delay circuit, a level shift, a gain, an inverter, or a combination thereof.

When the IO control module determines to not configure the input for analog to analog, the method continues with step 252 where the IO control module determines whether to set up the input as analog to digital.

When the IO control module determines to configure the input for analog to digital, the method continues with step 254 where the IO control module configures the front-end and back-end modules of the programmable IO interface module for analog to digital input. For example, the front-end is configured as a bidirectional switch, a non-inverting op-amp, an inverting op-amp, a differential op-amp, or part of a differential circuit. The back-end module is configured as a differential op-amp, buffer, a bidirectional switch, delay circuit, a level shift, an analog to digital converter (ADC), a digital filter, or a combination thereof.

When the IO control module determines to not configure the input for analog to digital, the method continues with step 256 where the IO control module determines to configure the front-end and back-end modules of the programmable IO interface module for digital to analog input. For example, the front-end is configured as a bidirectional switch, a non-inverting op-amp, an inverting op-amp, a differential op-amp, or part of a differential circuit. The back-end module is configured as a differential op-amp, a buffer, a bidirectional switch, delay circuit, a level shift, a digital to analog converter (DAC), or a combination thereof.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling"

includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A programmable input/output (IO) module comprises:
    a front-end module includes:
        a configurable drive sense circuit (DSC);
        a DSC signaling circuit operably coupled to the configurable DSC, wherein, for a particular configuration of the configurable DSC, the DSC signaling circuit provides a particular signal to the configurable DSC, wherein the configurable DSC is operable to provide a pin interface with one or more pins of an integrated circuit, wherein characteristics of the pin interface are configured in accordance with front-end configuration instructions;
    a back-end module operably coupled to the front-end module, wherein the back-end module is operable to provide a bus interface with one or more buses of the integrated circuit, and wherein characteristics of the bus interface are configured in accordance with back-end configuration instructions; and
    an IO configuration module operable to:
        receive configuration instructions regarding the one or more pins;
        generate the front-end configuration instructions based on the configuration instructions; and
        generate the back-end configuration instructions based on the configuration instructions.

2. The programmable IO module of claim 1, wherein the front-end configuration instructions comprises:
    first configuration instructions for configuring the configurable DSC; and
    second configuration instructions regarding signal generation by the DSC signaling circuit.

3. The programmable IO module of claim 1, wherein the configurable drive sense circuit (DSC) comprises:
    a configurable input circuit operable to be coupled to the one or more pins;
    a configurable feedback circuit operably coupled to the configurable input circuit and to the back-end module; and
    an operational amplifier having inputs coupled to the configurable input circuit and to the configurable feedback circuit, wherein an output of the operational amplifier is operably coupled to the coupling of the back-end module to the configurable feedback circuit.

4. The programmable IO module of claim 1, wherein the configurable drive sense circuit (DSC) is configurable based on the first configuration instructions to provide at least one of:
    an output driver;
    a non-inverting operational amplifier;
    an inverting operational amplifier;
    a first IO front-end circuit for concurrent drive and sense of a sensor;

a second IO front-end circuit for concurrent data transmit and receive;
a bidirectional switch;
a differential operational amplifier; and
a voltage output.

5. The programmable IO module of claim 1, wherein the back-end module is configured via the back-end configuration instructions to function as at least one of:
an inverter;
an analog to digital converter;
a digital filter;
a digital to analog converter;
a gain circuit;
a level shift circuit;
a transmit-receive data formatting module;
a bidirectional switch;
a buffer;
a delay circuit; and
a differential operational amplifier.

6. The programmable IO module of claim 1 further comprises:
a first switching matrix operable to be coupled to the one or more pins and operably coupled to the front-end module;
a second switching matrix operably coupled to the front-end module and the back-end module; and
a third switching matrix operable to be coupled to the one or more buses and operably coupled to the back-end module.

7. An integrated circuit (IC) comprises:
a processing module;
a bus coupled to the processing module;
a pin; and
a programmable input/output (IO) module that includes:
a front-end module operable including a configurable drive sense circuit (DSC) and a DSC signaling circuit operably coupled to the configurable DSC, wherein, for a particular configuration of the configurable DSC, the DSC signaling circuit provides a particular signal to the configurable DSC, wherein the configurable DSC is operable to provide a pin interface with the pin, wherein characteristics of the pin interface are configured in accordance with front-end configuration instructions;
a back-end module operably coupled to the front-end module, wherein the back-end module is operable to provide a bus interface with the bus, and wherein characteristics of the bus interface are configured in accordance with back-end configuration instructions; and
an IO configuration module operable to:
receive configuration instructions regarding the pin;
generate the front-end configuration instructions based on the configuration instructions; and
generate the back-end configuration instructions based on the configuration instructions.

8. The IC of claim 7, wherein the front-end configuration instructions comprises:
first configuration instructions for configuring the configurable DSC; and
second configuration instructions regarding signal generation by the DSC signaling circuit.

9. The IC of claim 7, wherein the configurable drive sense circuit (DSC) comprises:
a configurable input circuit operable to be coupled to the pin;
a configurable feedback circuit operably coupled to the configurable input circuit and to the back-end module; and
an operational amplifier having inputs coupled to the configurable input circuit and to the configurable feedback circuit, wherein an output of the operational amplifier is operably coupled to the coupling of the back-end module to the configurable feedback circuit.

10. The IC of claim 7, wherein the configurable drive sense circuit (DSC) is configurable based on the first configuration instructions to provide at least one of:
an output driver;
a non-inverting operational amplifier;
an inverting operational amplifier;
a first IO front-end circuit for concurrent drive and sense of a sensor;
a second IO front-end circuit for concurrent data transmit and receive;
a bidirectional switch;
a differential operational amplifier; and
a voltage output.

11. The IC of claim 7, wherein the back-end module is configured via the back-end configuration instructions to function as at least one of:
an inverter;
an analog to digital converter;
a digital filter;
a digital to analog converter;
a gain circuit;
a level shift circuit;
a transmit-receive data formatting module;
a bidirectional switch;
a buffer;
a delay circuit; and
a differential operational amplifier.

12. The IC of claim 7, further comprises:
a first switching matrix operable to be coupled to the pin and operably coupled to the front-end module;
a second switching matrix operably coupled to the front-end module and the back-end module; and
a third switching matrix operable to be coupled to the bus and operably coupled to the back-end module.

* * * * *